US009584841B2

(12) United States Patent
Kitazato et al.

(10) Patent No.: US 9,584,841 B2
(45) Date of Patent: Feb. 28, 2017

(54) CONTENTS RECEPTION DEVICE AND METHOD, CONTENTS TRANSMISSION DEVICE AND METHOD, PROGRAM, AND RECORDING MEDIUM

(75) Inventors: Naohisa Kitazato, Tokyo (JP); Yasuaki Yamagishi, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 236 days.

(21) Appl. No.: 13/147,459

(22) PCT Filed: Feb. 2, 2010

(86) PCT No.: PCT/JP2010/051370
§ 371 (c)(1),
(2), (4) Date: Aug. 2, 2011

(87) PCT Pub. No.: WO2010/090162
PCT Pub. Date: Aug. 12, 2010

(65) Prior Publication Data
US 2011/0289542 A1    Nov. 24, 2011

(30) Foreign Application Priority Data

Feb. 9, 2009  (JP) ................................. 2009-027390
Jul. 13, 2009  (JP) ................................. 2009-164687
Nov. 30, 2009  (JP) ................................. 2009-271763

(51) Int. Cl.
*H04N 7/173* (2011.01)
*H04N 21/262* (2011.01)
(Continued)

(52) U.S. Cl.
CPC ........ *H04N 21/2625* (2013.01); *H04H 20/40* (2013.01); *H04N 21/2362* (2013.01);
(Continued)

(58) Field of Classification Search
CPC ....................... H04N 21/26258; H04N 21/262
See application file for complete search history.

(56) References Cited

U.S. PATENT DOCUMENTS 8,099,752 B2 * 1/2012 Eyer .................... H04N 21/235
                                                                725/40
8,161,512 B2 * 4/2012 Suh .................... H04N 21/4345
                                                                348/384.1
(Continued)

FOREIGN PATENT DOCUMENTS

EP        1311115        5/2003
JP        2002-77080     3/2002
(Continued)

OTHER PUBLICATIONS

May 19, 2014, Extended European Search Report for related EP application No. 10738494.3.
(Continued)

*Primary Examiner* — Fernando Alcon
(74) *Attorney, Agent, or Firm* — Paratus Law Group, PLLC

(57) ABSTRACT

The present invention relates to a contents reception device and method, a contents transmission device and method, a program, and a recording medium, whereby a Push-type NRT service can be realized.
"Ch. 4" is taken as a broadcasting channel for normal broadcasting, and "Ch. 5" and "Ch. 6" are taken as broadcasting channels for NRT. The broadcasting channel "Ch. 5" is multiplexed on logical channels "VC5-1", "VC5-2", and "VC5-3". The logical channel "VC5-1" is assigned to a single Push-type NRT broadcasting service, and "VC5-2" is assigned to a Pull-type NRT broadcast. The logical channel "VC5-3" is assigned to another Push-type NRT broadcasting service. Three FLUTE sessions are provided to "VC5-2".

24 Claims, 33 Drawing Sheets

(51) Int. Cl.
*H04N 21/2362* (2011.01)
*H04N 21/2365* (2011.01)
*H04N 21/433* (2011.01)
*H04N 21/458* (2011.01)
*H04N 21/472* (2011.01)
*H04H 20/40* (2008.01)
*H04N 21/4147* (2011.01)
*H04N 21/6405* (2011.01)
*H04H 60/72* (2008.01)
*H04H 60/73* (2008.01)
*H04N 21/643* (2011.01)

(52) U.S. Cl.
CPC ... *H04N 21/2365* (2013.01); *H04N 21/26241* (2013.01); *H04N 21/26283* (2013.01); *H04N 21/4147* (2013.01); *H04N 21/4334* (2013.01); *H04N 21/458* (2013.01); *H04N 21/47214* (2013.01); *H04N 21/6405* (2013.01); *H04H 60/72* (2013.01); *H04H 60/73* (2013.01); *H04N 21/64322* (2013.01)

(56) References Cited

U.S. PATENT DOCUMENTS

| | | | |
|---|---|---|---|
| 8,161,513 B2 * | 4/2012 | Suh | H04N 5/4401 348/384.1 |
| 8,250,619 B2 * | 8/2012 | Song | H04N 21/23614 725/118 |
| 8,272,022 B2 * | 9/2012 | Suh | H04N 5/4401 725/109 |
| 8,407,743 B2 * | 3/2013 | Suh | H04N 21/235 370/395.52 |
| 2001/0047516 A1 * | 11/2001 | Swain et al. | 725/86 |
| 2003/0185540 A1 | 10/2003 | Fujita | |
| 2005/0216942 A1 * | 9/2005 | Barton | 725/97 |
| 2007/0091206 A1 | 4/2007 | Bloebaum | |
| 2008/0219643 A1 | 9/2008 | Le Buhan et al. | |
| 2008/0271101 A1 * | 10/2008 | Doherty | 725/114 |
| 2009/0022476 A1 | 1/2009 | Nonoyama | |
| 2009/0094253 A1 | 4/2009 | Hanai | |
| 2009/0276819 A1 * | 11/2009 | Kim et al. | 725/105 |
| 2009/0320087 A1 * | 12/2009 | Song et al. | 725/131 |

FOREIGN PATENT DOCUMENTS

| | | |
|---|---|---|
| JP | 2005-191950 | 7/2005 |
| JP | 2007-005929 | 1/2007 |
| JP | 2007-35135 | 2/2007 |
| JP | 2008-148231 | 6/2008 |
| JP | 2009/27390 | 2/2009 |
| WO | WO03/058967 | 7/2003 |
| WO | WO 2007/050137 A1 | 5/2007 |
| WO | WO 2008/117447 A1 | 10/2008 |

OTHER PUBLICATIONS

Dec. 2, 2015, Korean Office Action for related KR Application No. 10-2011-7017863.

* cited by examiner

EPG

| | NRT#1 | NRT#2 | RT#1 |
|---|---|---|---|
| 10:00 | xxxx | xxxx | |
| | xxxx | | |
| 11:00 | xxxx | xxxx | |

CONTENTS LIST

| xxxx |
|---|
| xxxx |
| xxxx |

FIG. 16

| Syntax | No. of Bits |
|---|---|
| NRT_information_table_section() { | |
|     table_id | 8 |
|     section_syntax_indicator | 1 |
|     private_indicator | 1 |
|     reserved | 2 |
|     section_length | 12 |
|     source_id | 16 |
|     reserved | 2 |
|     version_number | 5 |
|     current_next_indicator | 1 |
|     section_number | 8 |
|     last_section_number | 8 |
|     protocol_version | 8 |
|     for (i=0;i<N;i++) { | |
|         descriptor() | |
|     } | |
|     num_items_in_section | 8 |

FIG. 18

| Syntax | No. of Bits |
|---|---|
| push_NRT_descriptor () { | |
| 341 — descriptor_tag | 8 |
| descriptor_length | 8 |
| push_NRT_service_title_length | 8 |
| 342 — push_NRT_service_title_text () | 8 × N |
| 343 — delivery_interval | |
| 344 — total_size_limit | 16 |
| url_length | 8 |
| 345 — registration_url | 8 × N |
| } | |

FIG. 29

```
<rss version="2.0">
<channel>
<title>News Headline by XYZ</title>    ~521
<link/>
<description/>
<item>
  <enclosure url=http://XYZ.com/newsHeadline/title1.mp4 length="123456789"
  type="video/mp4"/>    ~522
  ...
</item>
<item>
  ...
</item>
...
</channel>
</rss>
```

FIG. 31

```
RSS 01
<rss version="2.0">
<channel>
<title>News Headline by XYZ</title>  ~541
<link/>
<description/>
<pubDate>Tue,10 Jun 2003 09:00:00 GMT</pubDate>  ~543
<skipHours><hour>9</hour></skipHours>  ~544
<item>
  <enclosure
  url=http://XYZ.com/newsHeadline/title01.mp4
  length="123456789" type="video/mp4"/>
  ...
</item>
</channel>
</rss>
```

```
RSS 02
<rss version="2.0">
<channel>
<title>News Headline by XYZ</title>         ~541
<link/>
<description/>
<pubDate>Tue,10 Jun 2003 10:00:00 GMT</pubDate>   ~543
<skipHours><hour>10</hour></skipHours>       ~544
<item>
<enclosure
url=http://XYZ.com/newsHeadline/title02.mp4
length="987654321" type="video/mp4"/>
...
</item>                                       ~542
</channel>
</rss>
```

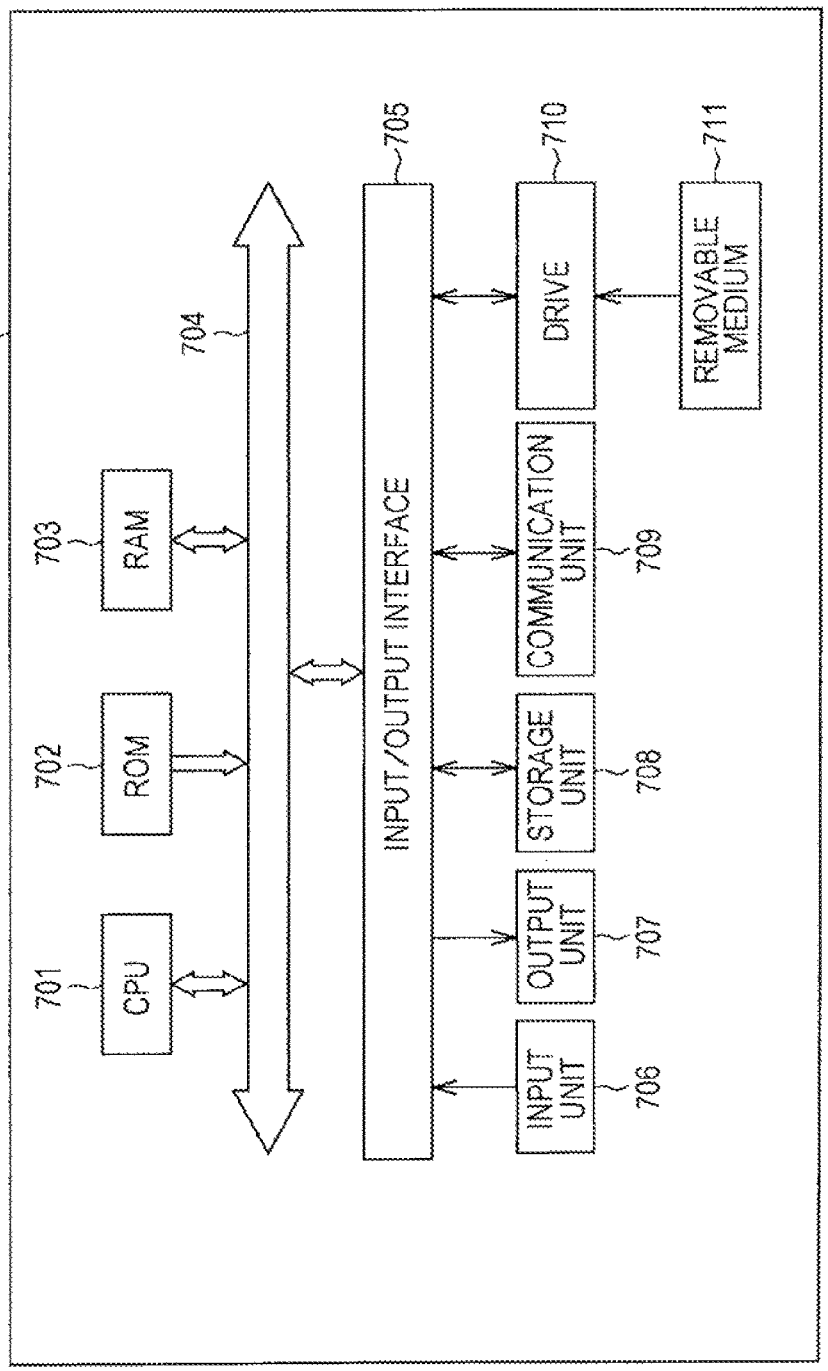

CONTENTS RECEPTION DEVICE AND METHOD, CONTENTS TRANSMISSION DEVICE AND METHOD, PROGRAM, AND RECORDING MEDIUM

TECHNICAL FIELD

The present invention relates to a contents reception device and method, a contents transmission device and method, a program, and a recording medium, and specifically relates to a contents reception device and method, a contents transmission device and method, a program, and a recording medium, whereby a Push-type NRT service can be realized.

BACKGROUND ART

In recent years, reception of multi-channel, or high-resolution television broadcast has become commonplace due to the spread of digital broadcasting.

On the other hand, technological study and method determination for enabling not only normal television broadcast but also a further advanced broadcasting service that viewer demand are being undertaken, taking advantage of a band available for digital broadcasting.

Examples of a function that viewers demand include on-demand viewing and listening for allowing a viewer to view contents whenever desired. However, it has been thought difficult to realize on-demand viewing and listening in one-way transmission broadcasting instead of bidirectional transmission broadcasting.

Therefore, in order to enable on-demand viewing and listening in one-way transmission broadcasting, an NRT service for playing a broadcasted content after temporarily recording in storage has been studied, assuming that a reception terminal would have large-capacity storage. The NRT (Non-RealTime) service is a service, which does not assume viewing and listening in real time, for transmitting a content as data using broadcast signals without viewing and listening of the content in sync with the broadcast point-in-time of the content.

Specifically, with the NRT service, unlike conventional recording reservation of a broadcast program content or the like, for example, in the event that the transmission band of a signal according to broadcast waves is great, recording (downloading) can be completed in a shorter time. Alternatively, for example, in the event that the transmission band of a signal according to broadcast waves is small, downloading is completed in a longer time.

Also, in recent years, content providing methods have diversified. For example, conventionally, it has been mainstream for a user to request a desired content, and the content thereof is provided. However, in recent years, a providing method called Push-type distribution has been employed wherein the server side one-sidedly distributes a content to a user even if there is no request (e.g., see PTL 1).

With the NRT service as well, there can be conceived the two methods of a method for a user selecting an individual content, and then receiving and accumulating this, and a method for a user registering a particular content group to be viewed, and then a terminal automatically receiving and accumulating these contents. The former method is, for example, referred to as a Pull-type NRT service, and the latter method is, for example, referred to as a Push-type NRT service.

CITATION LIST

Patent Literature

PTL 1: Japanese Unexamined Patent Application Publication No. 2007-035135

SUMMARY OF INVENTION

Technical Problem

With regard to the Pull-type NRT service, a realizing method has already been assumed, but with regard to Push-type NRT service, no realizing method has been assumed.

The present invention has been made in light of such a situation, and enables Push-type NRT service to be realized.

Solution to Problem

A first aspect of the present invention is a contents reception device including: control information reception means configured to receive control information relating to broadcasting of a content with a transmission rate unsynchronized with a playback rate, based on a signal to be transmitted as a broadcast wave; downloading schedule generating means configured to generate a downloading schedule that is reserved information for receiving and recording contents to be broadcasted with a logical channel corresponding to registration information set beforehand, based on the control information; downloading means configured to receive each of the contents and to record in a recording medium, based on the downloading schedule; and playback means configured to play a content recorded in the recording medium with the playback rate.

The control information relating to broadcasting of contents may include: predetermined descriptive data in which, in the event of taking the transmission path of the broadcast wave signal of the frequency band as a physical channel, information relating to a logical channel obtained by dividing the physical channel into a plurality of transmission paths using a predetermined method is described; and meta data in which information relating to a content to be transmitted with each of the logical channels is described.

The downloading schedule generating means may generate a downloading schedule for receiving and recording all of the contents to be broadcasted with the logical channel corresponding to the registration information, of a plurality of logical channels included in the physical channel.

The downloading schedule generating means may generate the downloading schedule by determining the broadcasting start point-in-time of the contents, and also determining location information for determining the data of the contents, of data to be transmitted by the logical channels, based on description of the meta data.

The downloading means may receive the contents by receiving, based on the downloading schedule, the broadcast wave of a frequency band corresponding to the physical channel at the broadcasting start point-in-time of the contents, extracting a transport packet of a logical channel corresponding to the registration information, of transport packets to be transmitted by the physical channel, based on description of the predetermined descriptive data, and determining the data of the contents based on the location information.

The transport packet of the logical channel may be structured so as to include an IP packet; with the location information including information for determining a file transmission session of the data of the contents to be transmitted by the IP packet; and with the downloading means determining the data of the contents based on description of transmission control data obtained by the file transmission session being determined.

The downloading means may determine an address file described in the RSS format or ATOM format, based on description of the transmission control data, and determine the data of the contents based on the address file.

Based on description of the predetermined descriptive data and the meta data, of the logical channels, a logical channel for providing a Push-type service for receiving a content to be viewed and listened to may be determined regardless of a user request; with a list of logical channels for providing the Push-type service being presented to a user to accept registration of the Push-type service by the user; and with information for determining the logical channel of the registered Push-type service being stored as the registration information.

The downloading schedule generating means may generate a downloading schedule for receiving and recording a content determined by the predetermined descriptive data, which is of a plurality of logical channels included in the physical channel, a content to be transmitted by the logical channel corresponding to the registration information.

The downloading means may include overwriting determining means configured to determine whether or not the received content is overwritten on a content recorded in the recording medium.

An expiration date may be set to the contents recorded by the downloading means based on description of the meta data; with the contents of which the expiration date has elapsed being eliminated.

The first aspect of the present invention is a contents reception method including the steps of: receiving control information relating to broadcasting of a content with a transmission rate unsynchronized with a playback rate, based on a signal to be transmitted as a broadcast wave; generating a downloading schedule that is reserved information for receiving and recording contents to be broadcasted with a logical channel corresponding to registration information set beforehand, based on the control information; receiving each of the contents and recording in a recording medium, based on the downloading schedule; and playing a content recorded in the recording medium with the playback rate.

The first aspect of the present invention is a program causing a computer to serve as a contents reception device including: control information reception means configured to receive control information relating to broadcasting of a content with a transmission rate unsynchronized with a playback rate, based on a signal to be transmitted as a broadcast wave; downloading schedule generating means configured to generate a downloading schedule that is reserved information for receiving and recording contents to be broadcasted with a logical channel corresponding to registration information set beforehand, based on the control information; downloading means configured to receive each of the contents and to record in a recording medium, based on the downloading schedule; and playback means configured to play a content recorded in the recording medium with the playback rate.

With the first aspect of the present invention, control information relating to broadcasting of a content with a transmission rate unsynchronized with a playback rate is received based on a signal to be transmitted as a broadcast wave, a downloading schedule that is reserved information for receiving and recording contents to be broadcasted with a logical channel corresponding to registration information set beforehand is generated based on the control information, each of the contents and recording in a recording medium is recorded based on the downloading schedule, and a content recorded in the recording medium is played with the playback rate.

A second aspect of the present invention is a contents transmission device including: contents information obtaining means configured to obtain information relating to a content to be broadcasted with a transmission rate unsynchronized with a playback rate, from a broadcasting schedule created beforehand; determining means configured to determine whether or not the content is a content of a Push-type service for receiving a content to be viewed and listened to regardless of a user request; first control information generating means for describing, in the event that the content is a content of the Push-type service, information representing that the content is a content of the Push-type service, along with information relating to the content, in first control information generated as information relating to a content to be broadcasted by a predetermined logical channel; second control information generating means configured to generate second control information describing information for determining each of the logical channels in a physical channel serving as a transmission path of a broadcast wave signal of a predetermined frequency band; multiplexing means configured to multiplex the first control information and the second control information with the data of the content, and also to multiplex data to be broadcasted by a plurality of the logical channels as data to be broadcasted by a single physical channel; and broadcast wave transmission means configured to modulate the multiplexed data to transmit as a broadcast wave.

The second aspect of the present invention is a contents transmission method including the steps of: obtaining information relating to a content to be broadcasted with a transmission rate unsynchronized with a playback rate, from a broadcasting schedule created beforehand; determining whether or not the content is a content of a Push-type service for receiving a content to be viewed and listened to regardless of a user request; describing, in the event that the content is a content of the Push-type service, information representing that the content is a content of the Push-type service, along with information relating to the content, in first control information generated as information relating to a content to be broadcasted by a predetermined logical channel; generating second control information describing information for determining each of the logical channels in a physical channel serving as a transmission path of a broadcast wave signal of a predetermined frequency band; multiplexing the first control information and the second control information with the data of the content, and also multiplexing data to be broadcasted by a plurality of the logical channels as data to be broadcasted by a single physical channel; and modulating the multiplexed data to transmit as a broadcast wave.

The second aspect of the present invention is a program causing a computer to serve as a contents transmission device including: contents information obtaining means configured to obtain information relating to a content to be broadcasted with a transmission rate unsynchronized with a playback rate, from a broadcasting schedule created beforehand; determining means configured to determine whether or not the content is a content of a Push-type service for receiving a content to be viewed and listened to regardless of a user request; first control information generating means for describing, in the event that the content is a content of the Push-type service, information representing that the content is a content of the Push-type service, along with information relating to the content, in first control information generated as information relating to a content to be broadcasted by a predetermined logical channel; second control information generating means configured to generate second control information describing information for determining each of the logical channels in a physical channel serving as a transmission path of a broadcast wave signal of a predetermined frequency band; multiplexing means configured to multiplex the first control information and the second control information with the data of the content, and also to multiplex data to be broadcasted by a plurality of the logical channels as data to be broadcasted by a single physical channel; and broadcast wave transmission means configured to modulate the multiplexed data to transmit as a broadcast wave.

With the second aspect of the present invention, information relating to a content to be broadcasted with a transmission rate unsynchronized with a playback rate is obtained from a broadcasting schedule created beforehand, determination is made whether or not the content is a content of a Push-type service for receiving a content to be viewed and listened to regardless of a user request, and in the event that the content is a content of the Push-type service, information representing that the content is a content of the Push-type service is described, along with information relating to the content, in first control information generated as information relating to a content to be broadcasted by a predetermined logical channel, second control information describing information for determining each of the logical channels is generated in a physical channel serving as a transmission path of a broadcast wave signal of a predetermined frequency band, the first control information and the second control information are multiplexed with the data of the content, and also data to be broadcasted by a plurality of the logical channels is multiplexed as data to be broadcasted by a single physical channel, and the multiplexed data is modulated to transmit as a broadcast wave.

Advantageous Effects of Invention

According to the present invention, Push-type NRT service can be realized.

BRIEF DESCRIPTION OF DRAWINGS

FIG. 16 is a diagram for describing an example of the syntax of the NRT-IT in FIG. 15.

FIG. 18 is a diagram for describing an example of the syntax of "Push-type NRT meta information".

FIG. 29 is a diagram illustrating an example of the address file described in the RSS format used for the example in FIG. 28.

FIG. 31 is a diagram illustrating an example of an address file described in the RSS format used for the example in FIG. 30.

FIG. 32 is a diagram illustrating an example of the address file described in the RSS format used for the example in FIG. 30.

FIG. 41 is a block diagram illustrating a configuration example of a personal computer.

DESCRIPTION OF EMBODIMENTS

Hereafter, embodiments of the present invention will be described with reference to the drawings.

Figure 1:
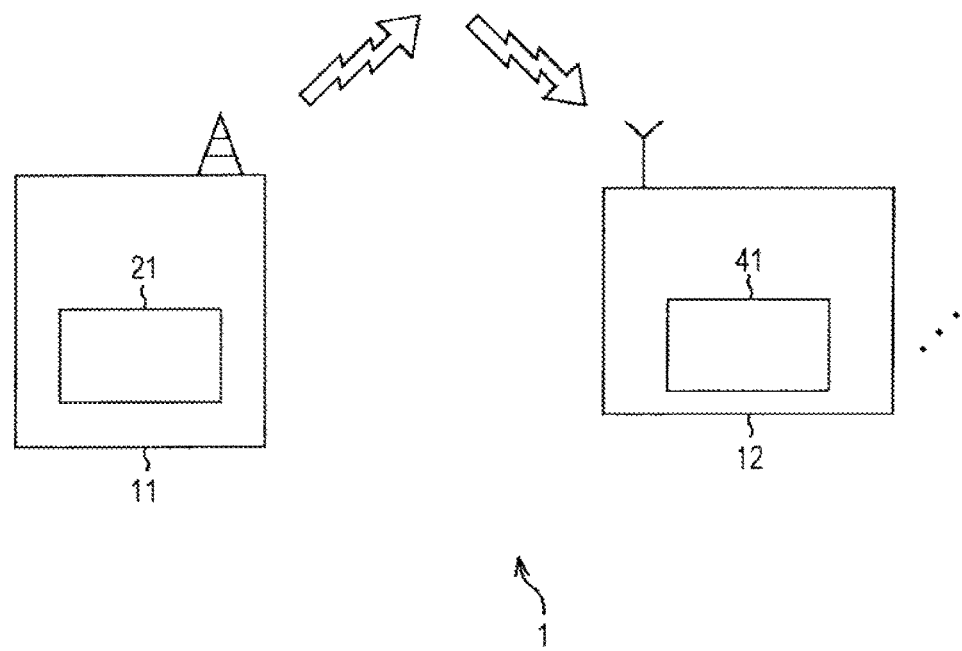
FIG. 1 is a diagram illustrating a configuration example of a broadcasting system according to an embodiment of the present invention.

FIG. 1 is a diagram illustrating a configuration example of a broadcasting system according to an embodiment of the present invention. As illustrated in this drawing, a broadcasting system 1 is configured of a transmission device 21 installed in a broadcasting station 11, and a reception device 41 installed in a user home 12 or the like. Note that, in reality, a reception device is installed in each of user homes.

For example, a predetermined frequency band (e.g., 6 MHz) of broadcast waves is assigned to a single broadcast channel, the assigned frequency band thereof is taken as a single broadcast channel, and channel tuning is performed by a broadcast channel being selected by the reception device 41. Also, with digital broadcasting, multiple logical channels may also be provided so as to be multiplexed on a single broadcast channel.

The transmission device 21 is a device for transmitting digital broadcast wave signals, and is configured so as to transmit normal broadcast signals and NRT broadcast signals. Here, a normal broadcast is a broadcast assuming viewing and listening in real time at the reception device 41 which has received the signals of this broadcast, and is a broadcast on the assumption that a content is viewed and listened to in sync with the broadcast point-in-time of the content. On the other hand, an NRT broadcast is a broadcast, which does not assume viewing and listening in real time, for transmitting a content as data using signals according to broadcast waves without viewing and listening to the content in sync with the broadcast point-in-time of the content.

With NRT broadcasting, unlike conventional recording reservation of a broadcast program content, for example, in the event that the transmission band of signals according to broadcast waves is great, i.e., in the event that the transmission rate is high, recording (downloading) can be completed in shorter time. Alternatively, for example, in the event that the transmission band of signals according to broadcast wave is small, i.e., in the event that the transmission rate is low, downloading of a content is completed in longer time. On the other hand, with normal broadcasting, a broadcasted content is viewed and listened to in real time, and accordingly, transmission of the content is performed for generally the same transmission time as the playback time of the content.

That is to say, with NRT broadcasting, a content to be broadcasted as digital data may be transmitted from the transmission device 21 to the reception device 41 with a transmission rate greatly different from the playback rate thereof. On the other hand, with normal broadcasting, content to be broadcasted as digital data cannot be transmitted from the transmission device 21 to the reception device 41 with a transmission rate greatly different from the playback rate thereof.

With the broadcasting system 1, a content made up of signals that the transmission device 21 transmits, which has broadcasted with NRT broadcasting, is received by the reception device 41, and is recorded and accumulated in a recording medium (storage) which the reception device 41 has. Subsequently, the content broadcasted with NRT broadcasting is viewed and listened to by the user of the reception device 41 playing the content recorded in the recording medium.

With NRT broadcasting, there are conceived two methods of a method for the user selecting an individual content, and then receiving and accumulating this, and a method for the user performing registration for viewing and listening to a particular content group, and then the reception device 41 automatically receiving and accumulating these contents. Now, let us say that the former method will be referred to as Pull-type NRT broadcasting, and the latter method will be referred to as Push-type NRT broadcasting. Note that Push-type NRT broadcasting will also be referred to as Subscription-type NRT broadcasting, for example.

First, the Pull-type NRT broadcasting will be described.

With NRT broadcasting, data structured to include meta data referred to as PSIP (Program and System Information Protocol) data, control information, and so forth is periodically received by the reception device 41. The reception device 41 generates a list of contents that can be received with NRT broadcasting based on the meta data included in the PSIP data, control information, and so forth. This contents list is referred to as an ECG (Electronic Contents Guide). Note that the details of the PSIP data are described in the ATSC (Advanced Television Systems Committee) standard.

Figure 2:
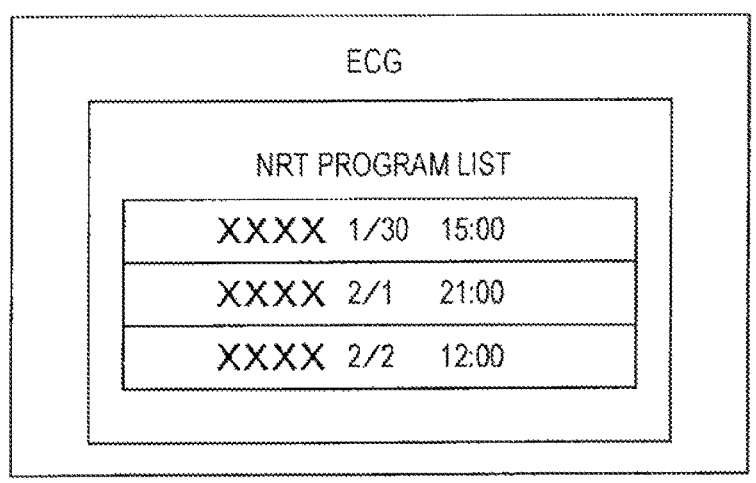
FIG. 2 is a diagram illustrating an example of an ECG.

FIG. 2 is a diagram illustrating an example of an ECG displayed on the screen. With the example in this drawing, a list of contents that can be received with NRT broadcasting is displayed as an NRT program list along with the broadcasting start point-in-time of each of these contents. Note that, with the example in FIG. 2, "XXXX" displays the title of each content, and the broadcasting start point-in-time of this content is displayed with description such as "1/30 15:00 (represents Jan. 30, 15:00)" or the like.

Figures 3, 4, 5:
FIG. 3 is a diagram illustrating an example of an EPG.
FIG. 4 is a diagram illustrating an example of a contents list.
FIG. 5 is a diagram illustrating an example of a played content image.

Alternatively, contents that can be received with NRT broadcasting may be displayed as an EPG (Electronic Program Guide). FIG. 3 is a diagram illustrating an example of an EPG displayed on the screen. This drawing illustrates an EPG of programs broadcasted in a channel called "NRT#1", a channel called "NRT#2", and a channel called "RT#1". Here, the channel called "NRT#1", and the channel called "NRT#2" are taken as NRT broadcast channels, and the channel called "RT#1" is taken as a normal broadcast channel.

Let us say that each of rectangular frames displayed in FIG. 3 represents the broadcast time zone of each program (or content). According to this EPG, with the normal broadcast channel "RT#1", it is represented that at a time zone displayed with a rectangular frame, the corresponding program (or content) can be viewed and listened to. On the other hand, with the NRT broadcast channels "NRT#1" and "NRT#2", it is represented that at a time zone displayed with a rectangular frame, the corresponding program (or content) can be downloaded.

The user of the reception device 41 displays the ECG in FIG. 2 or the EPG in FIG. 3 on the screen of a display or the like, and for example, operates a GUI to select a desired NRT broadcast content. The reception device 41 executes, at the broadcasting start point-in-time of the selected content, downloading of this content. However, with the NRT, downloading processing is executed by the reception device 41 receiving a broadcast wave signal, and recording data corresponding to this signal in a recording medium.

Subsequently, a list of contents downloaded by the reception device 41 is displayed on the screen, for example, as a contents list illustrated in FIG. 4. FIG. 4 is a diagram illustrating an example of a contents list displayed on the screen. Note that, with the example in FIG. 4, let us say that "XXXX" displays the title of each content.

The user of the reception device 41 displays the contents list in FIG. 4 on the screen of the display or the like, and, for example, operates a GUI to select a content to be viewed and listened to. Thus, the selected content is played, and as illustrated in FIG. 5, the image of the content is displayed on the screen of the display. With this example, an image of a person who is playing golf is displayed as a content image.

In this way, the NRT broadcast content is received and viewed and listened to.

Figure 6:
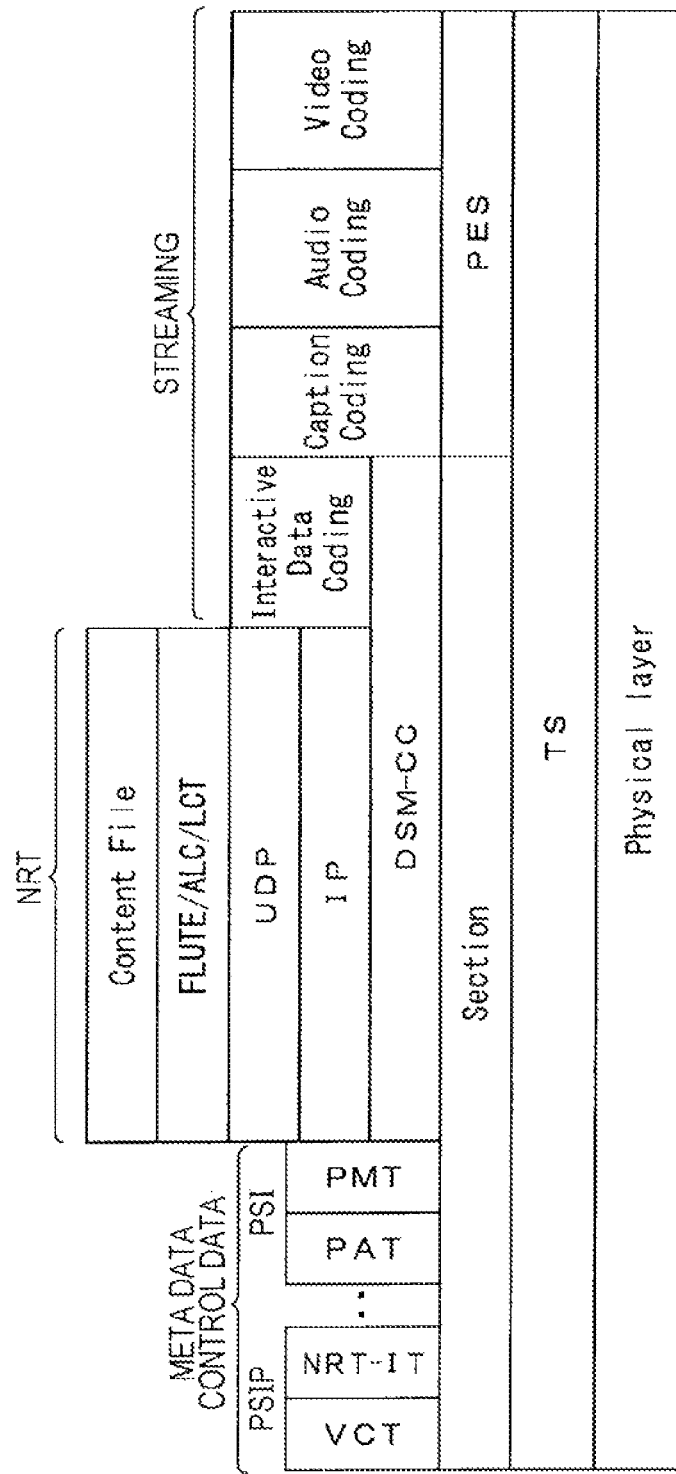
FIG. 6 is a diagram for describing a protocol stack in broadcast wave signals including an NRT broadcast and a normal broadcast.

FIG. 6 is a diagram for describing a protocol stack in broadcast wave signals including an NRT broadcast and a normal broadcast.

As illustrated in FIG. 6, the lowest hierarchy is taken as "Physical Layer (physical layer)", and the broadcast wave frequency band assigned to this channel corresponds to this. The upper hierarchy adjacent to "Physical Layer" is taken as "TS (Transport Stream)". With "TS", a packet in the upper hierarchy is divided into fixed-length packets called transport packets and transmitted, and continuity of the transport packets becomes a transport stream.

That is to say, all of the signals to be transmitted with the frequency band corresponding to a single broadcast channel are transmitted by a transport packet having header information corresponding to the broadcast channel thereof, and so forth.

The upper hierarchy adjacent to the transport stream is taken as "Section" or "PES (Packetized Elementary Stream) ". For example, like a normal broadcast content, data to be played in real time is transmitted as packets of "PES". Also, data of file transfer, data of control information, and so forth are transmitted as packets of "Section".

As illustrated in FIG. 6, in response to the type of a packet of "PES", "Caption Coding", "Audio Coding", and "Video Coding" are stipulated as the upper hierarchies of "PES". "Caption Coding" is a packet to store data relating to captions of an image, "Audio Coding" is a packet to store audio data, and "Video Coding" is a packet to store image data.

In FIG. 6, "PSIP" and "PSI (Program Specific Information)" are displayed as upper hierarchies adjacent to "Section". "PSIP" is a hierarchy including later-described VCT, NRT-IT, and so forth. "PSI (Program Specific Information)" is a hierarchy including PAT (Program Association Table), PMT (Program Map Table), and so forth.

Also, in FIG. 6, "DSM-CC (Digital Storage Media Command and Control)" is displayed as an upper hierarchy adjacent to "Section". "DSM-CC" is used as an adaptation layer for transmitting an IP packet on MPEG2-TS of a broadcast stream. Note that "DSM-CC" is stipulated as ISO standard.

"Interactive Data Coding" is displayed as an upper hierarchy adjacent to "DSM-CC". A streaming broadcast is realized by data stored in "Interactive Data Coding", "Caption Coding", "Audio Coding", and "Video Coding". That is to say, these pieces of data are received, whereby a normal broadcast program can be received and played.

Also, "IP" is displayed as an upper hierarchy adjacent to "DSM-CC". "IP" displayed here is the same as IP in the protocol stack of TCl/IP, and IP packets are determined by an IP address. As illustrated in FIG. 6, an NRT broadcast is configured with the IP packets. It goes without saying that an NRT broadcast is not communication but presented as a broadcast, and originally, there is no need to use the protocol stack of TCP/IP that is a communication protocol, but IP packets are formally used at the time of performing downloading of contents.

An upper hierarchy adjacent to "IP" is taken as "UDP", and "FLUTE/ALC (Asynchronous Layered Coding Protocol)/LCT (Layered Coding Transport (Building Block))" is displayed as an upper hierarchy thereof. Specifically, with NRT broadcasting, a packet for specifying the port of UDP in TCP/IP communication is transmitted, and a session according to FLUTE (File Delivery over Unidirectional Transport) is established, for example. Subsequently, data making up the content is determined by the session of FLUTE. FLUTE is a communication protocol whereby data distribution can be performed using one-way transmission path (e.g., transmission path only in the downward direction), whereby transmission of an arbitrary file can be performed.

Note that the details of FLUTE are stipulated as RFC3926.

In this way, with NRT broadcasting, a single physical channel having a transmission band corresponding to the transmission rate (e.g., 20 Mbps) of a transport packet of "TS" may be multiplexed into multiple logical channels. Specifically, for example, in the event that the transmission path of a broadcast wave signal of a single broadcast channel to which a frequency band of 6 MHz is assigned is taken as a physical channel, the physical channel thereof is divided into multiple transmission paths, whereby multiple logical channels can be provided.

Information relating to each of such logical channels is described in a VCT that is control information relating to logical channels to be generated for each physical channel. The details of the VCT will be described later with reference to FIG. 7, "Program_number" for each logical channel is determined based on the VCT, and "PSI" is determined based on "Program_number". Subsequently, a predetermined identifier appended to a transport packet of "TS" is determined based on "PAT" and "PMT" of "PAT". A transport packet to which an identifier thus determined is appended is extracted, whereby the data of a single logical channel can be determined. In this way, a single transport stream can be identified as the packets of multiple logical channels, whereby a single physical channel can be multiplexed to multiple logical channels.

Each of the logical channels thus multiplexed will be referred to as a virtual channel (Virtual Channel). With NRT broadcasting, a single logical channel can be multiplexed by multiple FLUTE sessions.

With normal broadcasting, a single physical channel (e.g., a single broadcast channel) is arranged to correspond to a single logical channel, and is not multiplexed to multiple channels like NRT broadcasting. Accordingly, with NRT broadcasting, unlike the case of normal broadcasting, multiple contents can also be broadcasted (transmitted) using a single broadcast channel at the same time.

Next, the VCT (Virtual Channel Table) and the NRT-IT (NRT Information Table) included in the above PSIP data will be described.

Figure 7:
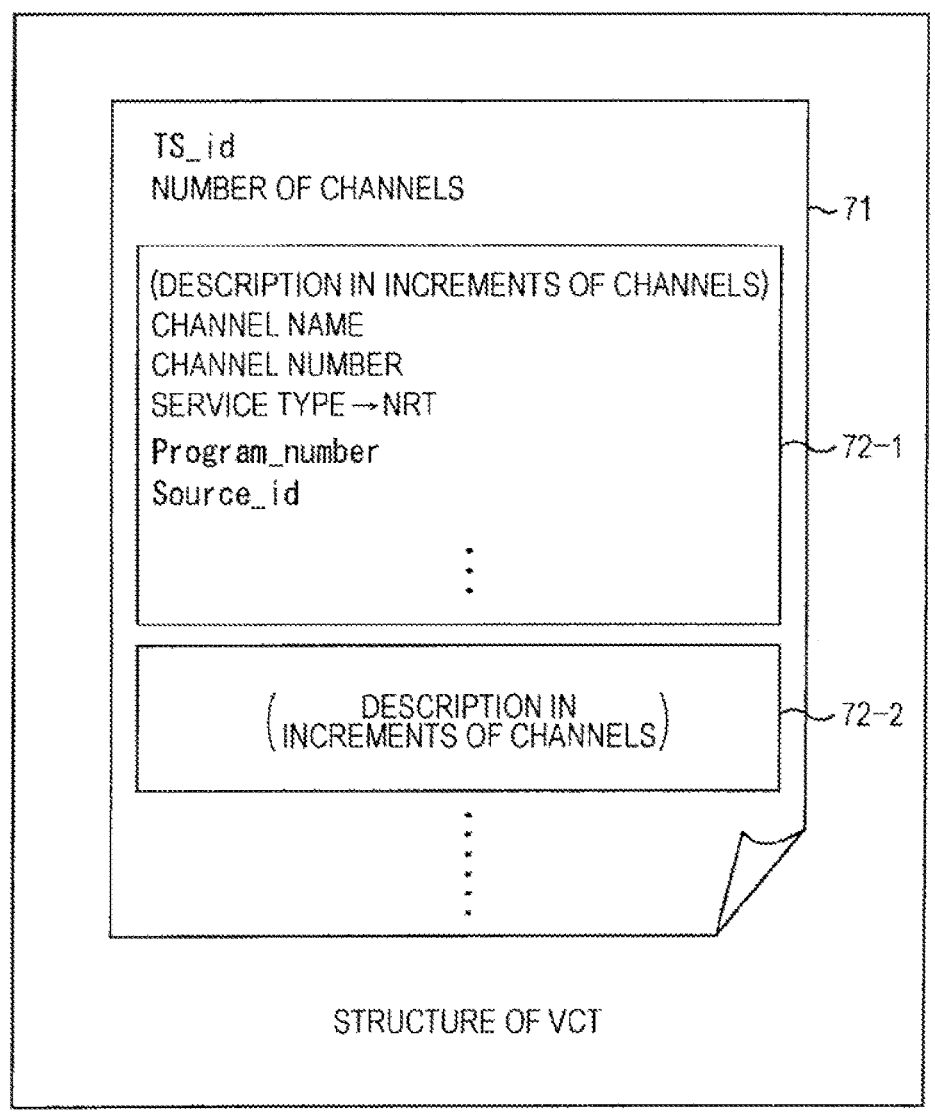
FIG. 7 is a diagram illustrating a structure example of a VCT.

The VCT is a table made up of a descriptor for enabling each of virtual channels (logical channels) to be identified with the reception device 41. FIG. 7 is a diagram illustrating an example of the VCT.

With the example in the drawing, "TS_id", "Number of channels", a description region 72-1 in increments of channels, a description region 72-2 in increments of channels, and so on are described in a description region 71 in the VCT. "TS_id" is taken as an ID for identifying a transport stream, where, in reality, a predetermined character, a numeric value, or the like is described. Thus, it can be identified of which physical channel (broadcast channel) the VCT is. "Number of channels" is described as a numeric value representing the number of logical channels included in the physical channel determined by "TS_id", or the like.

Information relating to a single logical channel is described in each of the description region 72-1 in increments of channels, description region 72-2 in increments of channels, and so on. These description regions are provided according to the numeric value described in "Number of channels". For example, in the event that the number of logical channels included in the corresponding physical channel is 3, a numeric value "3" is described in "Number of channels". Subsequently, the description region 72-1 in increments of channels, description region 72-2 in increments of channels, and description region 72-3 in increments of channels are described.

"Channel name", "Channel number", "Service type", "Program_number", "Source_id", and so on are described in the description region 72-1 in increments of channels. With "Channel name" and "Channel number", a predetermined character and a numeric value that represent each thereof are described. For example, "Channel name" of the description region 72-1 in increments of channels is described with "XX station NRT first channel" or the like, and Channel number is described with "5-1" or the like. Also, "Channel name" of the description region 72-1 in increments of channels is described with "XX station NRT second channel" or the like, and Channel number is described with "5-2" or the like.

"Service type" is described with information for identifying whether this logical channel is a logical channel corresponding to normal broadcasting, or a logical channel corresponding to NRT broadcasting. For example, in the event that the logical channel corresponding to the description region 72-1 in increments of channels is a logical channel of NRT broadcasting, "Service type" is described with "NRT".

"Program_number" is used for determining PSI (Program Specific Information) necessary for determining the data of this logical channel.

"Source_id" is taken as an ID for identifying this logical channel, where, in reality, a predetermined character, a numeric value, or the like is described. That is to say, the description region 72-1 in increments of channels is a region where information relating to a single logical channel determined by "Source_id" is described.

Similarly, information relating to a single logical channel determined by "Source_id" is also described in each of the description region 72-2 in increments of channels, and so on.

The VCT is thus structured.

As described above, with NRT broadcasting, a separate content may be broadcasted with each of multiple logical channels. Information relating to a content to be transmitted with each of logical channels is described in the NRT-IT which is control information generated for each logical channel.

Figure 8:
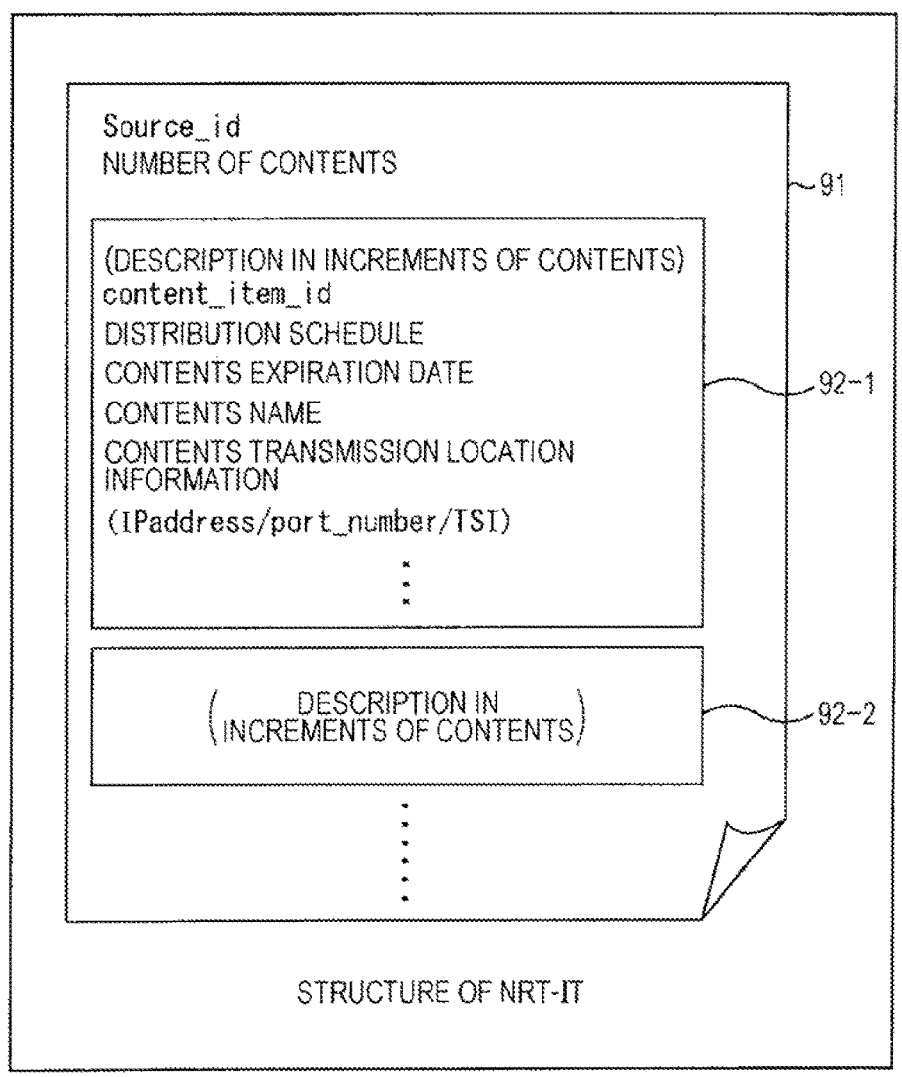
FIG. 8 is a diagram illustrating a structure example of an NRT-IT.

The NRT-IT is a table made up of a descriptor for enabling each of NRT broadcast contents to be broadcasted with each of logical channels to be identified at the reception device 41. FIG. 8 is a diagram illustrating an example of the NRT-IT.

With the example in the drawing, with a description region 91 of the NRT-IT, "Source_id", "Number of contents", a description region 92-1 in increments of contents, a description region 92-2 in increments of contents, and so on are described. "Source_id" is the same as described above with reference to FIG. 7, and is taken as an ID for identifying a logical channel, where, in reality, a predetermined character, a numeric value, or the like is described. Thus, this NRT-IT can be correlated with one of logical channels described in the description region 72-1 in increments of channels, the description region 72-2 in increments of channels, and so on, in FIG. 7. "Number of contents" is described as a numeric value representing the number of contents to be broadcasted at a predetermined unit time with a logical channel determined by "Source_id", or the like.

Information relating to a single content is described in each of the description region 92-1 in increments of contents, description region 92-2 in increments of contents, and so on. The described regions are provided according to a numeric value described in the above "Number of contents". For example, in the event that the number of contents to be broadcasted at unit time with the corresponding logical channel is 5, a numeric value "5" is described in "Number of contents". Subsequently, the description region 92-1 in increments of contents, description region 92-2 in increments of contents, and so on through description region 92-5 in increments of channels are described.

"content_item_id", "Distribution schedule", "Contents expiration date", "Contents name", "Contents transmission location information", and so on are described in the description region 92-1 in increments of contents. "content_item_id" is taken as an ID for identifying the corresponding content, and in reality, a predetermined character, a numeric value, or the like is described. That is to say, the description region 92-1 in increments of contents is a region where information relating to a single content determined by this "content_item_id" is described.

With "Distribution schedule", information representing the broadcasting start point-in-time and broadcasting end point-in-time of the corresponding content is described. Note that this content is an NRT broadcast content, and thus, according to the broadcasting start point-in-time and broadcasting end point-in-time, time when this content can be viewed and listened to is not represented, but point-in-time when downloading of this content is to be started, and point-in-time when downloading of the content ends are represented.

With "Contents expiration date", information for determining point-in-time serving as the expiration date of the corresponding content is described. A content of which the expiration date has elapsed is arranged to be prevented from being played by being eliminated from the recording medium of the reception device 41, or the like.

With "Contents name", characters, such as the tile of the corresponding content, or the like, are described.

With "Contents transmission location information", an IP address, a UDP port number, and an identifier "TSI (Transport Session Identifier)" for determining a FLUTE session, described above with reference to FIG. 6, are described. This "Contents transmission location information" is determined, whereby, of data to be transmitted with the logical channel determined by "Source_id", the data of a single content data determined by "content_item_id" can be identified.

Similarly, information relating to a single content determined by "content_item_id" is also described in each of the description region 92-2 in increments of contents, and so on.

The NRT-IT is thus structured.

In this way, the VCT is obtained, whereby information relating to each of logical channels of broadcast channels can be obtained, and the NRT-IT is obtained, whereby information relating to a content to be broadcasted with each logical channel can be obtained.

Figure 9:
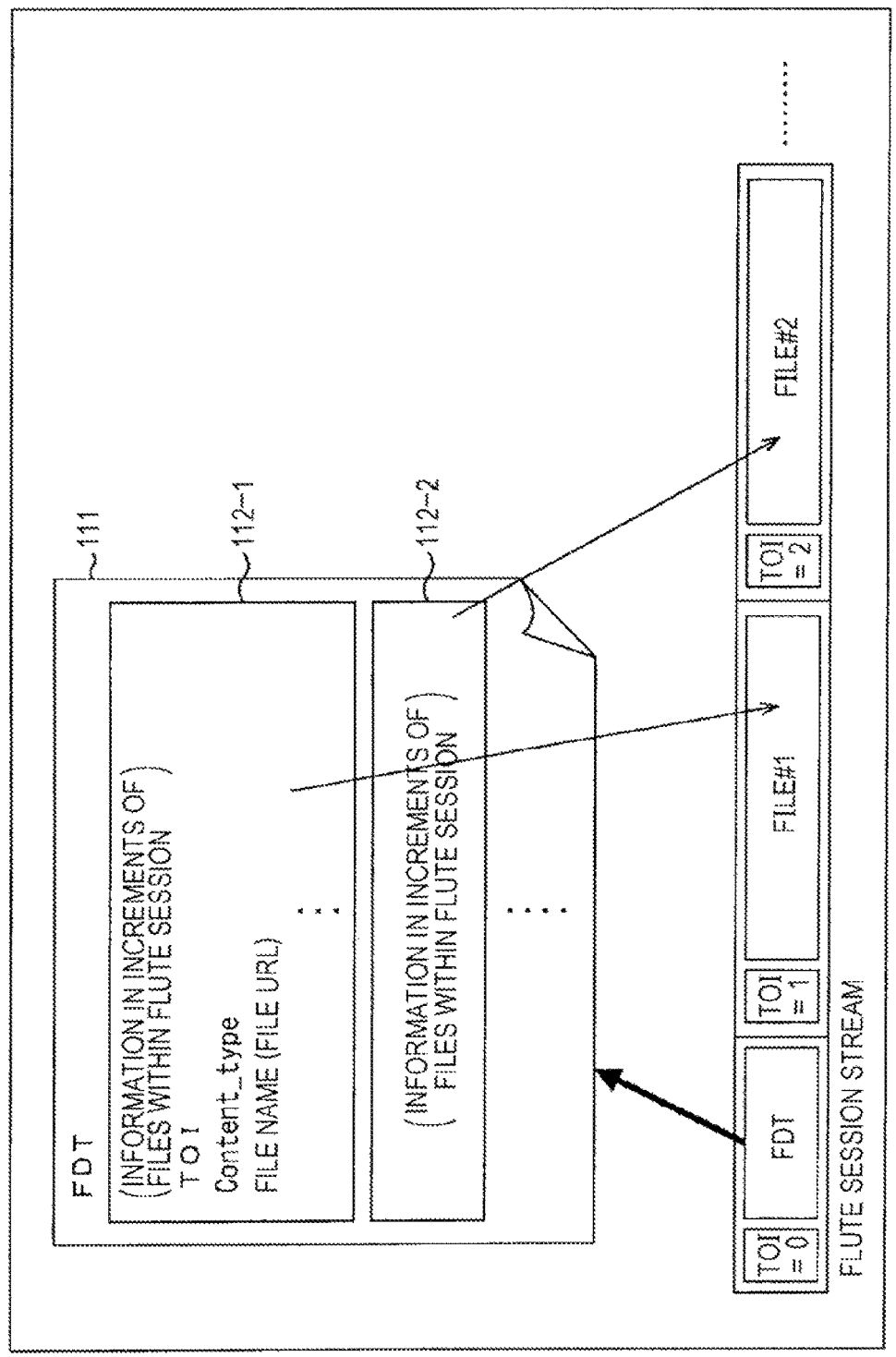
FIG. 9 is a diagram for describing the data structure of a content to be transmitted using a FLUTE session.

FIG. 9 is a diagram for describing the data structure of a content to be transmitted using FLUTE sessions. The data obtained with FLUTE sessions makes up a FLUTE session stream such as illustrated on the lower side of the drawing. The FLUTE session stream is, in reality, made up of multiple files divided into a predetermined size, and an identifier called "TOI (Transport Object Identifier)" is appended to each of the multiple files. According to this TOI, transmission sequence of each of the multiple files is arranged to be determined. With this example, a file of which the "TOI" is 0 is taken as "FDT", a file of which the "TOI" is 1 is taken as "FILE#1", and a file of which the "TOI" is 2 is taken as "FILE#2", and so on.

Of the multiple files making up the FLUTE session stream, the file of which the "TOI" is 0 is taken as an FDT (File Delivery Table). The FDT is a table where information relating to each of other files making up the FLUTE session stream is described. With the example in FIG. 9, a description region 112-1 that is information in increments of files within a FLUTE session, and a description region 112-2, and so on, that is information in increments of files within the FLUTE session are described in a description region 111 of the FDT.

With the description region 112-1 that is information in increments of files within a FLUTE session, "TOI", "content_type", "File name", and so forth are described. "TOI" is taken as information for identifying a file within a FLUTE session, and in reality, a predetermined numeric value is described therein. That is to say, the description region 112-1 that is information in increments of files within a FLUTE session is a region where information relating to a single file determined by this "TOI" is described.

With "content_type", information for determining a file format (the type of data) of a file determined by "TOI" is described. In the event that the corresponding file is, for example, a file of image data, "content_type" is taken as "video" or the like, and in the event that the corresponding file is a file of audio data, "content_type" is taken as "audio" or the like.

With "File name", the name of the corresponding file is described. "File name" may be described as a URL.

Similarly, with each of the description region 112-2, and so on, that is information in increments of files within a FLUTE session, information relating to a single file determined by "TOI" is described.

The data of a content to be transmitted with a predetermined FLUTE session is thus structured.

Next, Pull-type NRT broadcast reception and playback processing according to the reception device 41 will be described with reference to the flowchart in FIG. 10.

In step S11, the reception device 41 receives meta data, control information, and so forth, relating to an NRT broadcast.

At this time, for example, PSIP data is received. Note that, as described above, the PSIP data is taken as data that is structured so as to include the VCT, NRT-IT, or the like, and is periodically received by the reception device 41. Also, as described with reference to FIG. 7 and FIG. 8, the VCT is obtained, whereby information regarding each of the logical channels of the broadcast channels can be obtained. Further, the NRT-IT is obtained, whereby information regarding a content to be broadcasted with each logical channel can be obtained.

In step S12, the reception device 41 generates a list of contents that can be received with NRT broadcasting, based on the VCT and NRT-IT included in the PSIP data.

In step S13, the reception device 41 displays an ECG corresponding to the list generated in step S12 on the display. At this time, for example, an ECG image such as illustrated in FIG. 2 is displayed. Alternatively, in step S13, an EPG such as illustrated in FIG. 3 may be displayed.

In step S14, the reception device 41 accepts selection of a content by the user based on the ECG displayed in step S13. At this time, for example, an NRT broadcast content that the user intends to view and listen to is selected.

In step S15, the reception device 41 determines whether or not the broadcasting start point-in-time of the content accepted in the processing in step S14 has come, and awaits until determination is made that the broadcasting start point-in-time has come. In step S15, in the event that determination is made that the broadcasting start point-in-time has come, the processing proceeds to step S16.

In step S16, the reception device 41 downloads the content.

At this time, the tuning channel of the reception device 41 is set to a broadcast channel of the content accepted in step S14. Subsequently, based on the VCT received in step S11, the reception device 41 determines data to be transmitted with a logical channel where the corresponding content is broadcasted. Further, the reception device 41 determines, based on the NRT-IT received in step S11, a FLUTE session where this content is transmitted, and obtains each of files making up the FLUTE session stream thereof. Upon the broadcasting end point-in-time having come, obtaining of all of the files making up the FLUTE session stream is completed at the reception device 41, and thus, downloading of the content is completed.

Upon downloading being completed, the reception device 41 records data made up of the files obtained as described above in a recording medium as a single content. At this time, the meta data of this content included in the information received in step S11 is also recorded in a manner correlated with this content. Note that the meta data is made up of, for example, "Contents name", "Distribution schedule", "Contents expiration date", and so forth described in the NRT-IT.

Here, an example in the event that a single content is downloaded has been described, but for example, in the event that multiple contents have been selected in step S14, in step S15 and in step S16, these multiple contents are downloaded.

In step S17, the reception device 41 displays a list on the contents downloaded in the processing in step S16. At this time, for example, an image such as illustrated in FIG. 4 is generated and displayed on the display.

In step S18, the reception device 41 accepts selection of a content by the user based on the content list displayed in the processing in step S17. At this time, for example, of the NRT broadcast contents already recorded in the recording medium of the reception device 41, a content that the user intends to view and listen to is selected.

In step S19, the reception device 41 plays the content of which the selection was accepted in the processing in step S18. Thus, for example, as illustrated in FIG. 5, the image of the content is displayed on the display.

In this way, the Pull-type NRT broadcast reception and playback processing by the reception device 41 is executed.

Description has been made so far regarding Pull-type NRT broadcasting, but most of techniques for realizing such Pull-type NRT broadcasting have already been studied, for example, as the ATSC (Advanced Television Systems Committee). In this way, with regard to Pull-type NRT broadcasting, for example, specific assumption is made regarding how to realize among a broadcasting station and a reception device maker, and so forth. However, with regard to Push-type NRT broadcasting, no specific realization method has not been estimated.

Therefore, the present invention enables Push-type NRT broadcasting to be realized in a specific manner. As described above, with Push-type NRT broadcasting, a viewer performs registration for viewing and listening to a particular contents group, and then the reception device 41 automatically receives and accumulates these contents. Let us assume the following as specific Push-type NRT broadcasting.

For example, let us consider Push-type NRT broadcasting of a weather forecast. In this case, the user registers a Push-type NRT broadcasting service called "Weather forecast" beforehand. Then, the reception device 41 automatically receives and accumulates the content of a weather forecast program to be broadcasted with a predetermined broadcast channel. Now, let us say that the weather forecast program is, for example, a 5-minute program, and gives a forecast based on the latest weather information twice a day, and for example, the content accumulated in the reception device 41 is successively updated with the latest content.

Accordingly, the user can view and listen to the weather forecast based on the latest weather information all the time.

Also, for example, let us consider Push-type NRT broadcasting of a news clip. In this case, the user registers a Push-type NRT broadcasting service called "News Clip" beforehand. Then, the reception device 41 automatically receives and accumulates the content of a news program to be broadcasted with a predetermined broadcast channel.

Now, let us say that the news program is, for example, a 15-minute program, and gives news relating to the latest political and economic information, and for example, the content accumulated in the reception device 41 is successively updated with the latest content. Also, the content may be eliminated after being accumulated only for predetermined time. Also, for example, an arrangement may be made wherein the storage size (storage capacity) of the reception device 41 necessary for receiving presentation of "News Clip" service is specified, and with regard to the amount exceeding the storage size thereof, the content is overwritten and updated.

Presentation of such a service is received, whereby the user can view and listen to the news regarding the latest political and economic information all the time.

With Push-type NRT broadcasting, let us say that a Push-type NRT broadcasting service such as described above is provided, for example, by each of broadcasting stations or the like. Such a service may be free or charged for. Subsequently, the user of the reception device 41 selects a desired service and registered in the reception device 41.

With the present invention, let us say that a logical channel corresponding to each service of Push-type NRT broadcasting is provided. That is to say, in the event that there are three Push-type NRT broadcasting services, this means that there are three logical channels.

Figure 11:
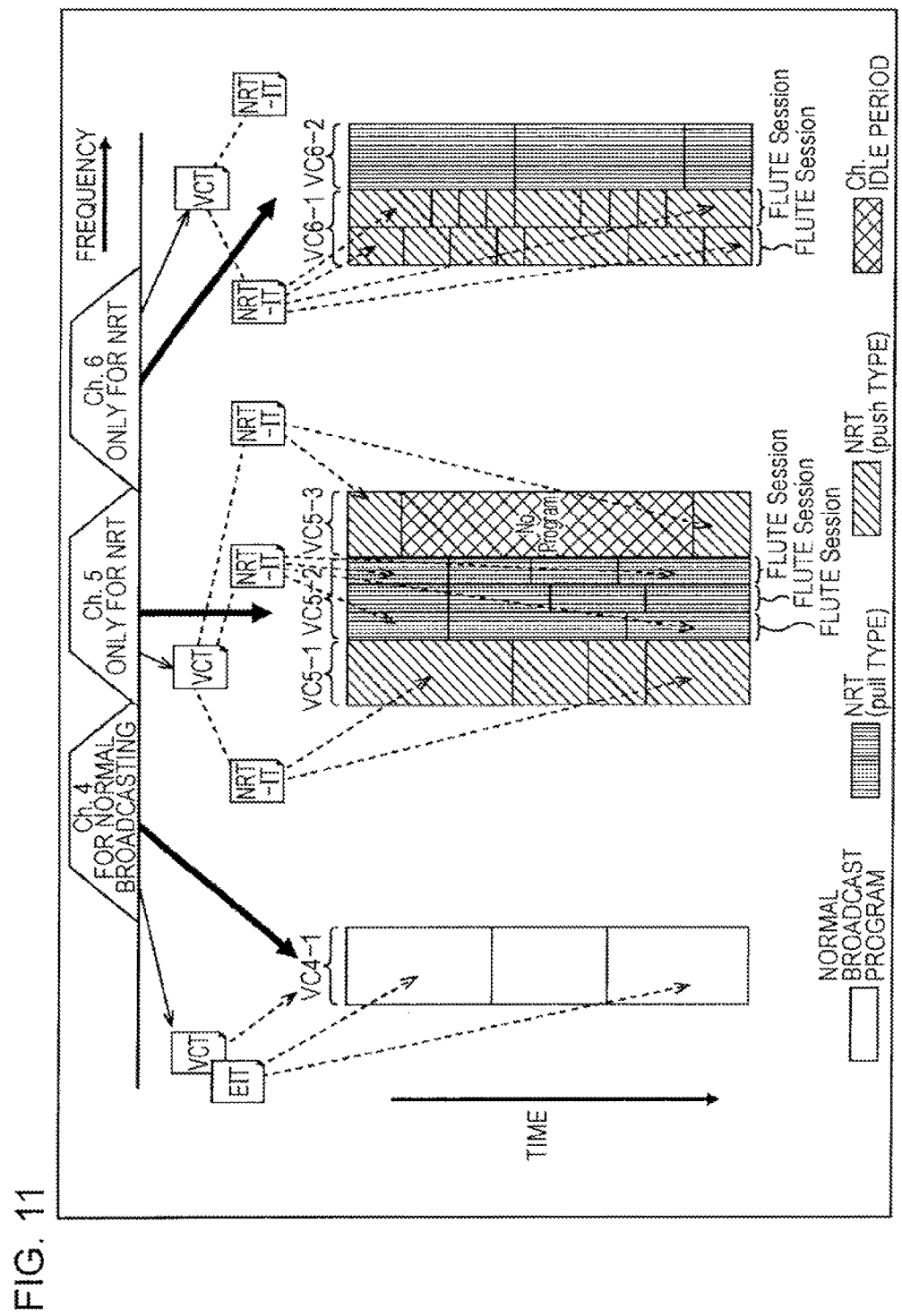
FIG. 11 is a diagram for describing an example of a Push-type NRT broadcast according to the present invention.

A Push-type NRT broadcast example according to the present invention will be described with reference to FIG. 11. FIG. 11 represents an example wherein normal broadcasting and NRT broadcasting are performed with three broadcast channels of "Ch. 4", "Ch. 5", and "Ch. 6". "Ch. 4" is taken as a broadcast channel of normal broadcasting, and "Ch. 5" and "Ch. 6" are taken as broadcast channels of NRT. Note that, with this drawing, the horizontal direction in the drawing represents the frequency of broadcast waves, and the vertical direction in the drawing represents time.

Also, the content such as the type of a content to be broadcasted with each channel is represented by hatching or the like in the drawing. With this example, a normal broadcast content, a Pull-type NRT broadcast content, a Push-type NRT broadcast content, and a broadcast idle period are represented by hatching or the like in the drawing.

With the example in FIG. 11, "Ch. 5" is multiplexed in three logical channels. With this example, the broadcast channel "Ch. 5" is multiplexed in a logical channel "VC5-1", a logical channel "VC5-2", and a logical channel "VC5-3". Note that, in the drawing, each of rectangular frames displayed in each of the logical channels "VC5-1" through "VC5-3" represents the broadcast time zone of each content.

The logical channel "VC5-1" is a logical channel assigned to a single Push-type NRT broadcasting service. The logical channel "VC5-2" is a logical channel assigned to a Pull-type NRT broadcasting service. The logical channel "VC5-3" is a logical channel assigned to another Push-type NRT broadcasting service. Also, with this example, with the logical channel "VC5-3", a time zone serving as channel idle is included.

With the logical channel "VC5-2", three FLUTE sessions are provided. That is to say, with a Pull-type NRT broadcast to be broadcasted with the logical channel "VC5-2", three contents can be can be broadcasted at the same time.

Also, with the example in FIG. 11, "Ch. 6" is multiplexed into two logical channels. With this example, broadcast channel "Ch. 6" is multiplexed in a logical channel "VC6-1", and a logical channel "VC6-2". Note that, in the drawing, each of rectangular frames displayed in each of the logical channels "VC6-1" through "VC6-2" represents the broadcast time zone of each content.

The logical channel "VC6-1" is a logical channel assigned to a single Push-type NRT broadcasting service. The logical channel "VC6-2" is a logical channel assigned to a Pull-type NRT broadcasting service.

With the logical channel "VC6-1", two FLUTE sessions are provided. That is to say, with a Push-type NRT broadcasting service to be provided with the logical channel "VC6-1", two contents can be can be broadcasted at the same time.

In this case, the PSIP data periodically transmitted with the broadcast channel "Ch. 5" includes one VCT where "TS_id" for identifying a transport stream of the physical channel of "Ch. 5". Also, the PSIP data thereof also includes three NRT-ITs where "Source_id" for identifying the logical channel "VC5-1", logical channel "VC5-2", and logical channel "VC5-3" are described, respectively.

Similarly, the PSIP data periodically transmitted with the broadcast channel "Ch. 6" includes one VCT where "TS_id" for identifying a transport stream of the physical channel of "Ch. 6". Also, the PSIP data thereof also includes two NRT-ITs where "Source_id" for identifying the logical channel "VC6-1", and logical channel "VC6-2" are described, respectively.

For example, the logical channel "VC5-1" is assigned to "News Clip" of an XX broadcast station, and the logical channel "VC5-3" is assigned to "Weather forecast" of an XX broadcast station. The logical channel "VC6-1" is assigned to "News Clip" of an XX broadcast station.

Also, with the example in FIG. 11, "Ch. 4" is not divided into multiple logical channels. The normal broadcast logical channel "VC4-1" is substantially the same as the physical channel.

As described above, the reception device 41 periodically receives the PSIP data, whereby data to be transmitted with each logical channel can be identified based on the VCT. Accordingly, for example, the reception device 41 in which "Weather forecast" service of XX broadcast station is registered automatically downloads all of the contents to be transmitted at the logical channel "VC5-3".

On the other hand, in the event receiving a content (program) transmitted as a normal broadcast, the content is determined based on the VCT and EIT (Event Information Table).

In this way, according to the present invention, contents can be broadcasted with Push-type NRT broadcasting, Pull-type NRT broadcasting, and normal broadcasting.

With Push-type NRT broadcasting, an individual content selected by the user is not provided, but a content is unilaterally provided to the user, and accordingly, it has been difficult to realize Push-type NRT broadcasting with the same broadcasting system as the Pull-type NRT broadcasting and normal broadcasting. Therefore, with the present invention, the reception device 41 in which Push-type NRT broadcasting service is registered is configured so as to automatically download all of the contents to be transmitted with a logical channel corresponding to the service thereof. Thus, Push-type NRT broadcasting can be realized with the same broadcasting system as the Pull-type NRT broadcasting and normal broadcasting.

Figure 12:
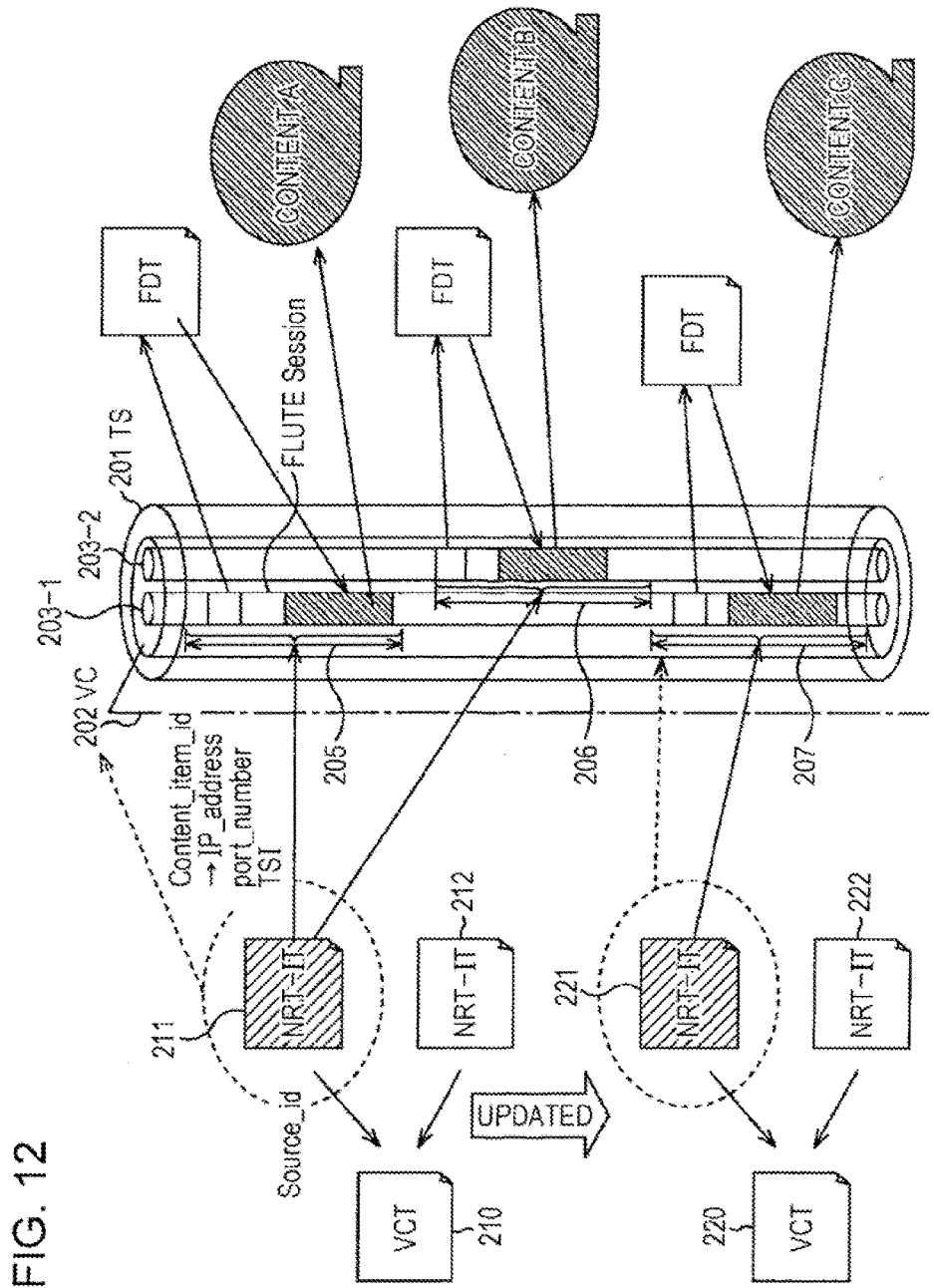
FIG. 12 is a diagram for describing a method wherein data making up a content is received by a reception device 41 with an NRT broadcast.

FIG. 12 is a diagram for describing a method for the reception device 41 receiving data making up a content with NRT broadcasting. In this drawing, a transmission band of a transport stream (TS) corresponding to one broadcast channel is illustrated with a cylinder 201. Now, let us say that the vertical direction in the drawing represents time.

Also, in FIG. 12, a logical channel (virtual channel: VC) multiplexed in the transport stream of the cylinder 201 is illustrated with a cylinder 202. Note that, with this example, the number of the logical channels (virtual channel: VC) multiplexed in the transport stream is one, but in reality, multiple logical channels may be multiplexed.

Further, in FIG. 12, FLUTE sessions included in the logical channel corresponding to the cylinder 202 are illustrated with a cylinder 203-1 and a cylinder 203-2. That is to say, the two FLUTE sessions are included in the logical channel corresponding to the cylinder 202. Data making up a content to be received and accumulated (recorded) by the reception device 41 is transmitted as a file of the FLUTE sessions of the cylinder 203-1 and cylinder 203-2.

Now, let us say that the reception device 41 is set so as to receive a content A through a content C to be broadcasted with the logical channel corresponding to the cylinder 202 of the broadcast channel of the transport stream corresponding to the cylinder 201, which are NRT broadcast contents.

As described above, the reception device 41 periodically receives the PSIP data, and accordingly can periodically obtain the VCT and NRT-IT. Let us say that, first, a VCT 210, an NRT-IT 211, and an NRT-IT 212 have been received. The reception device 41 references description of the VCT 210, whereby "source_id" for identifying the logical channel where the content A and content B to be received and accumulated are transmitted can be determined. Subsequently, base on "source_id" thereof, the reception device 41 can determine the NRT-IT 211 regarding this logical channel.

Note that the NRT-IT 212 is an NRT-IT corresponding to another logical channel that is not illustrated in the drawing.

Further, the reception device 41 determines, of the description of the NRT-IT 211 thereof, a description region in increments of contents where information regarding the content to be received and accumulated is described. Now, with the example in FIG. 12, let us say that information regarding the content to be broadcasted at a time zone illustrated with an arrow 205 of the FLUTE session illustrated with a cylinder 203-1 is described in the first received NRT-IT 211. Also, let us say that information regarding the content at a time zone illustrated with an arrow 206 of the FLUTE session illustrated with a cylinder 203-2 is also described in the first received NRT-IT 211.

In this case, based on "source_id" of the content A and content B, a description region in increments of contents where information regarding the contents thereof is described is determined. Subsequently, the reception device 41 references the determined description region in increments of contents to determine an identifier "TSI" for determining an IP address, a UDP port number, and a FLUTE session included in "Contents transmission location information".

Subsequently, the reception device 41 determines a file of the FLUTE session illustrated with the cylinder 203-1, and extracts an FDT. Subsequently, the reception device 41 obtains, base on the FDT, each of files of data making up the content A, thereby receiving and accumulating the content A.

Also, similarly, the reception device 41 determines a file of the FLUTE session illustrated with the cylinder 203-2, and extracts an FDT. Subsequently, the reception device 41 obtains, base on the FDT, each of files of data making up the content B, thereby receiving and accumulating the content B.

The reception device 41 periodically receives the PSIP data, whereby the VCT and NRT-IT are updated. In this case, let us say that a VCT 220, and an NRT-IT 221 and NRT-IT 222 have newly been received and updated. Let us say that information regarding a content to be broadcasted at a time zone illustrated with an arrow 207 of the FLUTE session illustrated with the cylinder 203-1 is described in the updated NRT-IT 221.

The reception device 41 can determine, in the same way as with the above case, "source_id" for identifying a logical channel where the content C to be received and accumulated is transmitted by referencing the description of the VCT 220. Subsequently, the reception device 41 can determine, based on "source_id" thereof, the NRT-IT 221 regarding this logical channel.

Note that the NRT-IT 222 is an NRT-IT corresponding to another logical channel not illustrated in the drawing.

In this case, based on the "content_item_id" of the content C, a description region in increments of contents where the information thereof regarding the content is described is determined. Subsequently, the reception device 41 references the determined description region in increments of contents to determine an identifier "TSI" for determining an IP address, a UDP port number, and a FLUTE session included in "Contents transmission location information".

Subsequently, the reception device 41 determines a file of the FLUTE session illustrated with the cylinder 203-1, and extracts an FDT. Subsequently, the reception device 41 obtains, base on the FDT, each of files of data making up the content C, thereby receiving and accumulating the content C.

Next, description will be made regarding an example wherein a Push-type NRT broadcast content is accumulated at the reception device 41, with reference to FIG. 13. In this drawing, in the same way as with the case of FIG. 12, a transport stream (TS), a logical channel (virtual channel: VC), and a FLUTE session are illustrated with a cylinder. Now, in this drawing, let us say that the horizontal direction in the drawing represents time.

As described above, with the reception device 41, in the event that a predetermined Push-type NRT broadcasting service has been registered, all of the contents to be transmitted with a logical channel assigned to this service are automatically received and accumulated by the reception device 41.

Figure 13:
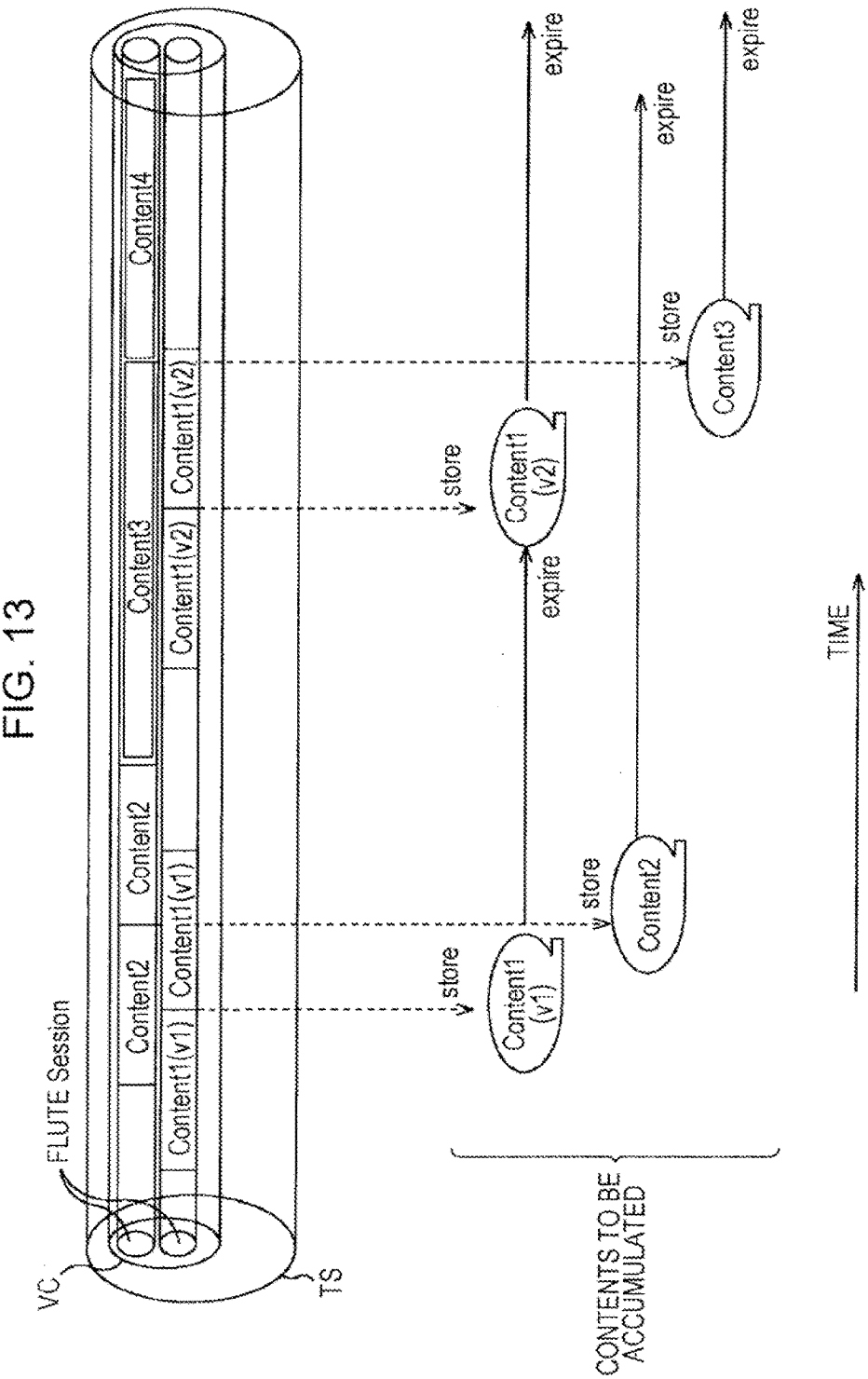
FIG. 13 describes an example wherein the content of a Push-type NRT broadcast is accumulated at the reception device 41.

With the example in FIG. 13, "content 1" that is a content to be transmitted with one FLUTE session, "content 2" through "content 4" that are contents to be transmitted with another FLUTE session are received and accumulated. "content 1" is a content to which a version is appended, whereby the latest content is arranged to be overwritten all the time. "content 2" through "content 4" are accumulated until point-in-time specified as "Expiration date" elapses, and upon point-in-time specified as "Expiration date" elapsing, "content 2" through "content 4" are arranged to be eliminated.

With the example in FIG. 13, first, a first version of the content "content 1" is received and accumulated. Note that, in the drawing, the first version of the content "content 1" is represented such as "content 1 (v1)". "content 1" is arranged so that the same version is repeatedly broadcasted. Now, let us say that the reception device 41 has received and accumulated the first broadcast. In this case, the reception device 41 is configured so as not to receive nor accumulate the second broadcast.

Subsequently, upon the second version of the content "content 1" being broadcasted, the reception device 41 receives and accumulates the content thereof. That is to say, the already accumulated (recorded) "content 1 (V1)" is overwritten with "content 1 (V2)". Here as well, the reception device 41 is configured to receive and accumulate the second broadcast assuming that the first broadcast has been received and accumulated.

Also, during reception of "content 1 (V1)", the reception device 41 starts reception of "content 2", and upon reception of "content 2" being completed, accumulates "content 2". "content 2" is arranged so that the same broadcast is repeatedly broadcasted twice. Now, let us say that the reception device 41 has received and accumulated the first broadcast. In this case, the reception device 41 is configured so as to receive and accumulate the second broadcast.

Similarly, the reception device 41 receives and accumulates "content 3". Subsequently, further, the reception device 41 also receives and accumulates "content 4".

As described above, "content 2" and "content 3" are accumulated until point-in-time specified as "Expiration date" elapses, and upon point-in-time specified as "Expiration date" elapsing, "content 2" and "content 3" are arranged to be eliminated. In FIG. 13, point-in-time specified as "Expiration date" is described as "expire".

Note that elimination of a content may be performed at point-in-time specified as "Expiration date", or contents of which "Expiration dates" have elapsed may be eliminated together with a predetermined time interval, for example. Further, for example, in the event that display of a list of accumulated contents has been instructed, contents of which "Expiration dates" have elapsed may be eliminated together.

In this way, a Push-type NRT broadcast content may successively be updated in response to its version, or may also be, in the same way as with the case of Pull-type NRT broadcasting, accumulated until expiration date elapses.

As described above, with the present invention, one service of Push-type NRT broadcasting is assigned to one logical channel. Subsequently, with the present invention, information necessary for realizing Push-type NRT broadcasting is disposed in the position of a broadcast signal where information in increments of logical channels can be stored. Specifically, description of information necessary for realizing Push-type NRT broadcasting is arranged to be added to the description regions 72-1, 72-2, and so on in increments of channels of the VCT described with reference to FIG. 7. Alternatively, description of information necessary for realizing Push-type NRT broadcasting is arranged to be added to a description regions 91 of the NRT-IT described with reference to FIG. 8.

Figure 14:
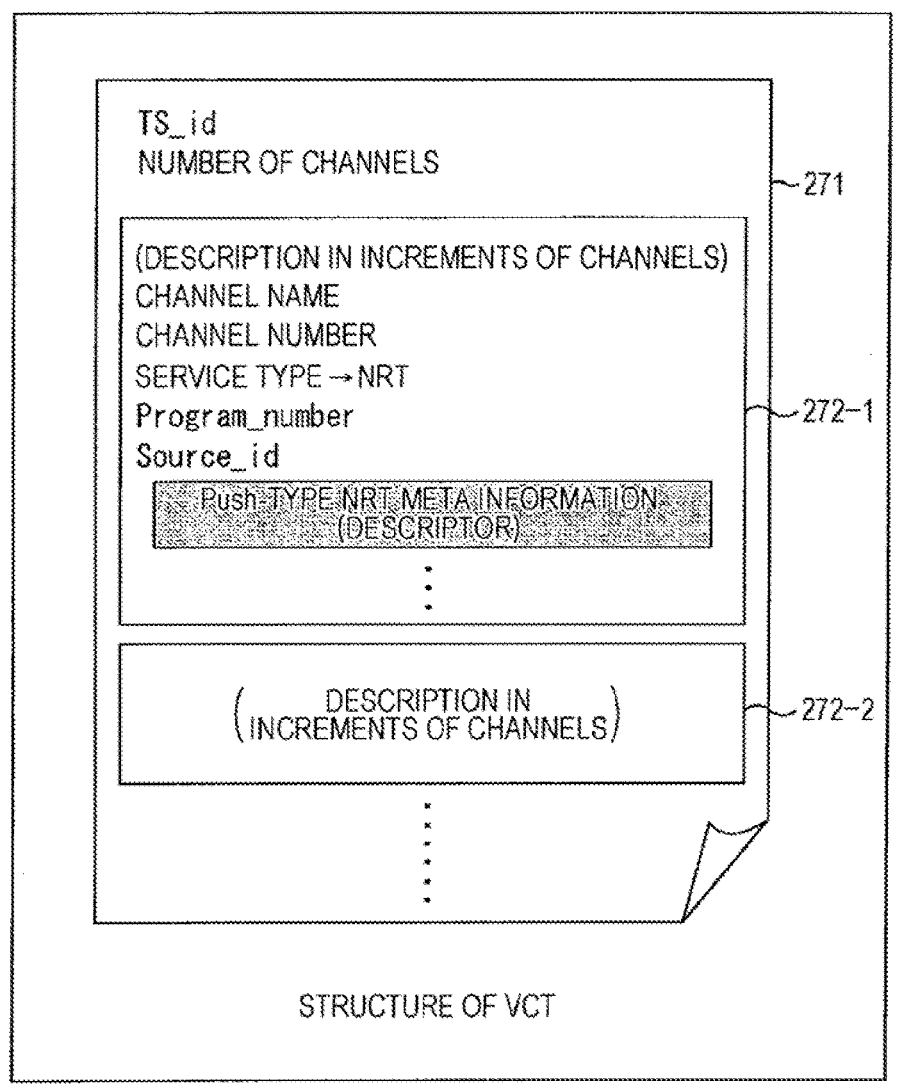
FIG. 14 is a diagram illustrating another structure example of the VCT.

In the event that description of information necessary for realizing Push-type NRT broadcasting is arranged to be added to the description region in increments of channels of the VCT, the VCT is structured as illustrated in FIG. 14. FIG. 14 is a diagram illustrating an example of the VCT used for the present invention.

With the example in this drawing, "TS_id", "Number of channels", description region 272-1 in increments of channels, description region 272-2 in increments of channels, and so on are described in the description region 271 of the VCT.

"TS_id" is taken as an ID for identifying a transport stream, and in reality, a predetermined character or numeric value or the like is described. Thus, it can be identified which physical channel (broadcast channel) the VCT is included. "Number of channels" is described as a numeric value representing the number of logical channels included in the physical channel determined by "TS_id".

Information regarding one logical channel is described in each of the description region 272-1 in increments of channels, description region 272-2 in increments of channels, and so on. This description region is provided according to the numeric value described in the above "Number of channels". For example, in the event that the number of logical channels included this physical channel is 3, a numeric value "3" is described in "Number of channels". Thus, the description region 272-1 in increments of channels, description region 272-2 in increments of channels, and description region 272-3 in increments of channels are described.

"Channel name", "Channel Number", "Service type", "Program_number", "Source_id", "Push-type NRT meta information", and so on are described in the description region 272-1 in increments of channels. With "Channel name" and "Channel Number", predetermined characters and numeric value representing these are described, respectively. For example, "Channel name" of the description region 272-1 in increments of channels is described as "XX station NRT first channel" or the like, and Channel number is described as "5-1" or the like. Also, "Channel name" of the description region 272-1 in increments of channels is described as "XX station NRT second channel" or the like, and Channel number is described as "5-2" or the like.

With "Service type", information for identifying whether the corresponding logical channel is a logical channel corresponding to normal broadcasting, or a logical channel corresponding to NRT broadcasting is described. For example, in the event that the logical channel corresponding to the description region 272-1 in increments of channels is an NRT broadcast logical channel, "Service type" is described as "NRT".

"Source_id" is taken as an ID for identifying the corresponding logical channel, and in reality, a predetermined character or numeric value or the like is described. That is to say, the description region 272-1 in increments of channels is a region where information regarding one logical channel determined by "Source_id" is described.

"Push-type NRT meta information" is taken as information necessary for realizing Push-type NRT broadcasting, and the following information is described, for example.

With "Push-type NRT meta information", information representing that the corresponding logical channel is a logical channel corresponding to a Push-type NRT broadcasting service, and the service name of this Push-type NRT broadcasting service are described. Further, the outline of this Push-type NRT broadcasting service may be described. Also, with "Push-type NRT meta information", a storage size (storage capacity) necessary for receiving presentation of this Push-type NRT broadcasting service, and the minimum interval (temporal interval) of contents distribution in this Push-type NRT broadcasting service are described. Further, with "Push-type NRT meta information", for example, in the event that this Push-type NRT broadcasting service is provided for pay, a URL for connecting to an Internet server for performing various types of registration prior to processing such as accounting or the like, and so forth are described.

Similarly, information regarding one logical channel determined by "Source_id" is also described in each of the description region 272-2 in increments of channels, and so on.

The VCT according to the present invention is thus structured.

Figure 15:
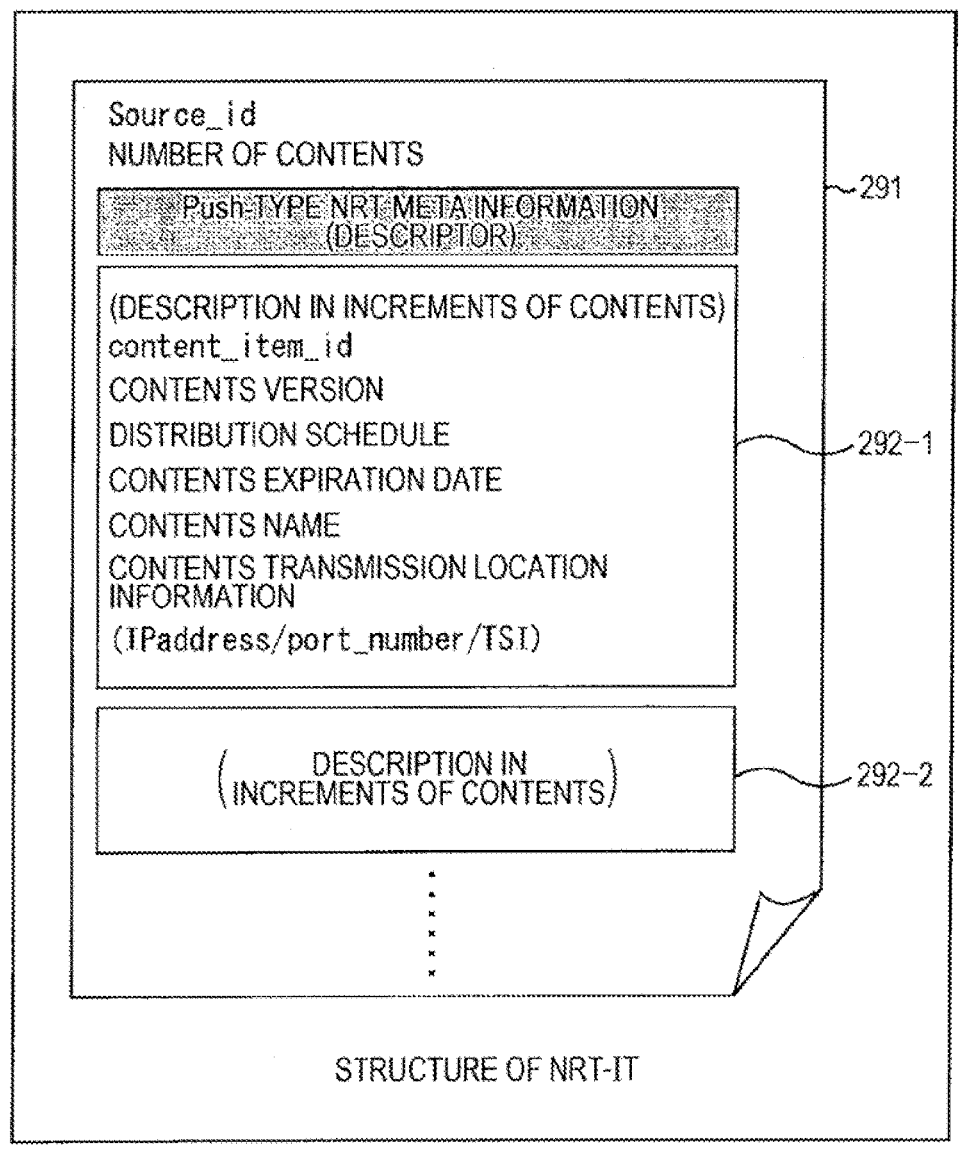
FIG. 15 is a diagram illustrating another structure example of the NRT-IT.

In the event that description of information necessary for realizing Push-type NRT broadcasting is added to the description region 91 of the NRT-IT, the NRT-IT is structured as illustrated in FIG. 15. FIG. 15 is a diagram illustrating an example of the NRT-IT used for the present invention.

With the example in this drawing, "Source_id", "Number of contents", "Push-type NRT meta information", description region 292-1 in increments of contents, description region 292-2 in increments of contents, and so on are described in the description region 91 of the NRT-IT.

"Source_id" is the same as described above with reference to FIG. 14, taken as an ID for identifying a logical channel, and in reality, a predetermined character or numeric value or the like is described therein. Thus, one of the logical channels described in the description region 272-1 in increments of channels, description region 272-2 in increments of channels, and so on can be correlated with the corresponding NRT-IT. "Number of contents" is described as a numeric value representing the number of contents to be broadcasted at a predetermined unit time with a logical channel determined by "Source_id", or the like.

"Push-type NRT meta information" is taken as information necessary for realizing Push-type NRT broadcasting, and the same information as described above with reference to FIG. 14 is described therein.

Specifically, with "Push-type NRT meta information", information representing that the corresponding logical channel is a logical channel corresponding to the Push-type NRT broadcasting service, and the service name of this Push-type NRT broadcasting service are described. Further, the outline of this Push-type NRT broadcasting service, and so forth may be described. Also, with "Push-type NRT meta information", a storage size (storage capacity) necessary for receiving presentation of this Push-type NRT broadcasting service, and the minimum interval (temporal interval) of contents distribution in this Push-type NRT broadcasting service are described. Further, with "Push-type NRT meta information", for example, in the event that this Push-type NRT broadcasting service is provided for pay, a URL for connecting to an Internet server for performing various types of registration prior to processing such as accounting or the like, and so forth are described.

Information regarding one content is described in each of the description region 292-1 in increments of contents, description region 292-2 in increments of contents, and so on. These described regions are provided according to a numeric value described in the above "Number of contents". For example, in the event that the number of contents to be broadcasted at unit time with the corresponding logical channel is 5, a numeric value "5" is described in "Number of contents". Subsequently, the description region 292-1 in increments of contents, description region 292-2 in increments of contents, and so on through description region 292-5 in increments of channels are described.

"content_item_id", "Contents version", "Distribution schedule", "Contents expiration date", "Contents name", "Contents transmission location information", and so on are described in the description region 292-1 in increments of contents.

"content_item_id" is taken as an ID for identifying the corresponding content, and in reality, a predetermined character, a numeric value, or the like is described. That is to say, the description region 292-1 in increments of contents is a region where information relating to a single content determined by this "content_item_id" is described.

With "Contents version", information representing the version of the content thereof is described. For example, in the event that there are the first version (content 1 (V1)) and second version (content 1 (V2)) contents described above with reference to FIG. 13, "content 1 (V1)" and "content 2 (V2)" are the same in "content_item_id". Therefore, "Contents version" is described as information for identifying contents to which the same "content_item_id" is appended, but of which the versions differ.

With "Distribution schedule", information representing the broadcasting start point-in-time and broadcasting end point-in-time of the corresponding content is described. Note that this content is an NRT broadcast content, and thus, according to the broadcasting start point-in-time and broadcasting end point-in-time, time when this content can be viewed and listened to is not represented, but point-in-time when downloading of this content is to be started, and point-in-time when downloading of the content ends are represented.

With "Contents expiration date", information for determining point-in-time serving as the expiration date of the corresponding content is described. A content of which the expiration date has elapsed is arranged to be prevented from being played by being eliminated from the recording medium of the reception device 41, or the like.

With "Contents name", characters, such as the tile of the corresponding content, or the like, are described.

With "Contents transmission location information", an IP address, a UDP port number, and an identifier "TSI (Transport Session Identifier)" for determining a FLUTE session, described above with reference to FIG. 6, are described. This "Contents transmission location information" is determined, whereby, of data to be transmitted with the logical channel determined by "Source_id", the data of a single content data determined by "content_item_id" can be identified.

Similarly, information relating to a single content determined by "content_item_id" is also described in each of the description region 292-2 in increments of contents, and so on.

The NRT-IT according to the present invention is thus structured.

As described above, information necessary for realizing Push-type NRT broadcasting may be described in the VCT, or may be described in the NRT-IT. Hereafter, description will be made regarding an example in the event that information necessary for realizing Push-type NRT broadcasting is described in the NRT-IT.

An example of the syntax of the NRT-IT according to the present invention will be described with reference to FIG. 16 and FIG. 17. Note that FIG. 16 and FIG. 17 are a continuous syntax, where the first row "for (j=0; j< . . . {" in FIG. 17 is continued as the next row of the last row "num_item_in_section" in FIG. 16.

Figure 17:
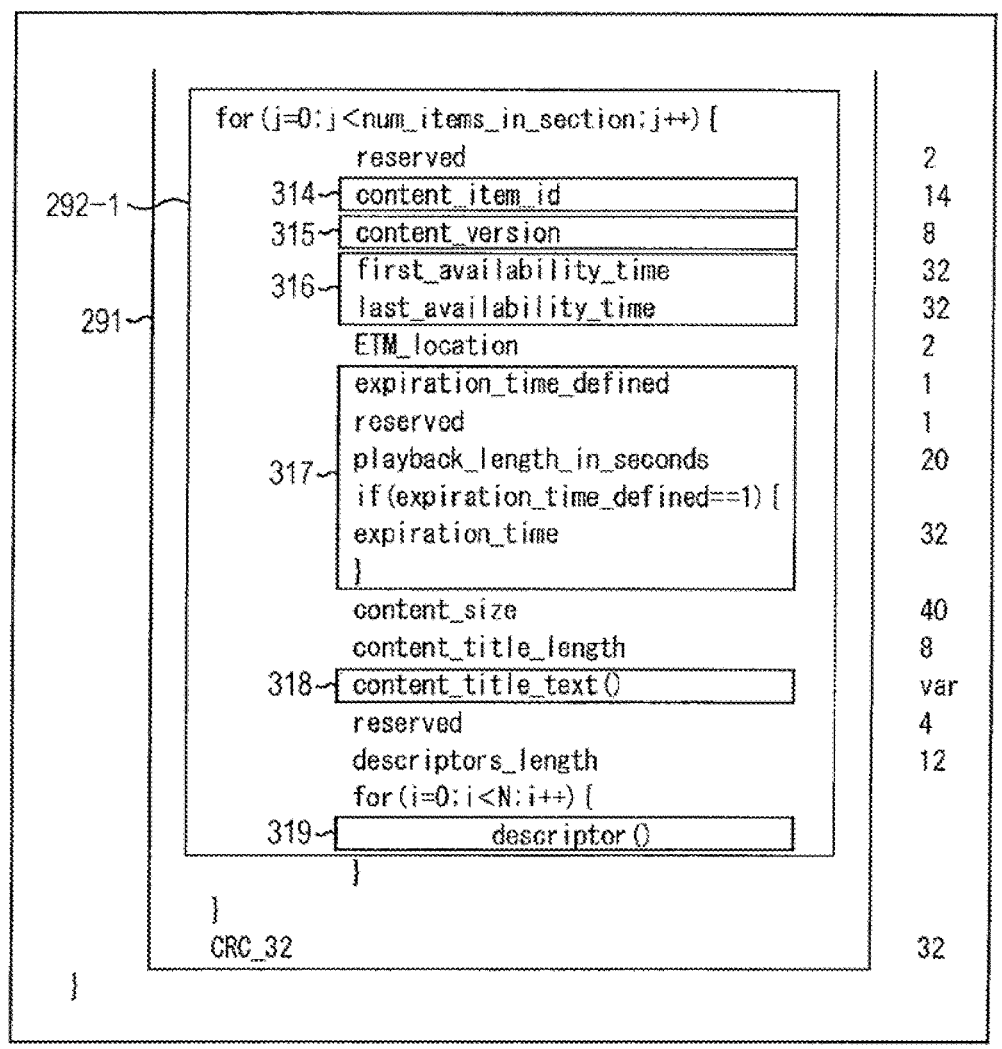
FIG. 17 is a diagram for describing the example of the syntax of the NRT-IT in FIG. 15.

A range illustrated with a frame 291 in FIG. 16 and FIG. 17 corresponds to the description region 291 in FIG. 15. Also, a range illustrated with a frame 292-1 in FIG. 17 corresponds to the description region 292-1 in increments of contents in FIG. 15. Note that, with the example in FIG. 16 and FIG. 17, in order to simplify description, the number of description regions in increments of contents is determined to be one. With the syntax illustrated in the drawings, each of descriptors to be described in the corresponding description regions is defined along with the number of bits (No. of Bits).

In FIG. 16, an 8-bit descriptor described in a region 310 is taken as an ID for determining the type of this information, and a predetermined value is stored therein. According to this descriptor, determination is made that this information is the NRT-IT.

In FIG. 16, information illustrated as a 16-bit descriptor described in a region 311 corresponds to "Source_id" described with reference to FIG. 15.

In FIG. 16, information illustrated as a descriptor described in a region 312 corresponds to "Push-type NRT meta information" described with reference to FIG. 15. Note that this detail will be described later with reference to FIG. 18.

In FIG. 16, information illustrated as an 8-bit descriptor described in a region 313 corresponds to "Number of contents" described with reference to FIG. 15.

In FIG. 17, information illustrated as a 14-bit descriptor described in a region 314 corresponds to "content_item_id" described with reference to FIG. 15.

In FIG. 17, information illustrated as an 8-bit descriptor described in a region 315 corresponds to "Contents version" described with reference to FIG. 15.

In FIG. 17, information illustrated as a descriptor described in a region 316 corresponds to "Distribution schedule" described with reference to FIG. 15.

In FIG. 17, information illustrated as a descriptor described in a region 317 corresponds to "Contents expiration date" described with reference to FIG. 15.

In FIG. 17, information illustrated as a descriptor described in a region 318 corresponds to "Contents name" described with reference to FIG. 15.

In FIG. 17, information illustrated as a descriptor described in a region 319 corresponds to "Contents transmission location information" described with reference to FIG. 15.

FIG. 18 is a diagram illustrating an example of the syntax of "Push-type NRT meta information" to be described in the region 312 in FIG. 16.

Note that, in the event that information necessary for realizing Push-type NRT broadcasting is arranged to be described in the NRT-IT, this drawing is an example of the syntax of "Push-type NRT meta information" to be described in the region 312 in FIG. 16. On the other hand, in the event that information necessary for realizing Push-type NRT broadcasting is arranged to be described in the VCT, this drawing is an example of the syntax of "Push-type NRT meta information" to be described in the description region 272-1 in increments of channels, description region 272-2 in increments of channels, and so on in FIG. 14.

With the syntax illustrated in this drawing, each of descriptors to be described in the corresponding description region is defined along with the number of bits (No. of Bits).

According to an 8-bit descriptor described in a region 341 in FIG. 18, it is represented that the corresponding channel is a logical channel corresponding to the Push-type NRT broadcasting service.

According to a descriptor described in a region 342 in FIG. 18, the service name of the corresponding Push-type NRT broadcasting service is described.

According to a descriptor described in a region 343 in FIG. 18, the minimum interval (temporal interval) of contents distribution in the corresponding Push-type NRT broadcasting service is represented.

According to a descriptor described in a region 344 in FIG. 18, a storage size (capacity size) necessary for receiving presentation of the corresponding Push-type NRT broadcasting service is represented.

In the event that the corresponding Push-type NRT broadcasting service is provided for pay, according to a descriptor described in a region 345 in FIG. 18, a URL for connecting to an Internet server for performing various types of registration prior to processing such as accounting or the like is described.

Figure 19:
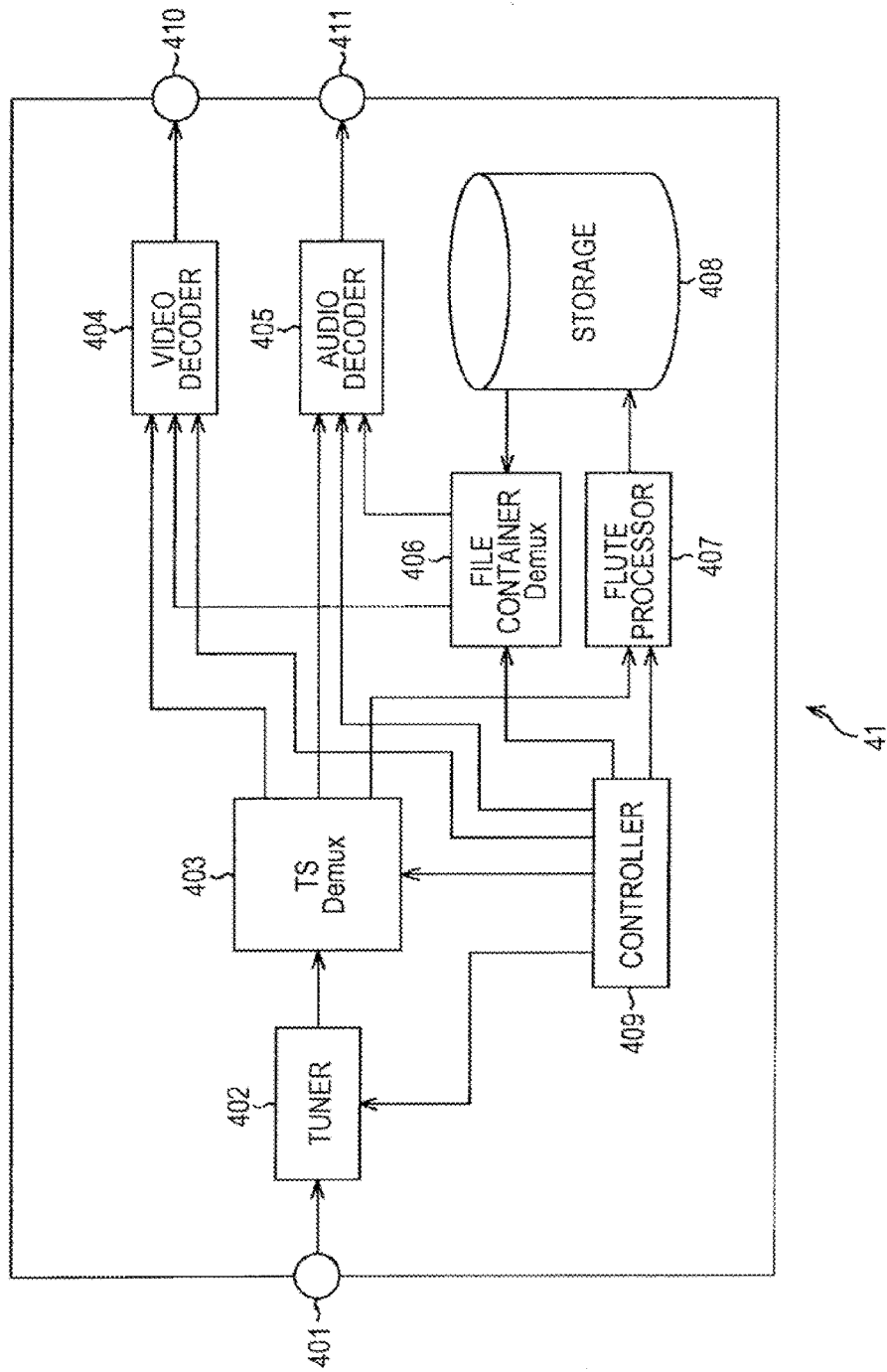
FIG. 19 is a block diagram illustrating a configuration example of the reception device in FIG. 1.

FIG. 19 is a block diagram illustrating a configuration example of the reception device 41 in FIG. 1. In this drawing, a signal based on broadcast waves received via an unshown antenna or the like is arranged to be supplied to a terminal 401.

A tuner 402 is configured to extract a signal corresponding to a predetermined broadcast channel from the signal output from the terminal 401, and to output to a TSDemux 403 as a digital signal, based on the control of a controller 409.

The TSDemux 403 generates transport packets from the digital signal output from the tuner 402. Subsequently, the TSDemux 403 extracts transport packets to which a predetermined identifier is appended, and outputs the transport packets thereof as the data of a predetermined logical channel, based on the control of the controller 409.

In the event that the corresponding logical channel is a normal broadcast logical channel, the TSDemux 403 outputs the data of this logical channel to a video decoder 404 or audio decoder 405.

The video decoder 404 and audio decoder 405 are configured to decode encoded image data and encoded audio data, and to output image signals and audio signals to a terminal 401 and a terminal 411, respectively.

The terminal 410 and terminal 411 are connected to a display and a speaker made up of a television receiver or the like, for example.

On the other hand, in the event that the corresponding logical channel is an NRT broadcast logical channel, the TSDemux 403 outputs the data of this logical channel to a FLUTE processor 407.

The FLUTE processor 407 obtains files determined with the FLUTE session out of the data supplied as the data of this logical channel, and records data made up of these files in a storage 408 as content data. Note that meta data generated at the controller 409 may be recorded in the storage 408 in a manner correlated with the content data, for example.

The storage 408 is, for example, a recording medium such as an HDD (Hard Disk Drive) or the like, and records content data, and other than this, information necessary at the reception device 41.

A file container Demux 406 is configured to read out content data to be played from the storage 408, and to output to the video decoder 404 and audio decoder 405, based on the control of the controller 409. For example, in the event that an NRT broadcast content recorded in the storage 408 is played, the file container Demux 406 is configured to read out the data of the content thereof from the storage 408 based on the control of the controller 409.

The controller 409 is configured, for example, so as to include a processor, memory, and so forth, and controls each unit of the reception device 41. The controller 409 accepts, for example, the signals of a tuning channel command, specification of a content to be downloaded, specification of a content to be played, and so forth by the user, which are supplied via an unshown remote controller or the like. Also, the controller 409 generates, for example, display data of a GUI (Graphical User Interface) according to need, and outputs to the terminal 410 via the video decoder 404.

Figure 20:
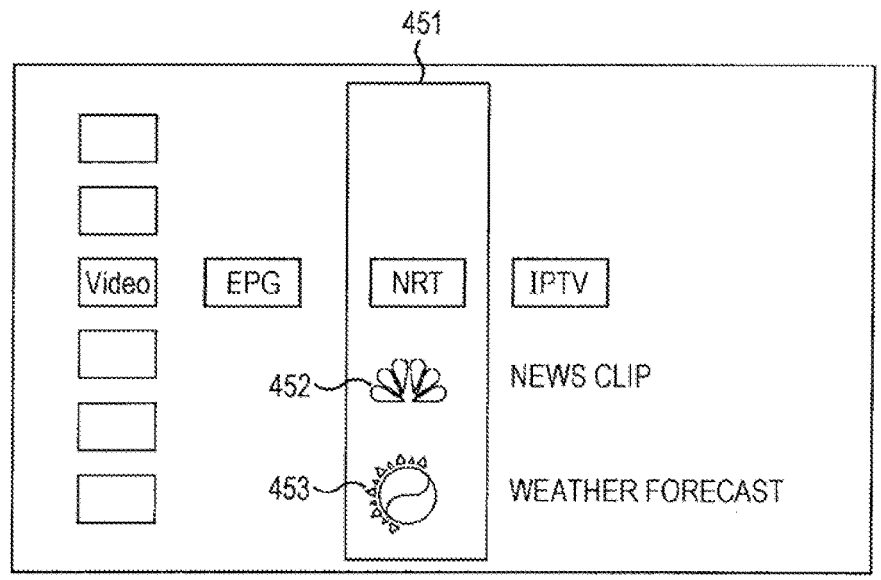
FIG. 20 is a diagram illustrating an image example displayed on the screen of a display.

FIG. 20 is a diagram illustrating an example of images displayed on the screen of the display connected to the reception device 41.

The image illustrated in this drawing is taken as a GUI for displaying a list of the Push-type NRT broadcasting services by the reception device 41. The example in FIG. 20 illustrates a state in which a GUI component displayed as "NRT" is selected by a cursor 451. Here, an icon 452 and an icon 453 are displayed on the lower side in the drawing of the GUI component displayed as "NRT".

"News Clip" is displayed on the right side in the drawing of the icon 452, and the icon 452 is arranged to be an icon corresponding to a Push-type NRT broadcasting service "News Clip". Also, "Weather Forecast" is displayed on the right side in the drawing of the icon 453, and the icon 453 is arranged to be an icon corresponding to a Push-type NRT broadcasting service "Weather Forecast".

Figure 21:
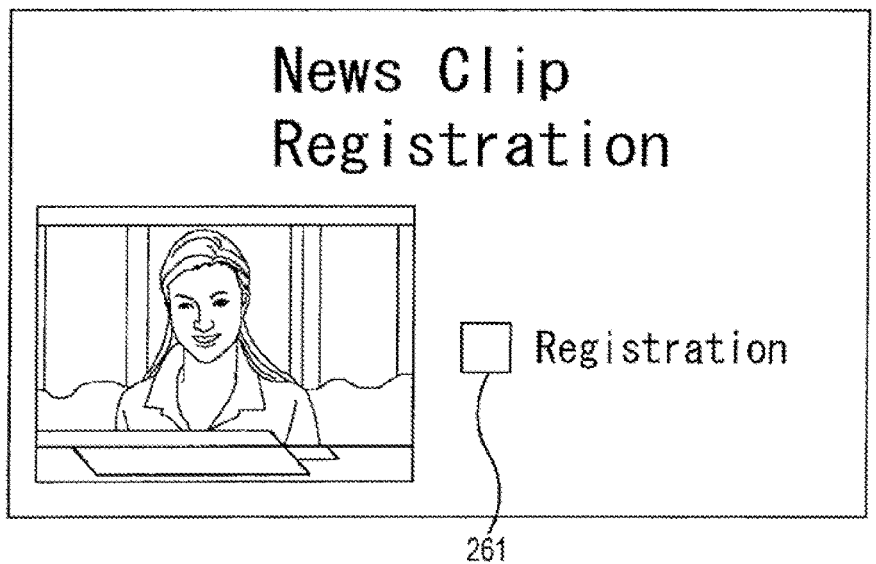
FIG. 21 is a diagram illustrating a GUI example for accepting registration of a Push-type NRT broadcasting service.

For example, in the event that the user has operated the remote controller or the like to select the icon 452, an image such as illustrated in FIG. 21 is displayed on the screen of the display. The image illustrated in the drawing is taken as a GUI for accepting registration of the Push-type NRT broadcasting service "News Clip". For example, upon a button 261 in FIG. 21 being operated, registration of the Push-type NRT broadcasting service "News Clip" is performed at the reception device 41.

The reception device 41 which has performed registration of the Push-type NRT broadcasting service "News Clip" is configured to receive and accumulate the content of "News Clip". Subsequently, a list of contents downloaded by the reception device 41 is displayed on the screen as a contents list illustrated in FIG. 22, for example. Now, with the example in FIG. 22, let us say that "XXXX" displays the title of each content, and information included in the meta data of this content, and so forth.

Figure 22:
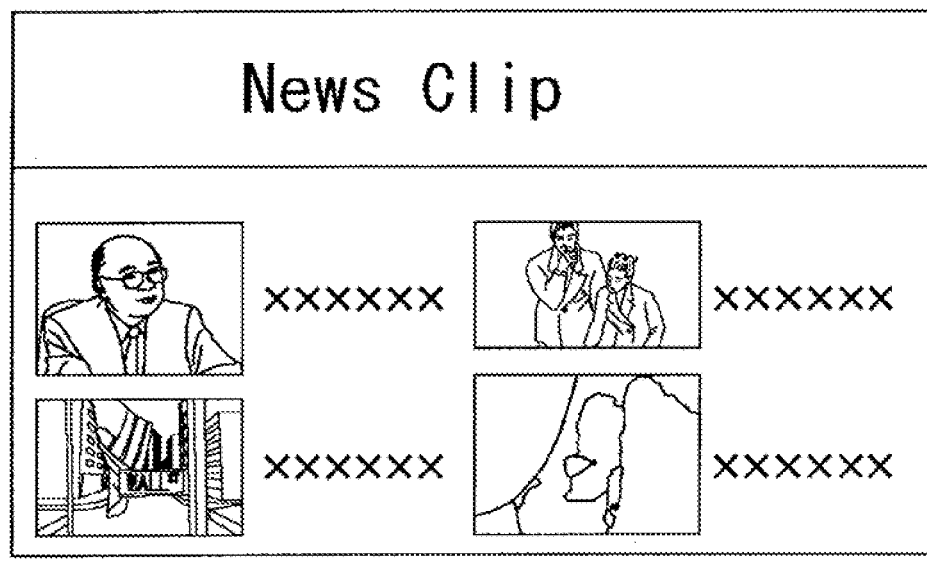
FIG. 22 is a diagram illustrating another example the contents list.
Figure 23:
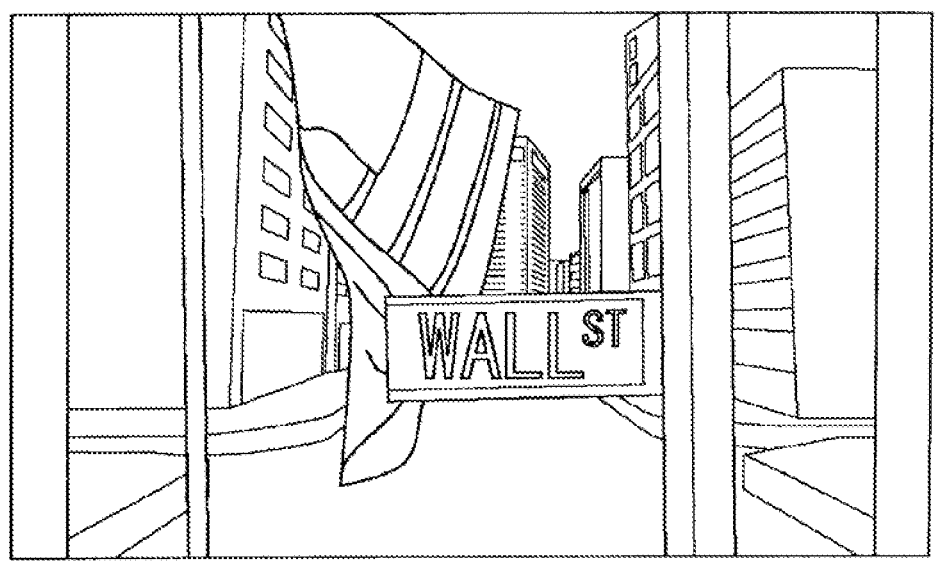
FIG. 23 is a diagram illustrating another example of the played content image.

The user of the reception device 41 displays the contents list in FIG. 22 on the screen of the display or the like, and selects a content to be viewed and listened to by operating the GUI, for example. Thus, the selected content is played, and as illustrated in FIG. 23, the image of the content is displayed on the screen of the display. With this example, an image where a situation of a town has been shot is displayed as the image of the content.

Next, description will be made regarding Push-type NRT broadcasting service registration processing by the reception device 41, with reference to the flowchart in FIG. 24.

In step S101, the controller 409 of the reception device 41 controls the tuner 402 to receive meta data, control information, and so forth regarding NRT broadcasting.

At this time, for example, the PSIP data is received. Note that, as described above, the PSIP data is data structured so as to include the VCT, NRT-IT, and so forth, and is arranged to be periodically received by the reception device 41.

In step S102, the controller 409 generates a list of Push-type NRT broadcasting services.

At this time, "Push-type NRT meta information" described above with reference to FIG. 15 is checked regarding each of the NRT-ITs received in step S101. Subsequently, with "Push-type NRT meta information", determination is made according to, for example, an 8-bit descriptor described in the region 341 in FIG. 18 whether or not the corresponding logical channel is a logical channel corresponding to the Push-type NRT broadcasting service. In the event that determination is made that the corresponding logical channel is a logical channel corresponding to the Push-type NRT broadcasting service, the service name of this Push-type NRT broadcasting service is obtained based on "Channel name", "Channel number", and the descriptor of the region 342 in FIG. 18 of this logical channel.

In this way, logical channels corresponding to the Push-type NRT broadcasting service are determined based on each of the NRT-ITs received in step S101. Consequently, a list of the Push-type NRT broadcasting services is generated and displayed as a GUI such as described above with reference to FIG. 20.

In step S103, the controller 409 accepts selection of a service by the user based on the Push-type NRT broadcasting service list generated in the processing in step S102. At this time, a predetermined Push-type NRT broadcasting service is selected.

In step S104, the controller 409 stores "Source_id" corresponding to the Push-type NRT broadcasting service selected in the processing in step S103. Here, "Source_id" may be determined based on the NRT-IT received in step S101.

Also, at this time, based on the descriptor described in the region 344 in FIG. 18, a storage size necessary for receiving presentation of the corresponding Push-type NRT service is determined, and a storage region of the storage 408 is reserved.

Further, for example, in the event that this Push-type NRT broadcasting service is provided for pay, a URL for connecting to an Internet server for performing various types of registration or the like prior to processing such as accounting or the like is determined by the descriptor described in the region 345 in FIG. 18. Subsequently, based on this URL, the reception device 41 accesses the Internet server, and paid viewing and listening contract processing is executed.

In this way, the Push-type NRT broadcasting service registration processing is executed. As described above, with the present invention, a logical channel corresponding to each service of Push-type NRT broadcasting is provided, and accordingly, "Source_id" for determining a logical channel corresponding to a registered Push-type NRT broadcasting service is stored.

Next, Push-type NRT broadcast reception and playback processing by the reception device 41 will be described with reference to the flowchart in FIG. 25.

In step S121, the controller 409 of the reception device 41 controls the tuner 402 to receive meta data, control information, and so forth regarding NRT broadcasting.

At this time, for example, the PSIP data is received. Note that, as described above, the PSIP data is data structured so as to include the VCT, NRT-IT, and so forth, and is arranged to be periodically received by the reception device 41. Subsequently, at timing when the PSIP data is received, downloading schedule generation processing in step S122 is arranged to be executed.

In step S122, the controller 409 executes the downloading schedule generation processing, which will be described later with reference to FIG. 26. Thus, downloading of a Push-type NRT broadcast content is reserved.

Now, a detailed example of the downloading schedule generation processing in step S122 in FIG. 25 will be described with reference to the flowchart in FIG. 26.

Figure 24:
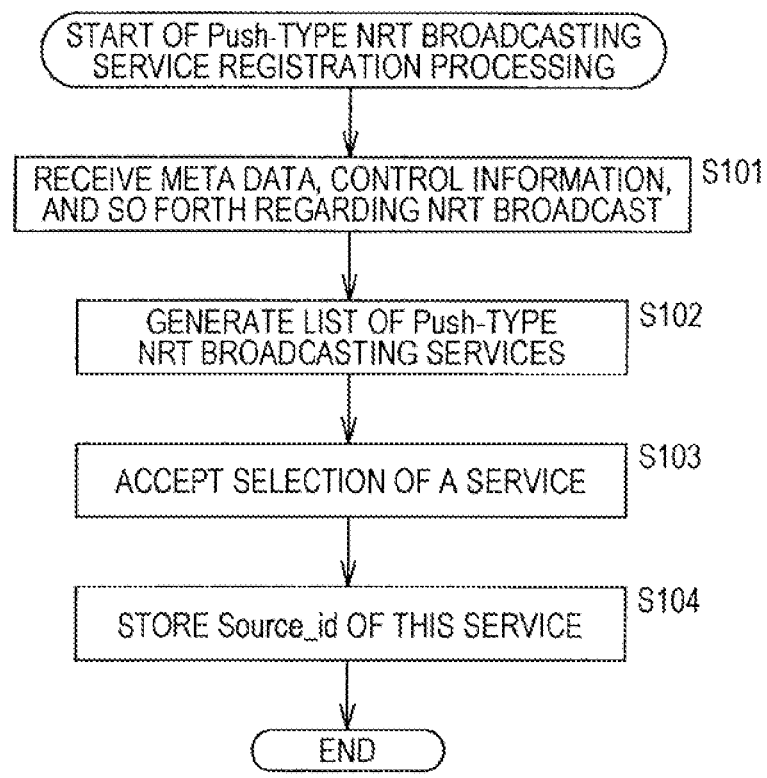
FIG. 24 is a flowchart for describing an example of Push-type NRT broadcasting service registration processing.

In step S141, the controller 409 obtains the NRT-IT based on "Source_id" stored in the processing in step S104 in FIG. 24. Specifically, of the NRT-ITs included in the PSIP data received in step S121, the NRT-IT corresponding to "Source_id" stored in the processing in step S104 is extracted and obtained.

In step S142, the controller 409 checks the description region in increments of contents of the NRT-IT obtained in the processing in step S141. At this time, for example, the description content of the description region 292-1 in increments of contents in FIG. 15 is checked.

In step S143, the controller 409 obtains "content_item_id" and "Contents version" described in the description region in increments of contents checked in step S142.

In step S144, the controller 409 determines whether or not the same content is recorded in the storage 408. Specifically, determination is made whether or not a content having the same "content_item_id" and the same "Contents version" has already been received and accumulated. In the event that determination is made in step S144 that the same content is not recorded in the storage 408, the processing proceeds to step S145.

In step S145, the controller 409 determines whether or not downloading of the same content is scheduled. For example, such as "content 1 (V1)" described above with reference to FIG. 13, in the event that the same content is repeatedly broadcasted twice, it is sufficient just to perform downloading in either one or the other of the broadcasts. Therefore, in step S145, determination is made whether or not downloading of the same content is scheduled. In the event that determination is made in step S145 that the same content is not scheduled, the processing proceeds to step S146.

In step S146, the controller 409 obtains "Distribution schedule" described in the description region in increments of contents checked in step S142. Thus, the broadcasting start point-in-time and the broadcasting end point-in-time of the corresponding content are obtained.

In step S147, the controller 409 schedules downloading of the content corresponding to the description region in increments of contents checked in step S142.

Now, in the event that determination is made in step S144 that the same content is recorded in the storage 408, processing in step S145 through step S147 is skipped. Also, in the event that determination is made in step S145 that downloading of the same content is scheduled, the processing in step S146 and step S147 is skipped.

In step S148, the controller 409 determines whether or not there is the next description region in increments of contents out of the NRT-ITs obtained in the processing in step S141. With the example in FIG. 15, there is the description region 292-2 in increments of contents next to the description region 292-1 in increments of contents, and accordingly, determination is made in step S148 that there is the next description region in increments of contents, and the processing returns to step S142.

Subsequently, in step S142, the description content of the description region 292-2 in increments of contents is checked, and the processing in step S143 through step S147 is repeatedly executed.

In this way, until determination is made in step S148 that there is no next description region in increments of contents, the processing in step S142 through step S148 is repeatedly executed. In the event that determination is made in step S148 that there is no next description region in increments of contents, the downloading schedule generation processing ends.

Figure 26:
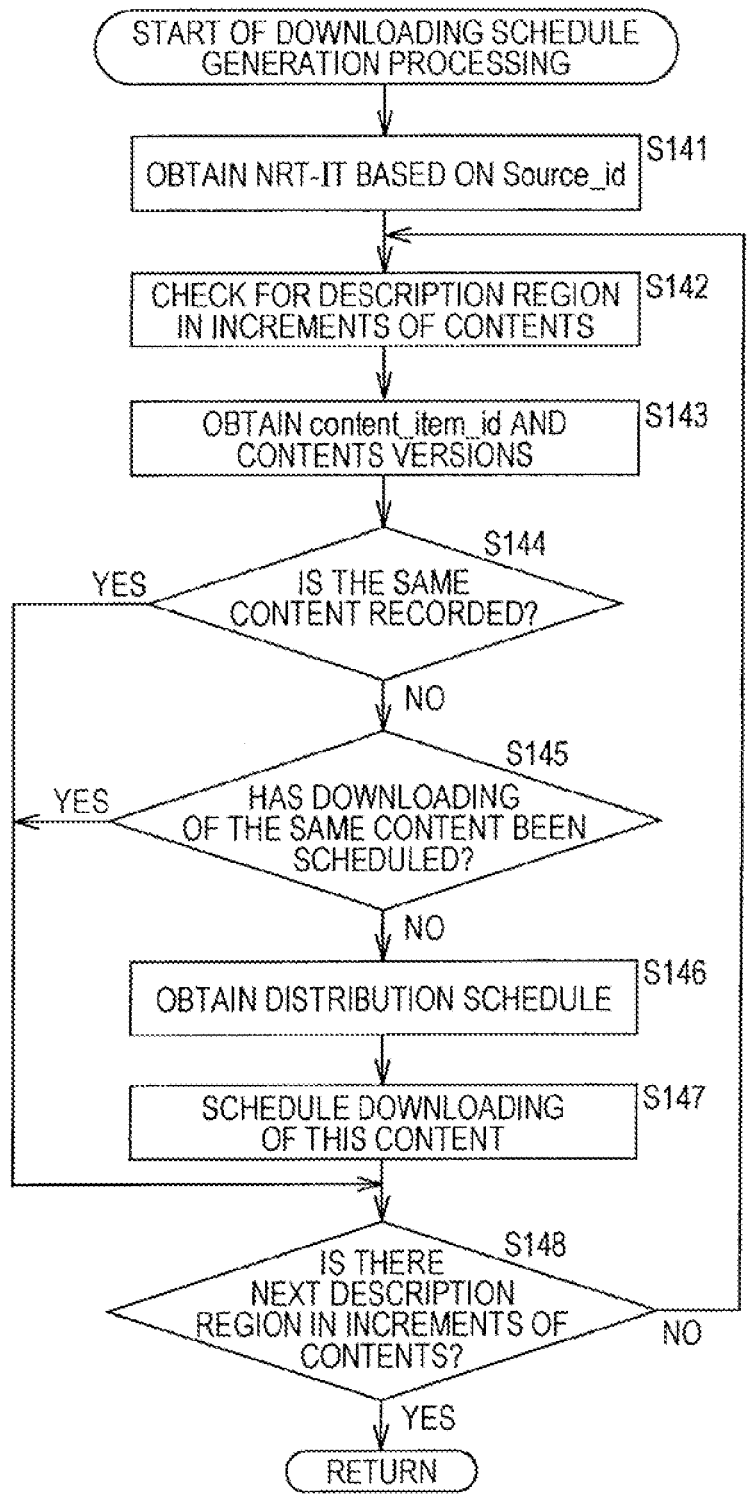
FIG. 26 is a flowchart for describing an example of downloading schedule generation processing.

Along with the end of the processing in FIG. 26, for example, the downloading schedule of the Push-type NRT broadcast content is stored in the internal memory of the controller 409, or the like. The downloading schedule is structured as a list of information for determining the physical channel, logical channel, and FLUTE session of the content to be downloaded, for example. That is to say, the downloading schedule is, for example, in the same way as conventional recording reservation information or the like, reservation information for the reception device 41 automatically executing downloading.

Hereafter, the reception device 41 performs downloading of contents in accordance with this downloading schedule.

Description will return to FIG. 25. After the processing in step S122, the processing proceeds to step S123. In step S123, the controller 409 determines whether or not the broadcasting start point-in-time of the content in the downloading schedule generated in the processing in step S122 has elapsed, and waits until determination is made that the broadcasting start point-in-time has elapsed. In the event that determination is made in step S123 that the broadcasting start point-in-time has elapsed, the processing proceeds to step S124.

In step S124, the controller 409 controls the tuner 402, TSDemux 403, and FLUTE processor 407 to download the content.

At this time, the tuning channel of the tuner 402 of the reception device 41 is set to a broadcast channel corresponding to the physical channel specified in the downloading schedule. Also, the TSDemux 403 outputs the data of the logical channel specified in the downloading schedule to the FLUTE processor 407. Subsequently, the FLUTE processor 407 obtains the file of the FLUTE session specified in the downloading schedule. Upon the broadcasting end point-in-time of the content having come, obtaining of all the files making up the FLUTE session stream is completed at the reception device 41, whereby downloading of the content is completed.

In step S125, the controller 409 determines whether or not an already recorded content is overwritten with the content downloaded in the processing in step S124. For example, in the event that a content of which the "content_item_id" is the same as with an already recorded content, but the "Contents version" differs therefrom has been downloaded, determination is made that the already recorded content is overwritten.

Further, in step S125, based on a storage size necessary for accepting presentation of the corresponding Push-type NRT broadcasting service specified by the descriptor described in the region 344 in FIG. 18, determination is made whether to perform overwriting. Specifically, in the event that there is a need to record the data of the content exceeding a predetermined storage size, determination is made that the already recorded content is overwritten. In this case, for example, of already recorded contents, the oldest content is overwritten with the content downloaded in the processing in step S124.

In the event that determination is made in step S125 that the already recorded content is overwritten with the downloaded content, the processing proceeds to step S127, and the content downloaded in the processing in step S124 is overwritten and recorded. Thus, the version of this content is updated.

On the other hand, in the event that determination is made in step S125 that the already recorded content is not overwritten with the downloaded content, the processing proceeds to step S126, and the content downloaded in the processing in step S124 is newly recorded in the storage 408.

Note that, when a content is recorded, the meta data of this content included in the information received in step S121 may also be recorded in a manner correlated with this content. Note that the meta data is made up of, for example, "Contents name", "Distribution schedule", "Contents expiration date" and so forth described in the NRT-IT.

Here, description has been made regarding an example in the event that one content is downloaded, but in reality, motile contents are downloaded in accordance with the downloading schedule.

Now, for example, in the event that the user of the reception device 41 has canceled the registration of the corresponding Push-type NRT broadcasting service in the middle of the processing, hereafter, downloading of contents is not performed.

In step S128, the controller 409 displays the contents list recorded in the processing in step S126 or step S127. At this time, for example, an image such as illustrated I FIG. 22 is generated and displayed on the display.

Note that, as described above, an expiration date is set to each of the contents, and contents of which the expiration date has elapsed are arranged so as not to be included in the contents list displayed in step S128. The expiration date can be determined based on "Contents expiration date" described with reference to FIG. 15.

In step S129, the controller 409 accepts selection of a content by the user based on the contents list displayed in the processing in step S128. At this time, for example, of the NRT broadcast contents already recorded in the storage 408, a content that the user intends to view and listen to is selected.

In step S130, the controller 409 controls the file container Demux 406 to pay the content selected in the processing in step S129. Thus, for example, as illustrated in FIG. 23, the image of the content is displayed on the display.

Note that, in the event that the registered Push-type NRT broadcasting service is provided for pay, the data of logical channels corresponding to this service are all encoded and broadcasted. However, an arrangement is made wherein a key for decoding the data of the logical channels corresponding to this service is transmitted to the reception device 41 registered in this service as an EMM packet beforehand. Accordingly, with the reception device 41 registered in this service, encoded data is decoded using the key transmitted and stored beforehand, whereby the content can be viewed and listened to.

In this way, the Push-type NRT broadcast reception and playback processing by the reception device 41 is executed. In this way, with the present invention, the reception device 41 in which the Push-type NRT broadcasting service is registered is configured to automatically download all the contents to be transmitted with a logical channel corresponding to the service thereof. Accordingly, the Push-type NRT service can be realized without performing a large-scaled modification such as existing facilities, standards, or the like.

Also, the broadcast waves of an NRT broadcast received by the reception device 41 according to the present invention are transmitted by a transmission device 21. The transmission device 21 is configured so as to include a multiplexing unit for generating signals where meta information, data such as control information, and the data of a content are multiplexed, for example.

The data of the content is data made up of image data and audio data, subjected to compression encoding by an AV encoder for encoding video data and audio data, for example, using the MPEG system.

Data such as meta information, control data, and so forth is data made up of the PSIP data or the like, for example.

The transmission device 21 generates a VCT and an NRT-IT corresponding to a predetermined broadcasting schedule, and generates data made up of the PSIP data including the VCT and NRT-IT, or the like as additional data. Subsequently, the transmission device 21 generates signals where the additional data and the data of a content are multiplexed at the multiplexing unit, modulates the signals thereof, and outputs as broadcast waves.

Figure 27:
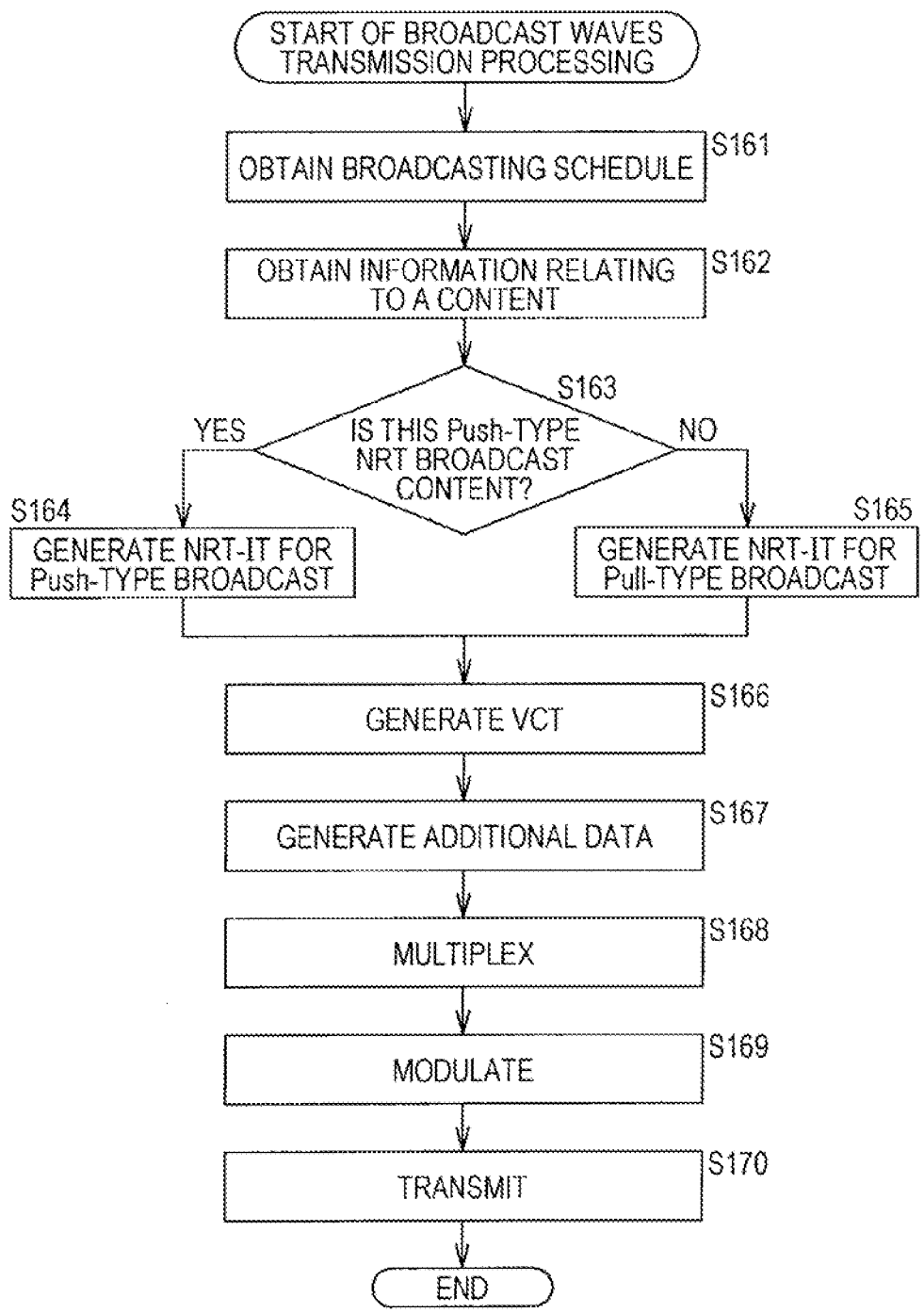
FIG. 27 is a flowchart for describing an example of broadcast wave transmission processing.

Broadcast wave transmission processing according to NRT broadcasting by the transmission device 21 will be described with reference to the flowchart in FIG. 27.

In step S161, a control unit of the transmission device 21 obtains a broadcasting schedule. Now, let us say that later-described information regarding a content to be broadcasted is included in the broadcasting schedule.

In step S162, the control unit of the transmission device 21 obtains the information regarding a content to be broadcasted. Now, let us say that the information regarding a content includes "content_item_id", "Distribution schedule", "Contents expiration date", "Contents name", information representing whether a Push-type content or a Pull-type content, and so forth.

In step S163, the control unit of the transmission device 21 determines whether or not the content according to the information obtained in the processing in step S162 is a Push-type NRT broadcast content. Note that, in reality, the processing in step S163 is executed regarding each of multiple contents described in the broadcasting schedule.

In the event that determination is made in step S163 that the content according to the information obtained in the processing in step S162 is a Push-type NRT broadcast content, the processing proceeds to step S164.

In step S164, the control unit of the transmission device 21 generates an NRT-IT for Push-type broadcasting. At this time, for example, the NRT-IT described above with reference to FIG. 15 is generated.

In the event that determination is made in step S163 that the content according to the information obtained in the processing in step S162 is not a Push-type NRT broadcast content, the processing proceeds to step S165.

In step S165, the control unit of the transmission device 21 generates an NRT-IT for Pull-type broadcasting. At this time, for example, the NRT-IT described above with reference to FIG. 8 is generated.

In step S166, the control unit of the transmission device 21 generates a VCT.

In step S167, the control unit of the transmission device 21 generates additional data made up of the PSIP data including the VCT and NRT-IT, or the like.

In step S168, the multiplexing unit of the transmission device 21 generates signals where the additional data and the data of the content are multiplexed, based on the broadcasting schedule. Note that, at this time, simultaneously with multiplexing of the additional data, and the data of the content, data to be transmitted by multiple logical channels are multiplexed as data to be transmitted by one physical channel.

In step S169, the transmission device 21 modulates the signals generated in the processing in step S168, and in step S170 outputs the broadcast waves of the signals modulated in the processing in step S169.

In this way, the broadcast wave transmission processing according to NRT broadcasting is executed.

Note that, with the processing described above with reference to FIG. 24 through FIG. 27, description has been made assuming that information necessary for realizing Push-type NRT broadcasting (e.g., "Push-type NRT meta information") is described in the NRT-IT. However, it goes without saying that the information necessary for realizing Push-type NRT broadcasting may be described in the VCT as described with reference to FIG. 14.

In this way, according to the present invention, the Push-type NRT service can be realized without performing a large-scaled modification such as existing facilities and standards and so forth.

Incidentally, with the example described above with reference to FIG. 14, the information necessary for realizing Push-type NRT broadcasting has directly been described in the VCT, but such information may be described in another piece of control information.

For example, with the VCT in FIG. 14, "normal/NRT identification information" is described instead of "Push-type NRT meta information" to be described in the description region 272-1 in increments of channels, description region 272-2 in increments of channels, and so on. "normal/NRT identification information" is taken as information representing whether the corresponding logical channel is a normal broadcast logical channel or NRT broadcast logical channel. Subsequently, in the event that the corresponding logical channel is an NRT broadcast logical channel, an SMT (Service Map Table) is received by the reception device 41 in addition to the VCT. Subsequently, the information necessary for realizing Push-type NRT broadcasting (e.g., "Push-type NRT meta information") is described in the SMT.

In this case, for example, the SMT is generated for each physical channel.

For example, as described above with reference to FIG. 14, "TS_id" is taken as an ID for identifying a transport stream, and in reality, a predetermined character or numeric value or the like is described therein. Thus, it can be identified which physical channel (broadcast channel) the VCT is included. For example, based on this "TS_id", the SMT is determined.

Also, as described above, "Channel name", "Channel number", "Service type", "Program_number", "Source_id", "Push-type NRT meta information", and so on are described in the description region 272-1 in increments of channels of the VCT.

"Source_id" is taken as an ID for identifying the corresponding logical channel, and in reality, a predetermined character or numeric value or the like is described therein. That is to say, the description region 272-1 in increments of channels is a region where information regarding one logical channel determined by this "Source_id" is described.

Similarly, information regarding one logical channel determined by "Source_id" is also described in the description region 272-2 in increments of channels, and so on.

Also, with the example in FIG. 15, "Source_id", "Number of contents", "Push-type NRT meta information", description region 292-1 in increments of contents, description region 292-2 in increments of contents, and so on are described in the description region 291 of the NRT-IT.

"Source_id" is the same as described above with reference to FIG. 14, taken as an ID for identifying a logical channel, and in reality, a predetermined character or numeric value or the like is described. Thus, one of logical channels described in the description region 271-1 in increments of channels, description region 271-2 in increments of channels, and so on in FIG. 14 can be correlated with the corresponding NRT-IT.

Accordingly, the NRT-IT is generated in increments of logical channels.

Information regarding each of the NRT-ITs corresponding to multiple "Source_id" is described in the above SMT. Subsequently, information necessary for realizing Push-type NRT broadcasting regarding a content described in the description region in increments of contents of each of multiple NRT-ITs is described in the SMT.

That is to say, the SMT is, in the same way as with the VCT, transmitted as predetermined description data where information regarding a logical channel is described. Also, the NRT-IT may be taken as an example of the meta data of a content to be broadcasted with a logical channel.

In this way, for example, all the contents to be broadcasted with one logical channel may be received as a Push-type NRT broadcast content. Further, for example, an arrangement may be made wherein, of the contents to be broadcasted with one logical channel, a content to be broadcasted at a predetermined time zone is received as a Pull-type NRT broadcast content, and a content to be broadcasted at another time zone is received as a Push-type NRT broadcast content.

With a broadcasting system 1 according to the present invention, the VCT and SMT may be arranged and transmitted in this way.

Also, description has been made so far regarding an example wherein a description region in increments of contents is provided to the NRT-IT, and "Contents transmission location information" regarding each content is described. As described above, "Contents transmission location information" is determined, whereby of data to be transmitted with a logical channel determined by "Soruce_id", the data of one content determined by "content_item_id" can be identified.

Specifically, a FLUTE session is determined by "Contents transmission location information", and data making up a FLUTE session stream is obtained. The FLUTE session stream is, in reality, made up of multiple files divided into a predetermined size, and each of these multiple files is appended with "TOI". With the above example, description has been made wherein based on the FDT that is a file of which the "TOI" is 0, the data of a content to be transmitted with a predetermined FLUTE session is obtained.

Note that the FLUTE session can be taken as an example of file transmission sessions used for transmission of contents data, and the FDT is control information of the file transmission sessions, and can be taken as an example of transmission control data.

However, in recent years, viewing and listening to of contents have been frequently performed using a personal computer or the like without using audio-video equipment such as a television receiver or the like. Accordingly, if viewing and listening to of contents at the reception device 41 can be performed, for example, by a method corresponding to obtaining of contents using the Internet, convenience improves. For example, an arrangement may be made wherein an address file in which the address information of a file making up the corresponding content is described is determined based on the FDT, and a file making up this content is obtained based on the address information described in the address file.

For example, application software such as a browser is installed into the reception device 41. Subsequently, the RSS reader function of the browser is used to enable an address file described with the RSS to be analyzed.

This address file is described with the RSS (RDF Site Summary) used for the Internet, for example. The RSS is an XML (eXtensible Markup Language) sentence format where meta data such as a website title or summary or the like is described in a structuring manner.

Figure 28:
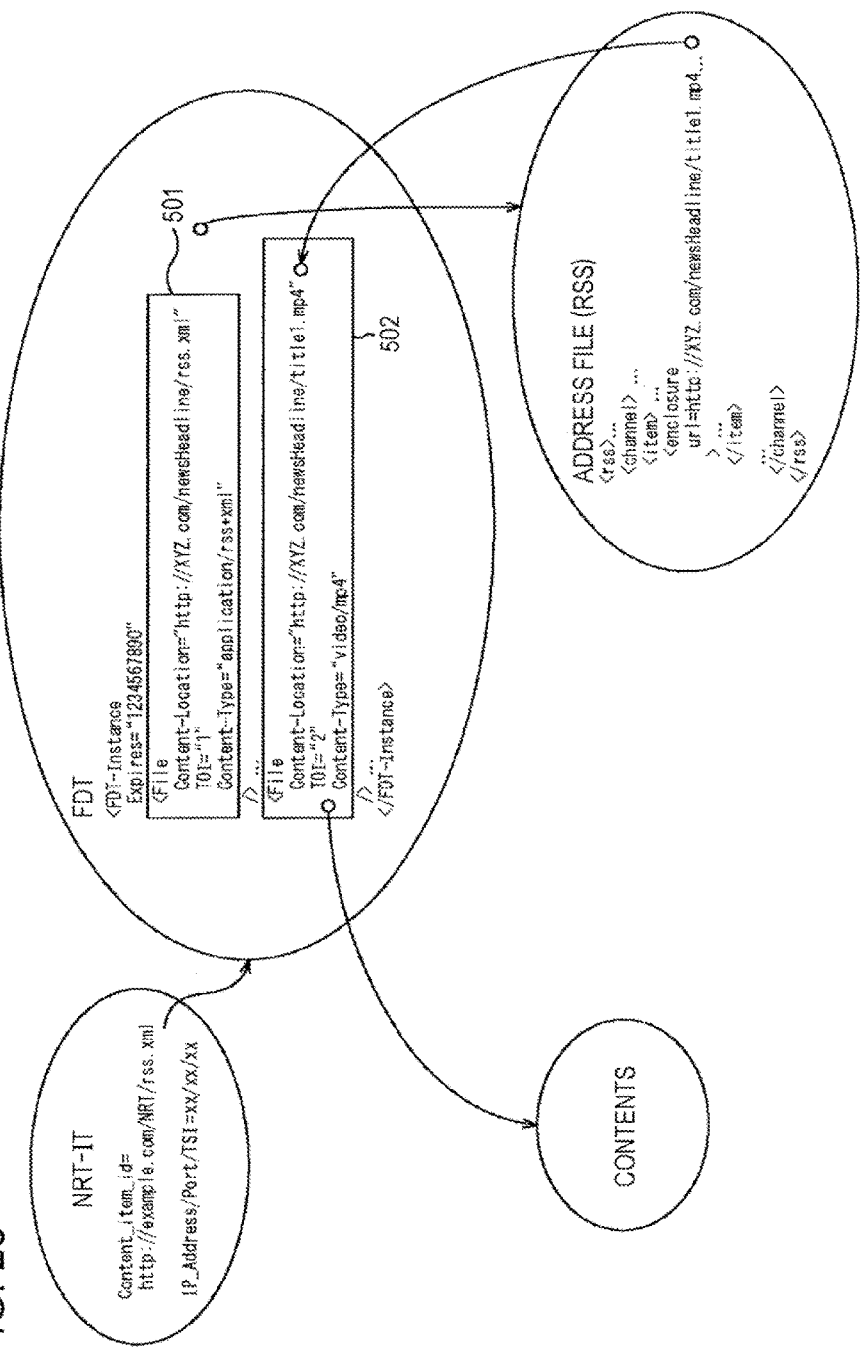
FIG. 28 is a diagram for describing an example of a case where a file making up a content is obtained using an address file described in a RSS format.

FIG. 28 is a diagram for describing an example in the event that a file making up a content is obtained using an address file described in the RSS format. As described above, "Contents transmission location information" regarding each content is described in the description region in increments of contents of the NRT-IT. With this example, information called "content_item_id=http://example.com/NRT/rss.xml", and information called "IP_address/Port/TSI=xx/xx/xx" which are described in the NRT-IT are represented. "IP_address/Port/TSI=xx/xx/xx" represents "Contents transmission location information", where in reality, an IP address, a port number, and a TSI are described as "xx/xx/xx".

Thus, the FLUTE session is determined, and data making up the FLUTE session stream is obtained. "TOI" is appended to each of multiple files of the FLUTE session stream, and an FDT of which the "TOI" is 0 is obtained. With this example, an XML sentence beginning with "<File" is described in a region 501 that is a part of the description region of the FDT.

With the region 501, "Content-Location=http://XYZ.com/newHeadline/rss.xml" is described. This represents that the address file in the RSS format called "XYZ.com/newHeadline/rss.xml" is determined by the description of the region 501. Subsequently, according to description called "TOI="1"", the identifier of the address file to be determined is represented. That is to say, this represents that a file of which the "TOI" is 1 is the address file. Further, according to description called "Content-Type="application/rss+xml"", it is represented that the address file is described in the RSS format.

The reception device 41 obtains a file of which the "TOI" is 1 as an address file, references the tag of an XML sentence beginning with "<enclosure" described in the address file, thereby obtaining the address information of a target content file. With this example, this is described as "url=http://XYZ.com/newsHeadline/title.mp4 . . . ". Thus, a region 502 that is a part of the description of the FDT is determined.

With the region 502, "Content-Location=http://XYZ.com/newsHeadline/title.mp4" is described. This represents that according to the description of the region 502, a content file in the MPEG4 (mp4) format called "XYZ.com/newsHeadline/title.mp4 . . . " is determined. Subsequently, according to description called "TOI="2"", the identifier of the address file to be determined is represented. That is to say, this represents that the content file is a file of which the "TOI" is 2. Further, according to description called "Content-Type="video/mp4"", it is represented that the file thereof is a file subjected to compression encoding in the MPEG4 (mp4) format.

Subsequently, the reception device 41 obtains a file of which the "TOI" is 2 as a content file, and decodes the file subjected to compression encoding in the MPEG4 format, whereby this content can be played.

Thus, the reception device 41 can be configured as a personal computer in which application software such as a browser is installed, or the like, for example.

FIG. 29 is a diagram illustrating an example of an address file described in the RSS format. In this drawing, description called "<title>News Headline by XYZ</title>" in the region 502 represents that the title of a content determined by this address file is "News Headline by XYZ".

Also, with a region 522, an XML sentence beginning with "<item" is described. Description called "<enclosure url=http://YXZ.com/newsHeadline/title01.mp4 length="123456789" type="video/mp4"/>" in the region 522 is description regarding an "enclosure" element stipulated as the RSS description format. The "enclosure" element is originally an element indicating a medium appended to a distribution object to be distributed in the RSS, but in this case, this element is used as information for determining an XML sentence beginning with "<File".

That is to say, "url=http://YXZ.com/newsHeadline/title01.mp4" of the "enclosure" element is used for determining "Content-Location=http://YXZ.com/newsHeadline/title01.mp4" described in the region 502 of the FDT in FIG. 28. Also, "length="123456789"" of the "enclosure" element is description representing the byte length of this content file. Also, "type="video/mp4"" of the "enclosure" element is description representing that this content file is a moving image (video) file compressed in the MPEG4 format.

Note that, in the same way as with the region 522 in the address file, if multiple MXL sentences beginning with "<item" are described, multiple contents files can be determined by this address file.

As described above, the present invention enables an arrangement wherein application software such as a browser or the like is installed in the reception device 41, whereby an address file described in the RSS can be analyzed using the RSS reader function of the browser. Accordingly, for example, according to the same device and method as with the case of browsing of a web page with the Internet, whereby contents can be received, viewed, and listened to. Note that a method for viewing and listening to contents using an address file described in the RSS format can be applied to both of Push-type NRT broadcasting and Pull-type NRT broadcasting.

Figure 10:
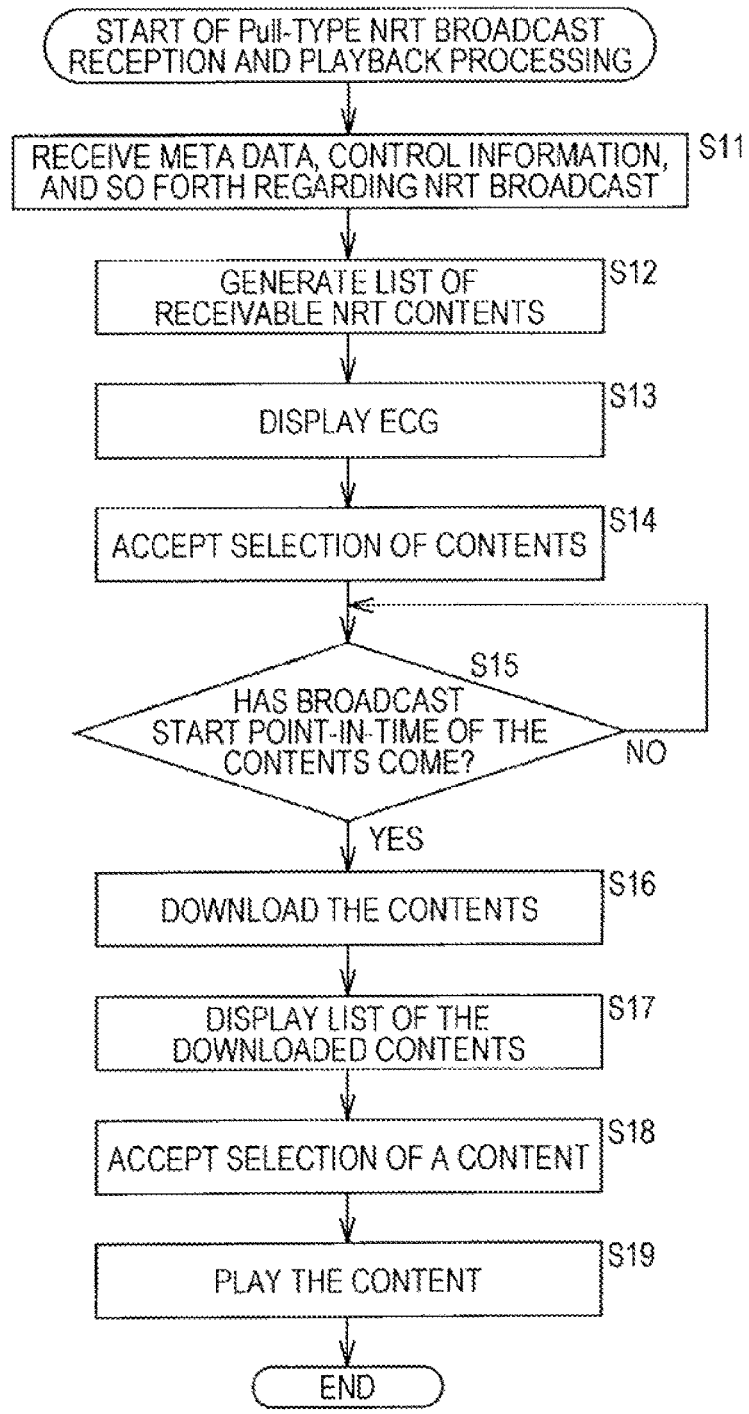
FIG. 10 is a flowchart for describing an example of Pull-type NRT broadcast reception and playback processing.
Figure 25:
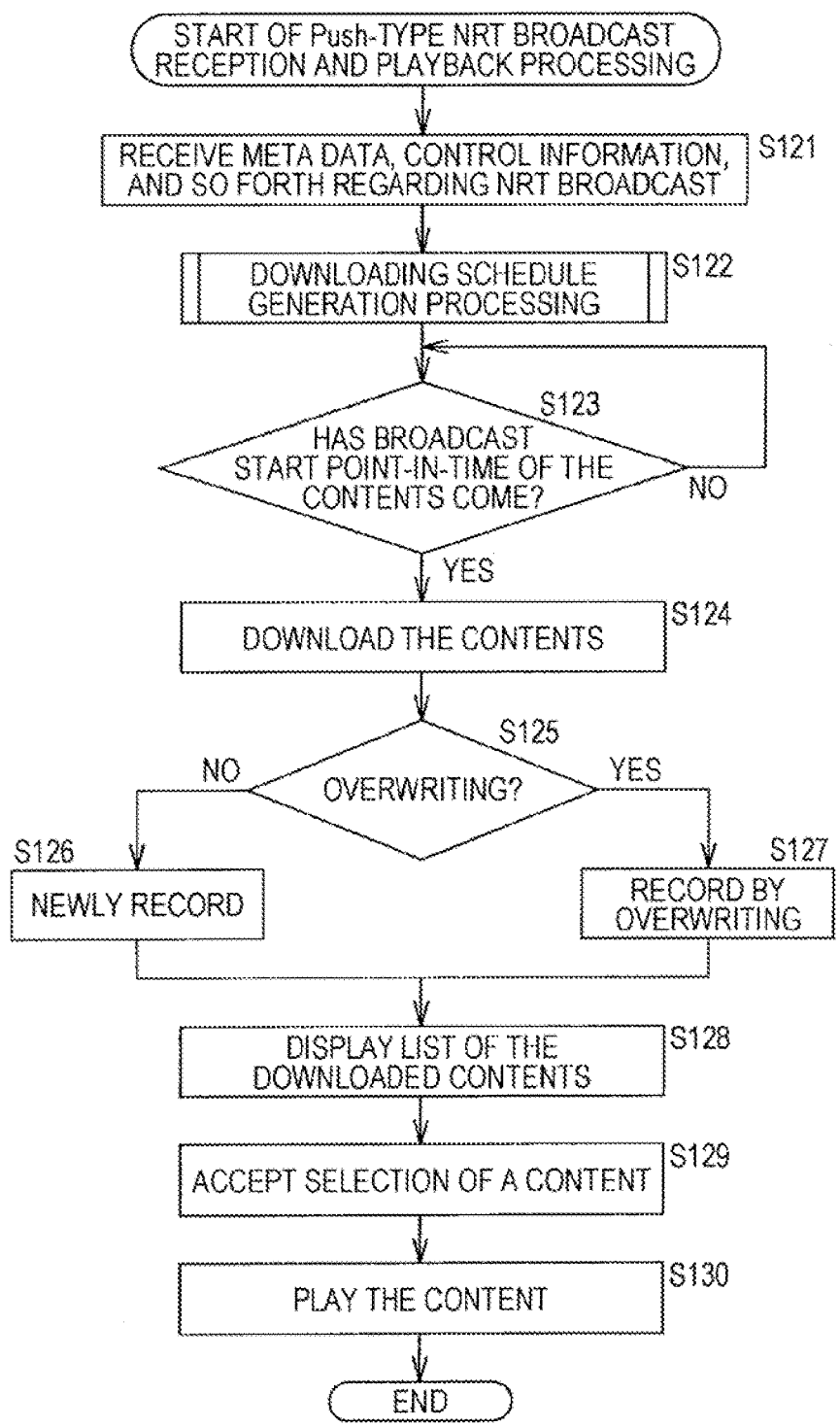
FIG. 25 is a flowchart for describing an example of Push-type NRT broadcast reception and playback processing.

For example, downloading of a content in step S16 in FIG. 10 or step S124 in FIG. 25 may be performed by a content file being obtained such as described above with reference to FIG. 28 and FIG. 29. That is to say, an arrangement may be made wherein an address file is determined based on the FDT, files making up the corresponding content are obtained based on the address information described in the address file, whereby downloading of the content is performed. Also, in such a case, the data of a content that the transmission device 21 transmits is structured, as described above, so as to include an address file in addition to the FDT and a content file.

Incidentally, with the example described above with reference to FIG. 12, description has been made wherein the reception device 41 periodically receives the PSIP data, and accordingly, the VCT and NRT-IT can periodically be obtained. Subsequently, with the example in FIG. 12, description has been made wherein the VCT 210, NRT-IT 211, and NRT-IT 212 are first received, and a logical channel where the content A and content B are transmitted, and a FLUTE session file thereof are determined. Further, description has been made wherein the VCT 220, NRT-IT 221, and NRT-IT 222 are newly received and updated, and a logical channel where the content C is transmitted, and a FLUTE session file thereof are determined based on the VCT 220, and NRT-IT 221.

That is to say, with the above example, in the event of newly transmitting a content, there is a need to generate PSIP data, and to cause the reception device 41 to newly receive the VCT and NRT-IT beforehand.

However, with a method for viewing and listening to a content using an address file described in the RSS format, a new content can be transmitted and received at the reception device 41 without causing the reception device 41 to newly receive the VCT and NRT-IT.

Specifically, after causing the reception device 41 to receive the VCT and NRT-IT, and determining a logical channel and a FLUTE session, the FDT to be transmitted with the FLUTE session of this logical channel, and the content of the address file are modified at predetermined timing. Thus, a new content can be transmitted and received at the reception device 41 without causing the reception device 41 to newly receive the VCT and NRT-IT.

Figure 30:
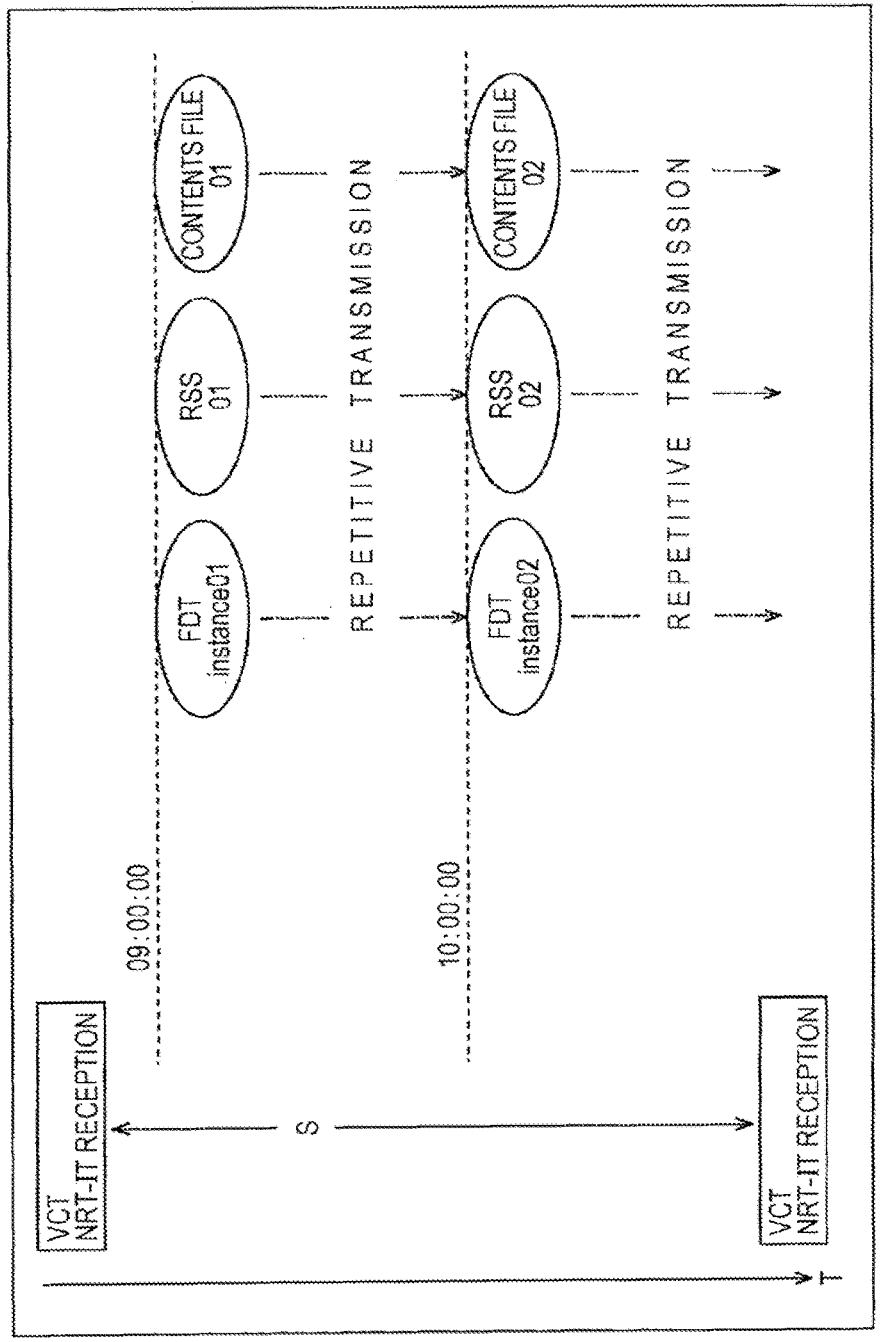
FIG. 30 is a diagram for describing a method for enabling a new content to be transmitted and viewed at the reception device 41 without causing the reception device 41 to newly receive the VCT and NRT-IT.

FIG. 30 is a diagram for describing a method for enabling a new content to be transmitted and viewed and listened to at the reception device 41 without causing the reception device 41 to newly receive the VCT and NRT-IT. The vertical axis in this drawing represents time, and an arrow S represents the updating cycles of the VCT and NRT-IT. Note that the updating cycles of the VCT and NRT-IT are equal to the transmission cycle of the PSIP data.

In FIG. 30, with the FLUTE session of the logical channel determined by the reception device 41 based on the VCT and NRT-IT, "FDT instance01", "RSS 01", and "Content file 01" are repeatedly transmitted during nine o'clock (09:00:00) to ten o'clock (10:00:00). Here, "FDT instance01" is an FDT file of which the TOI is 0, "RSS 01" is an address file described in the RSS format determined by "FDT instance01". "Content file 01" is a content file determined by "FDT instance01" and "RSS 01".

Also, with the FLUTE session of the logical channel determined by the reception device 41 based on the VCT and NRT-IT, "FDT instance02", "RSS 02", and "Content file 02" are repeatedly transmitted after ten o'clock (10:00:00). Here, "FDT instance02" is an FDT file of which the TOI is 0, "RSS 02" is an address file described in the RSS format determined by "FDT instance02". "Content file 02" is a content file determined by "FDT instance02" and "RSS 02".

That is to say, with the example in FIG. 30, the FLUTE sessions of the logical channels determined by the reception device 41 based on the VCT and NRT-IT are the same, but FDTs, address files, and content files change with time.

For example, in the event that "Content file 01" is a file of the content D, and "Content file 02" is a file of the content E, the reception device 41 can receive the content D during nine o'clock to ten o'clock, and receive the content E after ten o'clock.

FIG. 31 and FIG. 32 are diagrams illustrating an example of an address file described in the RSS format used for the example in FIG. 30.

FIG. 31 is an address file corresponding to "RSS 01" in FIG. 30. A region 541 and a region 542 in this drawing are regions where the same content as with the region 521 and region 522 in FIG. 29 are described respectively, and accordingly, detailed description thereof will be omitted.

With the example in FIG. 31, unlike the case of FIG. 29, a region 543 is provided. With the region 543, "<pubDate>Tue, 10 Jun. 2003 09:00:00 GMT<pubDate>" is described. This represents that the corresponding address file was generated at nine o'clock Jun. 10 (Tuesday), 2003 (GMT (Greenwich Mean Time)).

Also, with the example in FIG. 31, unlike the case of FIG. 29, a region 544 is provided. With the region 544, "<skipHours><hour>9</hour></skipHours>" is described. This is description relating to "skipHours" element stipulated as the RSS description format. The "skipHours" element is description for specifying a time zone for prohibiting crawl, and crawl is prohibited during a time zone corresponding to a numeric value described in a portion surrounded with "hour" tags. The case in FIG. 31 represents that no file is updated (crawled) during one hour from nine o'clock Jun. 10, 2003.

The reception device 41 receives the VCT and NRT-IT at point-in-time corresponding to the upper edge portion of the arrow S in FIG. 30, and determines a logical channel and a FLUTE session. Thus, the reception device 41 automatically obtains "FDT instance01" when nine o'clock comes, and based on this obtains the address file illustrated in FIG. 31. The reception device 41 which obtained the address file illustrated in FIG. 31 references a region corresponding to the region 502 (FIG. 28) in "FDT instance01" at nine o'clock to obtain "Content file 01". Subsequently, during one hour thereafter, i.e., until ten o'clock comes, "Content file 01" is not obtained. Also, the reception device 41 which obtained the address file illustrated in FIG. 31 automatically obtains (crawls) a content file after elapse of one hour from nine o'clock.

When ten o'clock comes, description of the FDT to be transmitted with the corresponding FLUTE session is modified. That is to say, when ten o'clock comes, "FDT instance02" is transmitted as a file of which the TOI is 0. "FDT instance02" is obtained by the reception device 41 regardless of description relating to the "skipHours" element. This is because the FDT is a file to be automatically obtained in the FLUTE session of the logical channel that the reception device 41 determines based on the VCT and NRT-IT.

Accordingly, the reception device 41 automatically obtains "FDT instance02" when ten o'clock comes. Also, as described above, when ten o'clock comes, the reception device 41 automatically performs processing for obtaining a content file based on the description content of the address file illustrated in FIG. 31. Obtaining of a file here is performed based on description relating to the "skipHours" element in FIG. 31.

That is to say, when ten o'clock comes, the reception device 41 also obtains the address file illustrated in FIG. 32 based on the description of "FDT instance02". This is because the address file determined by "FDT instance02" is "RSS 02".

FIG. 32 is the address file corresponding to "RSS 02" in FIG. 30. In FIG. 32, the description of the region 541, and the description of the region 542 are each the same as with the case in FIG. 31, and accordingly, detailed description thereof will be omitted.

In FIG. 32, with the region 543, "<pubDate>Tue, 10 Jun. 2003 10:00:00 GMT</pubDate>" is described. This represents that the corresponding address file was generated at ten o'clock Jun. 10 (Tuesday), 2003 (GMT (Greenwich Mean Time)). With the region 544, "<skipHours><hour>10</hour></skipHours>" is described. This represents that no file is updated (crawled) during one hour since ten o'clock Jun. 10, 2003.

Accordingly, the reception device 41 which obtained the address file illustrated in FIG. 32 references the region corresponding to the region 502 (FIG. 28) in "FDT instance02" to obtain "Content file 02". Subsequently, during one hour thereafter, i.e., until eleven o'clock comes, "Content file 02" is not obtained. Also, the reception device 41 which obtained the address file illustrated in FIG. 32 automatically obtains (crawls) a file after elapse of one hour from ten o'clock.

Accordingly, subsequently, the reception device 41 obtains "FDT instance02" regardless of description relating to the "skipHours" element. This is because the FDT is a file to be automatically obtained in the FLUTE session of the logical channel that the reception device 41 determines based on the VCT and NRT-IT.

Also, the reception device 41 which obtained the address file illustrated in FIG. 32 performs, as described above, when eleven o'clock comes, processing for automatically obtaining a content file based on the description content of the address file illustrated in FIG. 32. Obtaining of a file here is performed based on description relating to the "skipHours" element in FIG. 32.

That is to say, when eleven o'clock comes, the reception device 41 also obtains the address file illustrated in FIG. 32 based on the description of "FDT instance02". This is because the address file determined by "FDT instance02" is "RSS 02". Subsequently, the reception device 41 references the region corresponding to the region 502 (FIG. 28) in "FDT instance02" to obtain "Content file 02" again. In this case, consequently, the content file obtained at ten o'clock, and the content file obtained at eleven o'clock are the same content ("Content file 02").

In this way, a new content can be transmitted and received at the reception device 41 without causing the reception device 41 to newly receive the VCT and NRT-IT. For example, an arrangement may be made wherein news flash is displayed on the display of the reception device 41 as an image of a web page, and the image is automatically updated with a predetermined time interval.

Specifically, for example, downloading of a content in step S16 in FIG. 10 or step S124 in FIG. 25 may be performed by a content file being obtained such as described above with reference to FIG. 30 through FIG. 32. That is to say, an arrangement may be made wherein an address file is determined based on the FDT, and files making up the corresponding content are obtained based on the address information described in the address file. Alternatively, downloading of a content may be performed by a content file being repeatedly obtained based on information for controlling a file obtaining time zone described in the address file thereof (e.g., description regarding the "skipHours" element).

Thus, a new NRT broadcast content can be transmitted, viewed, and listened to without generating the PISIP data including the VCT and IRT-IT. Accordingly, for example, with a broadcasting station or the like, each time a new NRT broadcast content is transmitted, there is no need to generate the PSIP data including the VCT and NRT-IT, whereby a more diversified broadcasting schedule can be scheduled.

Description has been made so far regarding an example in the event of using an address file described in the RSS format, but an address file described in the ATOM format may be employed.

With regard to the above examples, description has been made regarding an embodiment whereby Push-type NRT broadcasting can be realized using a method principally adapted to ATSC (Advanced Television Systems Committee) standard. However, for example, Push-type NRT broadcasting may be realized using a method adapted to ARIB (Association of Radio Industries and Businesses) standard.

In the event of NRT broadcasting of a method adapted to the ARIB standard, programs to be broadcasted are classified into a group.

Here, the groups are taken as a unit in the event of representing programs to be broadcasted in series together. Also, the groups are structured by being hierarchized, and for example, can be structured so that one group is taken as a parent group, and multiple child groups are included in the parent group thereof. The groups can be taken as a logical channel where physical channels are multiplexed, which will be described later.

Programs have generally the same meaning, and for example, multiple programs are included in one group.

In the event of NRT broadcasting of a method adapted to the ARIB standard, it is assumed that the user of the reception device 41 makes a viewing and listening contract of NRT broadcasting to pay its fee as a rule. That is to say, only a user who has paid his/her fee is allowed to view and listen to a program which is an object of this viewing and listening contract.

For example, an arrangement may be made wherein a file of image data or audio data or the like making up a program is encoded and broadcasted, and with the reception device 41 of the user who paid a fee, the license of a received program is obtained, and the file of this program is decoded.

In the event of NRT broadcasting of a method adapted to the ARIB standard, information such as the above group, program, license, and so forth is arranged so as to be transmitted as ECG meta data, and received by the reception device 41.

Figure 33:
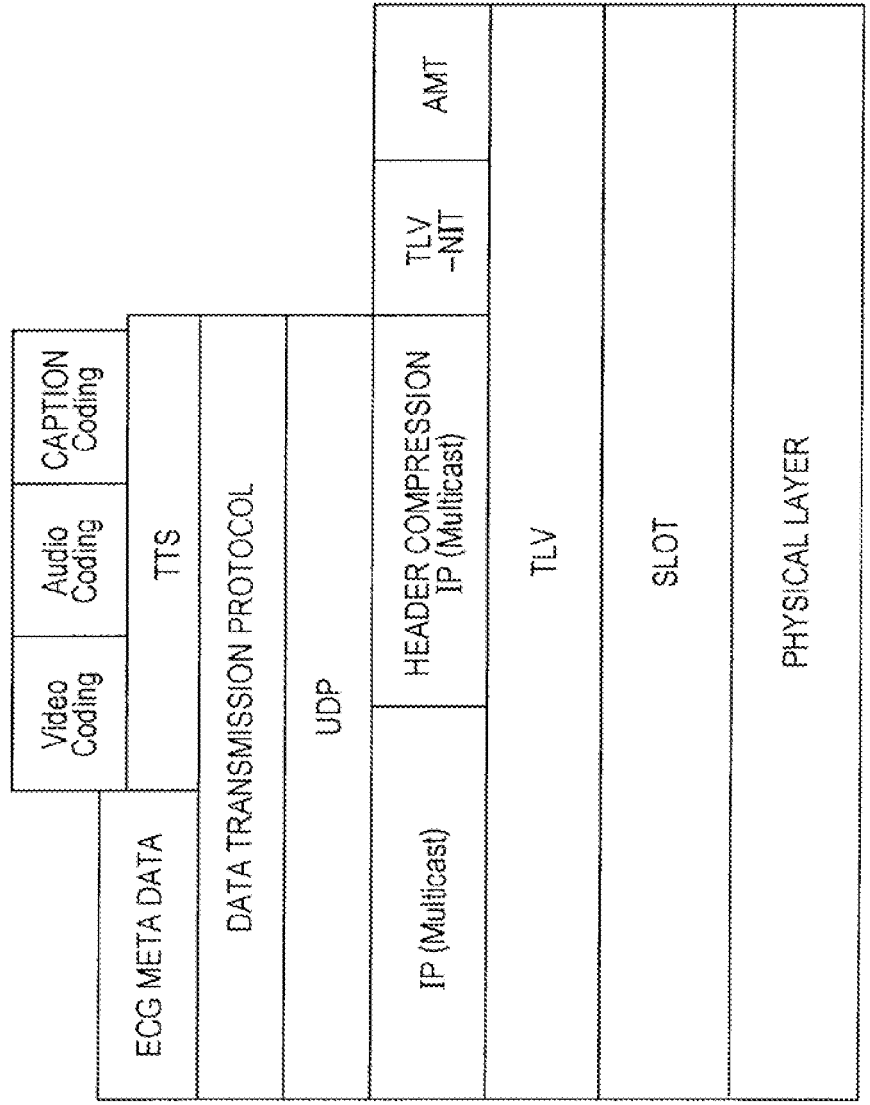
FIG. 33 is a diagram for describing a protocol stack in broadcast wave signals including an NRT broadcast in a method adapted to the ARIB standard.

FIG. 33 is a diagram for describing a protocol stack in broadcast signals including an NRT broadcast of a method adapted to the ARIB standard. The NRT broadcasting of the method adapted to the ARIB standard is called satellite download broadcasting.

As illustrated in FIG. 33, the lowest hierarchy is taken as "physical layer", and the frequency band of broadcast waves assigned for satellite download broadcasting corresponds to this. An upper hierarchy adjacent to "physical layer" is taken as "slot". "slot" is taken as a time-division transmission band, and for example, 48 slots are assigned to one broadcast channel.

An upper hierarchy adjacent to "slot" is taken as "TLV (Type Length Value)". With "TLV", the packet of the upper hierarchy is divided into variable-length packets called TLV packets and transmitted, and the continuity of the TLV packets will be referred to as a TLV stream.

That is to say, signals to be transmitted in the transmission band corresponding to one broadcast channel are all transmitted by TLV packets having header information corresponding to the broadcast channel thereof, and so forth. In other words, in the event of NRT broadcasting of the method adapted to the ARIB standard, the transmission rate of a TLV stream is assigned for each physical channel (broadcast channel).

"IP (Multicast)", "Header compression IP (Multicast)", "TLV-NIT (Network Information Table)", and "AMT (Address Map Table)" are described as upper hierarchies adjacent to "TLV". "IP (Multicast)" is taken as an IP packet in a Multicast form. "Header compression IP (Multicast)" is to eliminate transmission overhead by compressing the header of an IP packet. For example, this is taken as an IP packet to which header information is appended, which corresponds to a protocol wherein instead of transmitting all of the header information of all of the packets, a full-header packet is transmitted in an intermittent manner, and with other packets, the headers are replaced with a compressed header and transmitted, and the header information is restored on the reception side.

"TLV-NIT (Network Information Table)" and "AMT (Address Map Table)" are taken as hierarchies wherein information used for identifying an identifier appended to a TLV packet is transmitted based on an IP address, a port number, and so forth. With "TLV-NIT" and "AMT", the multiplexed state of TLV packets and so forth such as a list of a multicast group of multiplexed IP packets, or the like are described. The reception device 41 references "TLV-NIT" and "AMT" to determine an identifier appended to a TLV packet, whereby a target IP packet can be extracted.

An upper hierarchy adjacent to "IP (Multicast)" and "Header compression IP (Multicast)" is taken as "UDP", and "Data transmission protocol" is displayed as an upper hierarchy thereof. "Data transmission protocol" is taken as a hierarchy corresponding to a predetermined protocol for transmitting a file in which "ECG meta data" and "TSS" are stored. Based on this data transmission protocol, a later-described download header will be generated.

"TSS (Timestamped TS)" is a hierarchy where encoded image data, audio data and so forth are divided into fixed-length transport packets (TS packets), and a packet obtained by adding timestamp information to a predetermined position of a TS packet is transmitted. "Video Coding (encoded image data)", "Audio Coding (encoded audio data)", and "Caption Coding (encoded caption data)", are described as upper hierarchies adjacent to "TSS".

"ECG meta data" is taken as a hierarchy where data making up later-described ECG meta data is divided into fixed-length packets, and transmitted.

With a "TSS" hierarchical packet, or "ECG meta data" hierarchical packet, attribute information such as identification information, an encoding system, a block number, and so forth of a file to be stored is added thereto as a download header, which is taken as the payload of a UDP packet.

In this way, with satellite download broadcasting that is NRT broadcasting of the method adapted to the ARIB standard, one broadcast channel (as if it were, physical channel) having a transmission band corresponding to the transmission rate of a TLV packet of "TLV" can be multiplexed into multiple logical channels called a group.

Information regarding each of such logical channels is described in a group attribute table that is control information regarding a logical channel (group) to be generated for each broadcast channel, and a purchase attribute table that is control information corresponding to a user's viewing and listening contract. The group attribute table and purchase attribute table are each information included in the ECG meta data, and details will be described later.

Based on the group attribute table and purchase attribute table, "Group ID" that is the identifier of a group included in a program to be downloaded is determined, and based on "Group ID", "CRID" that is the identifier of the program is determined. Subsequently, based on "CRID", the IP address and port number of an IP packet to be received are determined. Further, an identifier appended to a TLV packet is determined by referencing "TLV-NIT" and "AMT", and a target IP packet is extracted.

Note that a predetermined IP address and port number are arranged to be appended to an IP packet in which the ECG meta data is stored. The IP address and port number of the ECG data is stored in the reception device 41 beforehand.

That is to say, the reception device 41 determines an identifier appended to the TLV packet by referencing "TLV-NIT" and "AMT" based on the already stored IP address and port number, whereby an IP packet of the ECG meta data can be extracted. Based on the group attribute table and purchase attribute table thus obtained, as described above, "Group ID" that is the identifier of a group in which the program to be downloaded is determined.

Next, the ECG meta data will be described. The ECG meta data includes the group attribute table, program attribute table, program location table, purchase attribute table, license attribute table, and download control information table.

Figure 34:
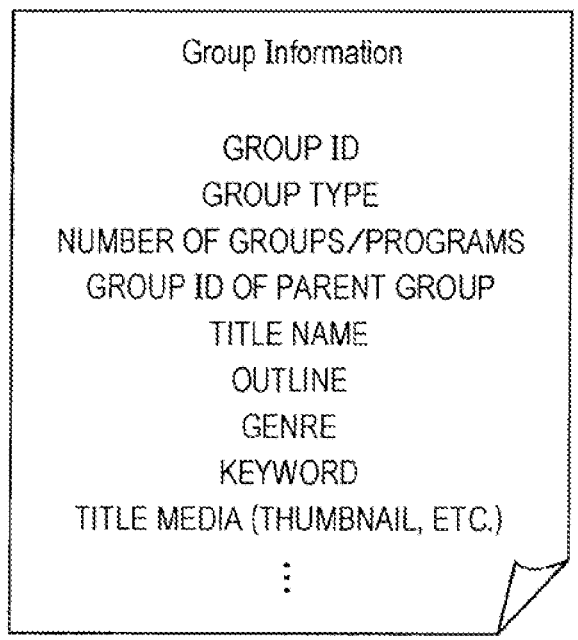
FIG. 34 is a diagram illustrating a structure example of a group attribute table.

FIG. 34 is a diagram illustrating an example of the group attribute table (Group Information) used for the present invention. The group attribute table is generated for each group. In the event of NRT broadcasting of the method adapted to the ARIB standard, the reception device 41 which receives a Push-type NRT broadcast is configured so as to receive all of the programs included in the group corresponding to the Push-type NRT broadcast thereof.

With the example in this drawing, "Group ID", "Group type", "Number of groups/programs", "Parent group ID", "Title name", "Outline", "Genre", "Keyword", "Title media", and so forth are described in the group attribute table.

"Group ID" is taken as an identifier for determining the corresponding group.

With "Group type", for example, sales conditions of a program belonging to the corresponding group, and so forth are described. For example, in the event that the program belonging to this group is a series broadcasted ten times, information representing whether this program is a program sold as a set of ten, or a program sold by each time, is described.

Also, with "Group type", information representing whether or not the program belonging to the corresponding group is a Push-type NRT broadcast program, is described. In the event of NRT broadcasting of the method adapted to the ARIB standard, the Push-type NRT broadcasting and the Pull-type NRT broadcasting differ not in the download method, but in a data storing method after downloading.

That is to say, in the event of NRT broadcasting of the method adapted to the ARIB standard, the downloaded program data is recorded in a recording medium in a manner correlated with "group ID" and "group type". In the event of NRT broadcasting of the method adapted to the ARIB standard, for example, data obtained by downloading a Push-type NRT broadcast program is arranged to be overwritten when another program belonging to the same group is downloaded. On the other hand, when data obtained by downloading a Pull-type NRT broadcast program, such overwriting is not performed.

That is to say, the reception device 41 determines whether or not the data of a newly downloaded program is overwritten and recorded, based on "Group ID" and "Group type".

Thus, in the event that the user has made a Push-type NRT broadcast viewing and listening contract, hereafter, the data of the program will be automatically overwritten and recorded in a recording medium of the reception device 41.

Thus, for example, the user who made a Push-type NRT broadcast viewing and listening contract of "Weather forecast" can view and listen to the latest forecast all the time.

With "Number of groups/programs", the numbers of groups (child groups) belonging to the corresponding group, and programs belonging to the corresponding group are described.

With "Parent group ID", in the event that there is a parent group of the corresponding group, "Group ID" of the parent group thereof is described.

With "Outline", "Genre", and "Keyword", the title, outline, genre, and keyword of the corresponding group are described, respectively.

With "Title media", for example, the thumbnail image data of a program belonging to the corresponding group is appended.

The group attribute table is thus structured.

Figure 35:
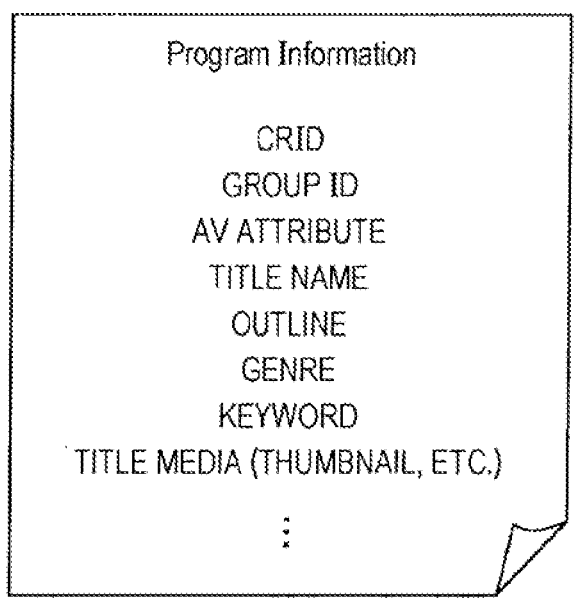
FIG. 35 is a diagram illustrating a structure example of a program attribute table.

FIG. 35 is a diagram illustrating an example of the program attribute table (Program Information) used for the present invention. The program attribute table is generated for each program.

With the example in this drawing, "CRID (Contents Reference ID)", "Group ID", "AV attribute", "Title name", "Outline", "Genre", "Keyword", "Title media", and so forth are described in the program attribute table.

"CRID" is taken as an identifier for determining the corresponding program.

With "Group ID", "Group ID" of a group to which the corresponding program belongs is described.

With "AV attribute", for example, information representing whether or not the corresponding program is a program with captions, and so forth are described.

With "Title name", "Outline", "Genre", and "Keyword", the title, outline, genre, and keyword of the corresponding group are described, respectively.

With "Title media", for example, the thumbnail image data of a program belonging to the corresponding group is appended.

The group attribute table is thus structured.

Figure 36:
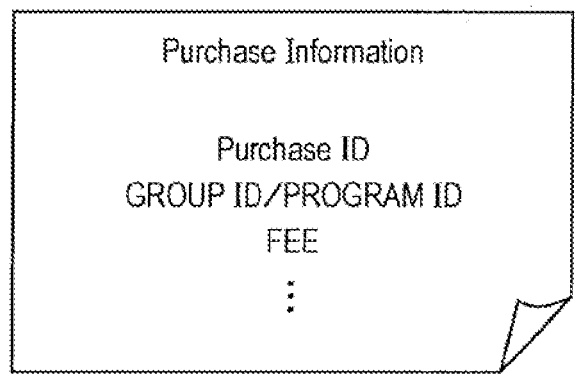
FIG. 36 is a diagram illustrating a structure example of a purchase attribute table.

FIG. 36 is a diagram illustrating an example of the purchase attribute table (Purchase Information). With the example in this drawing, "Purchase ID", "Group ID/program ID", "Fee", and so forth are described in the purchase attribute table. The purchase attribute table is generated for each viewing and listening contract of a group or program (content).

"Purchase ID" is taken as an identifier for determining the corresponding viewing and listening contract.

With "Group ID/program ID", with regard to a group or program which is an object of the corresponding viewing and listening contract, "Group ID" and "Program ID (i.e., CRID)" are described.

With "Fee", fee to be paid along with an NRT broadcast viewing and listening contract is described.

The purchase attribute table is thus structured.

Figure 37:
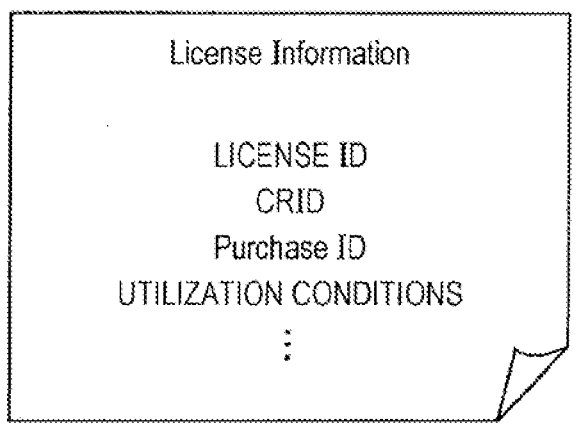
FIG. 37 is a diagram illustrating a structure example of a license attribute table.

FIG. 37 is a diagram illustrating an example of the license attribute table (License Information). With the example in this drawing, "License ID", "CRID", "Purchase ID", "Utilization conditions", and so forth are described in the license attribute table. The license attribute table is generated for each viewing and listening contract of a program (content).

"License ID" is the identifier of a license corresponding to the corresponding viewing and listening contract, and is also, for example, the address information of a storage region in which a key for decoding an encoded program file is stored.

For example, the reception device 41 which obtained "License ID" accesses a broadcasting station server or the like to be connected via a network based on the address thereof. That is to say, the above address is for determining a predetermined storage region of the broadcasting station server, and a key for decoding the file of an encoded program is stored in the storage region thereof.

The reception device 41 transmits "Purchase ID" and own identification information and so forth to receive authentication of the server at the time of accessing the broadcasting station server, for example. In the event of succeeding in authentication, the reception device 41 is configured so as to obtain the key for decoding the file from the server.

With "CRID", the "CRID" of a program that can be viewed and listened to according to the corresponding viewing and listening contract, is described.

With "Purchase ID", the "Purchase ID" of a viewing and listening contract corresponding to the corresponding license is described.

With "Utilization conditions", information representing the number of decodable times of the file of a program according to the corresponding license (the number of playable times of a content) and so forth is described.

The license attribute table is thus structured.

Figure 38:
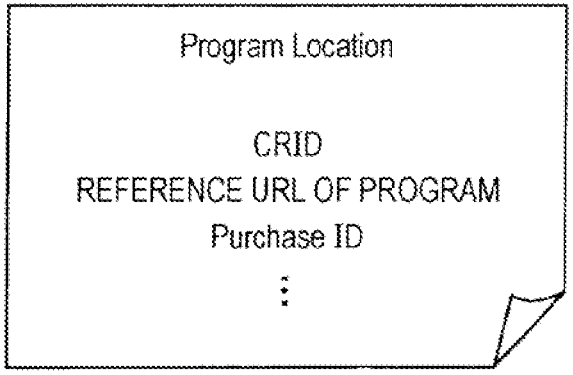
FIG. 38 is a diagram illustrating an example of a program location (Program Location) table.

FIG. 38 is a diagram illustrating an example of a program location table (Program Location). With the example in this drawing, "CRID", "Reference URL of program", "Purchase ID", and so forth are described in the program location table. The program location table is generated for each program.

With "CRID", the "CRID" of the corresponding program is described.

With "Reference URL of program", the URL of download control information (described later) of the corresponding program is described.

With "Purchase ID", the "Purchase ID" of a viewing and listening contract with the corresponding program as an object is described.

The program location table is thus structured.

Figure 39:
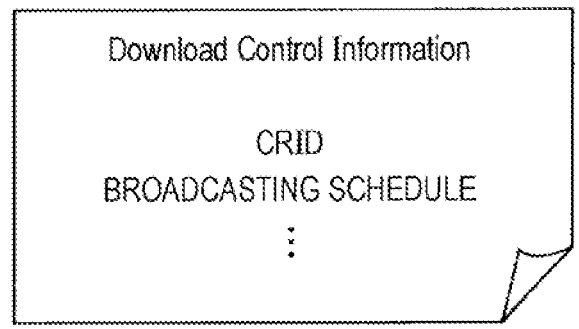
FIG. 39 is a diagram illustrating a structure example of downloading control information.

FIG. 39 is a diagram illustrating an example of the download control information (Download Control Information). With the example in this drawing, "CRID", "Broadcasting schedule", and so forth are described in the download control information. The download control information is generated for each program.

With "CRID", the "CRID" of the corresponding program is described.

With "Broadcasting schedule", the broadcast channel, broadcasting start point-in-time, broadcasting end point-in-time, and so forth of the corresponding program are described.

Also, additionally, the IP address and port number of packets for transmitting the file of the corresponding program are arranged to be described in the download control information.

The download control information is thus structured.

Note that each of the above group attribute table, program attribute table, program location table, purchase attribute table, license attribute table, download control information table is, in reality, described as an XML sentence.

For example, the user of the reception device 41 which received the ECG meta data determines a Push-type NRT broadcast that the user intends to view and listen to, with reference to "Title name", "Outline", and so forth included in the group attribute table. Subsequently, the user makes a viewing and listening contract in accordance with predetermined procedures to pay a fee necessary for this Push-type NRT broadcast viewing and listening contract. For example, the identification information of the reception device 41 of the user who paid the fee is stored in the broadcasting station server in a manner correlated with "Purchase ID" corresponding to the viewing and listening contract made and concluded by payment of the fee. Also, "Purchase ID" corresponding to the viewing and listening contract made and concluded by payment of the fee is stored in the reception device 41 of the user who paid the fee.

The reception device 41 which received a broadcast after the viewing and listening contract and the payment of the fee obtains the purchase attribute table, license attribute table, and program location table included in the ECG meta data, based on the stored "Purchase ID".

Subsequently, the reception device 41 obtains the download control information included in the ECG meta data based on the URL described in the program location table. The reception device 41 determines the broadcasting start point-in-time and broadcasting end point-in-time, broadcast channel, IP address, port number, and so forth of the program by determining a broadcasting schedule described in the download control information. Thus, for example, the downloading schedule of an NRT broadcast program is stored in the internal memory of the controller 409.

The reception device 41 downloads a file making up the program in accordance with the downloading schedule, and determines an address where the decoding key is stored, using the license ID described in the license attribute table obtained based on "Purchase ID". Subsequently, the reception device 41 accesses the above address via a network to obtain the decoding key, and decodes and plays the encoded file, for example.

In this way, Push-type NRT broadcasting may be realized using the method adapted to the ARIB standard.

Figure 40:
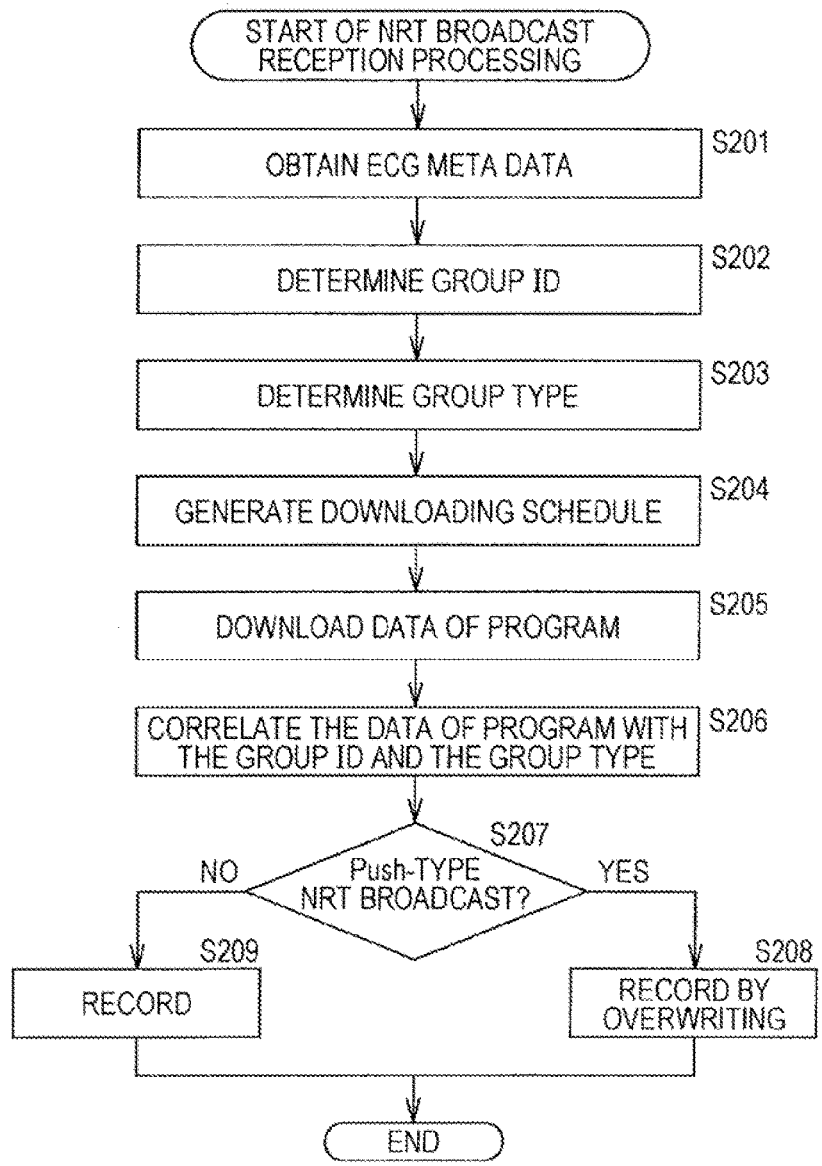
FIG. 40 is a diagram for describing an example of NRT broadcast reception processing.

Next, description will be made regarding NRT broadcast reception processing in the event that an NRT broadcast is received at the reception device 41 using the method adapted to the ARIB standard, with reference to the flowchart in FIG. 40.

In step S201, the reception device 41 obtains the ECG meta data. At this time, the reception device 41 references "TLV-NIT" and "AMT" based on the already stored IP address and port number, thereby determining the identifier appended to the TLV packet. Subsequently, the reception device 41 extracts the IP packet of the ECG meta data from the determined TLV packet, thereby obtaining the ECG meta data.

In step S202, the reception device 41 determines "Group ID". At this time, the reception device 41 obtains the purchase attribute table, license attribute table, and program location table included in the ECG meta data, based on the stored "Purchase ID". Subsequently, the reception device 41 determines "Group ID" included in the purchase attribute table.

In step S203, the reception device 41 obtains the group attribute table based on "Group ID" determined in the processing in step S202, and determines "Group type" thereof.

In step S204, the reception device 41 generates a downloading schedule. At this time, the reception device 41 obtains the download control information based on the URL described in the program location table obtained along with the processing in step S202. The reception device 41 determines the broadcasting schedule described in the download control information, thereby determining the broadcasting start point-in-time and broadcasting end point-in-time, broadcast channel, IP address, port number, and so forth of the program. Thus, for example, the downloading schedule of an NRT broadcast program is stored in the internal memory of the controller 409, or the like, for example.

In step S205, the reception device 41 downloads the data of the program based on the downloading schedule generated in the processing in step S204.

In step S206, the reception device 41 correlates the data of the program downloaded in the processing in step S205 with "Group ID" and "Group type" determined in the processing in step S202 and step S203.

In step S207, the reception device 41 determines whether or not the program downloaded in the processing in step S205 is a Push-type NRT broadcast program. At this time, based on "Group type" correlated in the processing in step S206, determination is made whether or not this program is a Push-type NRT broadcast program.

In the event that determination is made in step S207 that the program downloaded in the processing in step S205 is a Push-type NRT broadcast program, the processing proceeds to step S208.

In step S208, the reception device 41 overwrites and records the data of the program.

On the other hand, in the event that determination is made in step S207 that the program downloaded in the processing in step S205 is not a Push-type NRT broadcast program, the processing proceeds to step S209.

In step S209, the reception device 41 does not overwrite but records the data of the program.

That is to say, in step S208 or step S209, the data of the downloaded program is recorded in the recording medium in a manner correlated with "Group ID" and "Group type".

Here, the data obtained by downloading the Push-type NRT broadcast program is arranged to be overwritten when another program belonging to the same group is downloaded (processing in step S208). For example, the data of previously recorded program, which is the data of a program correlated with the same "Group ID" as "Group ID" determined in the processing in step S202, is overwritten with the data of the program downloaded in the processing in step S205. On the other hand, when the data obtained by downloading a Pull-type NRT broadcast program, the above overwriting is not performed (processing in step S209).

That is to say, the reception device 41 is configured so as to determine whether or not the data of a newly downloaded program is overwritten and recorded, based on "Group ID" and "Group type" (processing in step S207). Thus, in the event that the user has made a Push-type NRT broadcast viewing and listening contract, hereafter, the data of the program is automatically overwritten and recorded on the recording medium of the reception device 41.

Note that the above series of processing may be executed by hardware, or may be executed by software. In the event that the above series of processing is executed by software, a program making up the software thereof is installed from a network or recording medium into a computer embedded in dedicated hardware. Also, this program is installed from a network or recording medium into a general-purpose personal computer 700 illustrated in FIG. 41 for example, which is capable of executing various types of functions by installing various types of programs.

In FIG. 41, a CPU (Central Processing Unit) 701 executes various types of processing in accordance with a program stored in ROM (Read Only Memory) 702, or a program loaded from a storage unit 708 to RAM (Random Access Memory) 703. Data necessary for the CPU 701 executing various types of processing, and so forth are also stored in the RAM 703 as appropriate.

The CPU 701, ROM 702, and RAM 703 are mutually connected via a bus 704. This bus 704 is also connected with an input/output interface 705.

The input/output interface 705 is connected with an input unit 706 made up of a keyboard, a mouse, and so forth, a display made up of an LCD (Liquid crystal display) and so forth, and an output unit 707 made up of a speaker and so forth. Also, the input/output interface 705 is connected with a storage unit 708 configured of a hard disk and so forth, and a communication unit 709 configured of a modem, a network interface card such as a LAN card or the like, and so forth. The communication unit 709 performs communication processing via a network including the Internet.

The input/output interface 705 is also connected with a drive 710 according to need, on which a removable medium 711 such as a magnetic disk, optical disc, magneto-optical disk, semiconductor memory, or the like is mounted as appropriate. Subsequently, a computer program read out from the removable medium thereof is installed into the storage unit 708 according to need.

In the event of executing the above series of processing by software, a program making up the software thereof is installed from a network such as the Internet or the like, or a recording medium made up of the removable medium 711.

Note that this recording medium includes not only a recording medium configured of the removable medium 711 made up of a magnetic disk (including floppy disk (registered trademark)), optical disc (including CD-ROM (Compact Disk-Read Only Memory), DVD (Digital Versatile Disk)), magneto-optical disk (including MD (Mini-Disk) (registered trademark)), semiconductor memory, or the like, in which the program is recorded, illustrated in FIG. 41, which is distributed for distributing the program to a user, separate from a device main frame, but also a recording medium made up of the ROM 702, or a hard disk included in the storage unit 708, or the like, in which the program is recorded, which is distributed to a user in a state embedded in the device main frame beforehand.

Note that the series of processing described above in the present Specification include not only processing to be performed in a time-oriented manner along the described sequence but also processing to be executed in parallel or individually even though not necessarily to be executed in a time-oriented manner.

Also, embodiments of the present invention are not restricted to the above embodiments, and various modifications may be made without departing from the essence of the present invention.

REFERENCE SIGNS LIST 1 broadcasting system, 21 transmission device, 41 reception device, 401 terminal, 402 tuner, 403 TSDemux, 404 video decoder, 405 audio decoder, 406 file container Demux, 407 FLUTE processor, 408 storage, 409 controller, 410 terminal, 411 terminal

The invention claimed is:

1. A contents reception device comprising:
circuitry configured to
receive control information relating to broadcasting of a content with a transmission rate unsynchronized with a playback rate, based on a signal to be transmitted as a broadcast wave;
generate a downloading schedule that is reserved information for receiving and recording contents to be broadcasted with a logical channel corresponding to registration information set beforehand, based on said control information;
receive each of said contents and to record in a recording medium, based on said downloading schedule; and
initiate a playing of a content recorded in said recording medium with said playback rate;
wherein said control information relating to broadcasting of contents includes
predetermined descriptive data in which, in the event of taking the transmission path of said broadcast wave signal of said frequency band as a physical channel, information relating to a logical channel obtained by dividing said physical channel into a plurality of transmission paths using a predetermined method is described, and
meta data in which information relating to a content to be transmitted with each of said logical channels is described,
wherein said registration information set beforehand comprises information for determining a logical channel of a registered Push-type service and also comprises information that indicates a user desired contents group that the user is interested in downloading, wherein the user desired contents group is associated with a type of service corresponding to the registered Push-type service, and the user desired contents group is taken as a unit and represents programs to be broadcasted in series together,
wherein each one of said logical channels is assigned to a different respective Push-type NRT broadcasting service, and
wherein selected ones of the content having the logical channel corresponding to the registration information and matching the user desired contents group are automatically downloaded and recorded.

2. The contents reception device according to claim 1, wherein the circuitry is configured to generate a downloading schedule for receiving and recording all of the contents to be broadcasted with said logical channel corresponding to said registration information, of a plurality of logical channels included in said physical channel.

3. The contents reception device according to claim 2, wherein the circuitry is configured to generate said downloading schedule by determining the broadcasting start point-in-time of said contents, and also determining location information for determining the data of said contents, of data to be transmitted by said logical channels, based on description of said meta data.

4. The contents reception device according to claim 3, wherein the circuitry is configured to
receive said contents by receiving, based on said downloading schedule, the broadcast wave of a frequency band corresponding to said physical channel at the broadcasting start point-in-time of said contents,
extract a transport packet of a logical channel corresponding to said registration information, of transport packets to be transmitted by said physical channel, based on description of said predetermined descriptive data, and determine the data of said contents based on said location information.

5. The contents reception device according to claim 4, wherein the transport packet of said logical channel is structured so as to include an IP packet;

and wherein said location information includes information for determining a file transmission session of the data of said contents to be transmitted by said IP packet;

and wherein the circuitry is configured to determine the data of said contents based on description of transmission control data obtained by said file transmission session being determined.

6. The contents reception device according to claim 5, wherein the circuitry is configured to determine an address file described in the RSS format or ATOM format, based on description of said transmission control data, and determine the data of said contents based on said address file.

7. The contents reception device according to claim 1, wherein based on description of said predetermined descriptive data and said meta data, of said logical channels, the logical channel for providing said Push-type service for receiving a content to be viewed and listened to is determined regardless of a user request;

and wherein a list of logical channels for providing said Push-type service is presented to a user to accept registration of said Push-type service by said user;

and wherein information for determining the logical channel of said registered Push-type service is stored as said registration information.

8. The contents reception device according to claim 1, wherein the circuitry is configured to generate a downloading schedule for receiving and recording a content determined by said predetermined descriptive data, which is, of a plurality of logical channels included in said physical channel, a content to be transmitted by said logical channel corresponding to said registration information.

9. The contents reception device according to claim 1, wherein the circuitry is further configured to determine whether or not said received content is overwritten on a content recorded in said recording medium.

10. The contents reception device according to claim 1, wherein an expiration date is set to said recorded contents based on description of said meta data;

and wherein said contents of which said expiration date has elapsed are eliminated.

11. A contents reception method comprising the steps of:

receiving control information relating to broadcasting of a content with a transmission rate unsynchronized with a playback rate, based on a signal to be transmitted as a broadcast wave;

generating a downloading schedule that is reserved information for receiving and recording contents to be broadcasted with a logical channel corresponding to registration information set beforehand, based on said control information;

receiving each of said contents and recording in a recording medium, based on said downloading schedule; and playing a content recorded in said recording medium with said playback rate;

wherein said control information relating to broadcasting of contents includes predetermined descriptive data in which, in the event of taking the transmission path of said broadcast wave signal of said frequency band as a physical channel, information relating to a logical channel obtained by dividing said physical channel into a plurality of transmission paths using a predetermined method is described, and meta data in which information relating to a content to be transmitted with each of said logical channels is described, wherein said registration information set beforehand comprises information for determining a logical channel of a registered Push-type service and also comprises information that indicates a user desired contents group that the user is interested in downloading, wherein the user desired contents group is associated with a type of service corresponding to the registered Push-type service, and the user desired contents group is taken as a unit and represents programs to be broadcasted in series together, wherein each one of said logical channels is assigned to a different respective Push-type NRT broadcasting service, and wherein selected ones of the content having the logical channel corresponding to the registration information and matching the user desired contents group are automatically downloaded and recorded.

12. A non-transitory computer-readable medium having embodied thereon a program, which when executed by a computer causes the computer to perform a method, the method comprising:

receiving control information relating to broadcasting of a content with a transmission rate unsynchronized with a playback rate, based on a signal to be transmitted as a broadcast wave;

generating a downloading schedule that is reserved information for receiving and recording contents to be broadcasted with a logical channel corresponding to registration information set beforehand, based on said control information;

receiving each of said contents and recording in a recording medium, based on said downloading schedule; and playing a content recorded in said recording medium with said playback rate;

wherein said control information relating to broadcasting of contents includes predetermined descriptive data in which, in the event of taking the transmission path of said broadcast wave signal of said frequency band as a physical channel, information relating to a logical channel obtained by dividing said physical channel into a plurality of transmission paths using a predetermined method is described, and meta data in which information relating to a content to be transmitted with each of said logical channels is described, wherein said registration information set beforehand comprises information for determining a logical channel of a registered Push-type service and also comprises information that indicates a user desired contents group that the user is interested in downloading, wherein the user desired contents group is associated with a type of service corresponding to the registered Push-type service, and the user desired contents group is taken as a unit and represents programs to be broadcasted in series together, wherein each one of said logical channels is assigned to a different respective Push-type NRT broadcasting service, and wherein selected ones of the content having the logical channel corresponding to the registration information and matching the user desired contents group are automatically downloaded and recorded.

13. The contents reception device according to claim 1, wherein the circuitry is configured to receive said control information from a virtual channel table (VCT), the plurality of transmission paths divided from said physical channel correspond to a plurality of logical channels, and information relating to said plurality of logical channels, including said logical channel obtained by the dividing of said physical channel into said plurality of transmission paths, is provided as at least a portion of said predetermined descriptive data of said control information.

14. The contents reception device according to claim 13, wherein said meta data, in which the information relating to said content to be transmitted with each of said logical channels is described, is provided by a non-real time information table (NRT-IT).

15. The contents reception method according to claim 11, wherein said control information is received from a virtual channel table (VCT), the plurality of transmission paths divided from said physical channel correspond to a plurality of logical channels, and information relating to said plurality of logical channels, including said logical channel obtained by the dividing of said physical channel into said plurality of transmission paths, is provided as at least a portion of said predetermined descriptive data of said control information.

16. The contents reception method according to claim 15, wherein said meta data, in which the information relating to said content to be transmitted with each of said logical channels is described, is provided by a non-real time information table (NRT-IT).

17. The computer-readable medium according to claim 12, wherein said control information is received from a virtual channel table (VCT), the plurality of transmission paths divided from said physical channel correspond to a plurality of logical channels, and information relating to said plurality of logical channels, including said logical channel obtained by the dividing of said physical channel into said plurality of transmission paths, is provided as at least a portion of said predetermined descriptive data of said control information.

18. The computer-readable medium according to claim 17, wherein said meta data, in which the information relating to said content to be transmitted with each of said logical channels is described, is provided by a non-real time information table (NRT-IT).

19. The contents reception device according to claim 1, wherein said meta data comprises Push-type NRT meta information.

20. The contents reception device according to claim 1, wherein all of the contents corresponding to a desired Push-type NRT broadcasting service are broadcasted with a same assigned logical channel that is assigned to the desired Push-type NRT broadcasting service.

21. The contents reception device according to claim 20, wherein the contents corresponding to the desired Push-type NRT broadcasting service and matching a user desired contents group indicated within said registration information set beforehand and are automatically downloaded and recorded.

22. The contents reception device according to claim 1, wherein the user desired contents group is taken as the logical channel where physical channels are multiplexed.

23. The contents reception device according to claim 1, wherein multiple programs are included in the user desired contents group.

24. The contents reception device according to claim 1, wherein the type of service represents a selected topic of content.

* * * * *